US011587529B2

(12) United States Patent
Miller et al.

(10) Patent No.: US 11,587,529 B2
(45) Date of Patent: *Feb. 21, 2023

(54) PERCEPTUAL LUMINANCE NONLINEARITY-BASED IMAGE DATA EXCHANGE ACROSS DIFFERENT DISPLAY CAPABILITIES

(71) Applicant: DOLBY LABORATORIES LICENSING CORPORATION, San Francisco, CA (US)

(72) Inventors: Jon Scott Miller, Harleysville, PA (US); Scott Daly, Kalama, WA (US); Mahdi Nezamabadi, Moorestown, NJ (US); Robin Atkins, San Jose, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 130 days.

This patent is subject to a terminal disclaimer.

(21) Appl. No.: 17/208,886

(22) Filed: Mar. 22, 2021

(65) Prior Publication Data

US 2021/0280154 A1 Sep. 9, 2021

Related U.S. Application Data

(63) Continuation of application No. 16/812,810, filed on Mar. 9, 2020, now Pat. No. 10,957,283, which is a (Continued)

(51) Int. Cl.
*G06K 9/00* (2022.01)
*G09G 5/10* (2006.01)
(Continued)

(52) U.S. Cl.
CPC ............... *G09G 5/10* (2013.01); *G06F 3/14* (2013.01); *G09G 5/005* (2013.01); *G09G 5/06* (2013.01);
(Continued)

(58) Field of Classification Search
CPC .......... G09G 5/10; G09G 5/005; G09G 5/06; G09G 2320/0276; G09G 2320/0285;
(Continued)

(56) References Cited

U.S. PATENT DOCUMENTS

| 5,276,779 A | 1/1994 | Statt |
| 6,018,596 A | 1/2000 | Wilkinson |
(Continued)

FOREIGN PATENT DOCUMENTS

| CN | 1378384 | 11/2002 |
| CN | 1437408 | 8/2003 |
(Continued)

OTHER PUBLICATIONS

Xiao, et al "Tone Reproduction Method by a Local Model of Visual Adaption Based on Sigmoid Function" Guangxue Xuebao/Acta Optica Sinica, vol. 29, No. 11, Nov. 2009, pp. 3050-3056.
(Continued)

*Primary Examiner* — Andrew M Moyer

(57) ABSTRACT

A handheld imaging device has a data receiver that is configured to receive reference encoded image data. The data includes reference code values, which are encoded by an external coding system. The reference code values represent reference gray levels, which are being selected using a reference grayscale display function that is based on perceptual non-linearity of human vision adapted at different light levels to spatial frequencies. The imaging device also has a data converter that is configured to access a code mapping between the reference code values and device-specific code values of the imaging device. The device-specific code values are configured to produce gray levels that are specific to the imaging device. Based on the code mapping, the data converter is configured to transcode the
(Continued)

reference encoded image data into device-specific image data, which is encoded with the device-specific code values.

2 Claims, 13 Drawing Sheets

Related U.S. Application Data continuation of application No. 16/354,106, filed on Mar. 14, 2019, now Pat. No. 10,621,952, which is a continuation of application No. 15/960,303, filed on Apr. 23, 2018, now Pat. No. 10,242,650, which is a continuation of application No. 15/610,499, filed on May 31, 2017, now Pat. No. 9,959,837, which is a continuation of application No. 15/283,237, filed on Sep. 30, 2016, now Pat. No. 9,697,799, which is a continuation of application No. 14/925,596, filed on Oct. 28, 2015, now Pat. No. 9,521,419, which is a continuation of application No. 14/735,875, filed on Jun. 10, 2015, now Pat. No. 9,288,499, which is a continuation of application No. 14/363,129, filed as application No. PCT/US2012/068212 on Dec. 6, 2012, now Pat. No. 9,077,994.

(60) Provisional application No. 61/703,449, filed on Sep. 20, 2012, provisional application No. 61/674,503, filed on Jul. 23, 2012, provisional application No. 61/567,579, filed on Dec. 6, 2011.

(51) Int. Cl.
*H04N 19/40* (2014.01)
*G06F 3/14* (2006.01)
*G09G 5/00* (2006.01)
*G09G 5/06* (2006.01)

(52) U.S. Cl.
CPC ..... *H04N 19/40* (2014.11); *G09G 2320/0276* (2013.01); *G09G 2320/0285* (2013.01); *G09G 2320/04* (2013.01); *G09G 2340/0428* (2013.01); *G09G 2340/0435* (2013.01); *G09G 2340/06* (2013.01); *G09G 2340/14* (2013.01); *G09G 2370/04* (2013.01); *G09G 2370/08* (2013.01); *G09G 2380/08* (2013.01)

(58) Field of Classification Search
CPC ....... G09G 2320/04; G09G 2340/0428; G09G 2340/0435; G09G 2340/06; G09G 2340/14; G09G 2370/04; G09G 2370/08; G09G 2380/08; G06F 3/14; H04N 19/40
See application file for complete search history.

(56) References Cited

U.S. PATENT DOCUMENTS

| | | |
|---|---|---|
| 6,370,265 B1 | 4/2002 | Bell |
| 6,388,648 B1 | 5/2002 | Clifton |
| 6,755,529 B2 | 6/2004 | Stewart |
| 6,847,376 B2 | 1/2005 | Engeldrum |
| 6,989,859 B2 | 1/2006 | Parulski |
| 7,019,763 B2 | 3/2006 | Kimura |
| 7,023,580 B2 | 4/2006 | Zhang |
| 7,046,400 B2 | 5/2006 | Gindele |
| 7,158,673 B2 | 1/2007 | Nakabayashi |
| 7,164,284 B2 | 1/2007 | Pan et al. |
| 7,170,477 B2 | 1/2007 | Okamoto |
| 7,221,807 B2 | 5/2007 | Campbell |
| 7,266,229 B2 | 9/2007 | Couwenhoven et al. |
| 7,268,763 B2 | 9/2007 | Fukuda |
| 7,283,654 B2 | 10/2007 | McLain |
| 7,345,682 B2 | 3/2008 | Honda |
| 7,382,382 B2 | 6/2008 | Furukawa |
| 7,576,750 B2 | 8/2009 | Eckhardt |
| 7,710,387 B2 | 5/2010 | Yamaguchi |
| 7,782,405 B2 | 8/2010 | Kerofsky |
| 7,826,681 B2 | 11/2010 | Kerofsky |
| 8,260,080 B1 | 9/2012 | Wilensky |
| 8,988,552 B2 | 3/2015 | Atkins |
| 9,077,994 B2 | 7/2015 | Miller |
| 9,202,438 B2 | 12/2015 | Atkins |
| 9,697,799 B2 | 7/2017 | Miller |
| 9,959,837 B2 | 5/2018 | Miller |
| 10,242,650 B2 | 3/2019 | Miller |
| 10,621,952 B2 * | 4/2020 | Miller ................... H04N 19/40 |
| 10,957,283 B2 * | 3/2021 | Miller ................. G09G 3/3406 345/89 |
| 2001/0050757 A1 | 12/2001 | Yoshida |
| 2002/0018153 A1 | 2/2002 | Kitabayashi |
| 2002/0075136 A1 | 6/2002 | Nakaji |
| 2002/0080245 A1 | 6/2002 | Parulski |
| 2003/0151781 A1 | 8/2003 | Ono |
| 2003/0174284 A1 | 9/2003 | Stewart |
| 2004/0036799 A1 | 2/2004 | Weitbruch |
| 2004/0066979 A1 | 4/2004 | Gindele et al. |
| 2005/0018894 A1 | 1/2005 | Couwenhoven |
| 2005/0052363 A1 | 3/2005 | Jeong |
| 2005/0078863 A1 | 4/2005 | Ito |
| 2005/0190836 A1 | 9/2005 | Lu |
| 2006/0176407 A1 | 8/2006 | Ikeda |
| 2006/0197968 A1 | 9/2006 | Vannostrand |
| 2006/0215914 A1 | 9/2006 | Aleksic |
| 2007/0067124 A1 | 3/2007 | Kimpe et al. |
| 2007/0127093 A1 | 6/2007 | Kuno |
| 2007/0236517 A1 | 10/2007 | Kimpe |
| 2008/0024398 A1 | 1/2008 | Hwang |
| 2008/0043262 A1 | 2/2008 | Ovsiannikov |
| 2008/0074372 A1 * | 3/2008 | Baba ................... G09G 3/3406 345/89 |
| 2008/0094426 A1 | 4/2008 | Kimpe |
| 2008/0094515 A1 | 4/2008 | Gutta |
| 2008/0097203 A1 | 4/2008 | Nereson |
| 2008/0170031 A1 | 7/2008 | Kuo |
| 2008/0186707 A1 | 8/2008 | Ku |
| 2009/0109293 A1 | 4/2009 | Coley |
| 2009/0109487 A1 | 4/2009 | Tsukada |
| 2009/0141121 A1 | 6/2009 | Kimpe |
| 2009/0167672 A1 | 7/2009 | Kerofsky |
| 2009/0190716 A1 | 7/2009 | Yang |
| 2009/0195486 A1 | 8/2009 | Moldvai |
| 2009/0201309 A1 | 8/2009 | Demos |
| 2009/0203999 A1 | 8/2009 | Rust |
| 2009/0267876 A1 | 10/2009 | Kerofsky |
| 2009/0304279 A1 | 12/2009 | Mori |
| 2010/0002156 A1 | 1/2010 | Tsou |
| 2010/0007599 A1 | 1/2010 | Kerofsky |
| 2010/0013751 A1 | 1/2010 | Kerofsky |
| 2010/0021057 A1 | 1/2010 | Morimoto |
| 2010/0054593 A1 | 3/2010 | Matsushita |
| 2010/0118008 A1 | 5/2010 | Matsuoka |
| 2010/0128057 A1 | 5/2010 | Doser |
| 2010/0226547 A1 | 9/2010 | Criminisi |
| 2010/0321395 A1 | 12/2010 | Maciesowicz |
| 2011/0032286 A1 | 2/2011 | Takata |
| 2011/0128263 A1 | 6/2011 | Abe |
| 2011/0129148 A1 | 6/2011 | Kisilev et al. |
| 2011/0187733 A1 | 8/2011 | Sun et al. |
| 2011/0316973 A1 | 12/2011 | Miller |
| 2012/0051636 A1 | 3/2012 | Greenebaum |
| 2012/0182278 A1 | 7/2012 | Ballestad |
| 2012/0256943 A1 | 10/2012 | Atkins et al. |
| 2013/0076974 A1 | 3/2013 | Atkins |
| 2014/0210847 A1 | 7/2014 | Knibbeler et al. |
| 2014/0363093 A1 | 12/2014 | Miller |

(56) References Cited

U.S. PATENT DOCUMENTS

2015/0161967 A1 6/2015 Atkins
2015/0281711 A1 10/2015 Miller

FOREIGN PATENT DOCUMENTS

| | | |
|---|---|---|
| CN | 101521779 | 9/2009 |
| CN | 101620819 | 1/2010 |
| CN | 102165513 | 8/2011 |
| CN | 102187657 | 9/2011 |
| CN | 102222460 | 10/2011 |
| EP | 0103488 | 3/1984 |
| EP | 1391865 | 2/2004 |
| EP | 1391865 A1 | 2/2004 |
| EP | 1544837 | 6/2005 |
| EP | 3079055 B1 | 3/2019 |
| GB | 2311432 | 9/1997 |
| JP | 10003541 | 1/1998 |
| JP | 2000188647 | 7/2000 |
| JP | 2002092655 | 3/2002 |
| JP | 2004133400 | 4/2004 |
| JP | 2004252372 | 9/2005 |
| JP | 2005303972 | 10/2005 |
| JP | 2008234315 | 10/2008 |
| JP | 2009503609 | 1/2009 |
| JP | 2009211048 | 9/2009 |
| JP | 2009542398 A | 12/2009 |
| JP | 2010003541 | 1/2010 |
| JP | 2011133877 | 7/2011 |
| RU | 2337392 | 10/2008 |
| RU | 2010107161 A | 9/2011 |
| RU | 2433477 | 11/2011 |
| WO | 2002039724 | 5/2002 |
| WO | 2007014681 A1 | 2/2007 |
| WO | 2010089597 | 8/2010 |
| WO | 2010104624 | 10/2010 |
| WO | 2010126533 | 11/2010 |
| WO | 2011065387 | 6/2011 |
| WO | 2011101662 | 8/2011 |
| WO | 2011107905 | 9/2011 |
| WO | 2011118263 | 9/2011 |
| WO | 2011133505 | 10/2011 |
| WO | 2012125802 | 9/2012 |
| WO | 2013086169 | 6/2013 |

OTHER PUBLICATIONS

Zou, et al "Radiometric Compensation Algorithm for Color Reproduction of Projection Display on Patterned Surface", Chinese Optics Letters, vol. 8, No. 4, Apr. 2010, pp. 388-391, Abstract only.

Baba, M. et al "Novel Algorithm for LCD Backlight Dimming by Simultaneous Optimization of Backlight Luminance and Gamma Conversion Function" Proc. of the 15th International Display Workshops, Dec. 3-5, 2008.

Barten, P.G.J. "Contrast Sensitivity of the Human Eye and its Effects on Image Quality" SPIE Optical Engineering Press, 1999, 19 pages.

Daly, S. "The Visible Differences Predictor: An Algorithm for the Assessment of Image Fidelity" Chapter 14 in "Digital Images and Human Vision" ed. by A.B. Watson, MIT Press, published on Oct. 20, 1993, pp. 180-187, pp. 425-432.

Daly, Scott, Chapter 17 in "Digital Images and Human Vision" ed., by A.B. Watson, MIT Press, published on Oct. 20, 1993, pp. 224.

Watson, A.B. Overview of "Digital Images and Human Vision", MIT Press, published on Oct. 20, 1993, 1 page.

ITU-R Recommendation ITU-R BT, 2020, "Parameter Values for Ultra-High Definition Television Systems for Production and International Programme Exchange", Aug. 2012, 7 pages.

ITU-R Recommendation ITU-R BT, 2020-1, Parameter Values for Ultra-High Definition Television Systems for Production and International Programme Exchange, Jun. 2014, 8 pages.

Kim, Min Hyuk "High-Fidelity Colour Reproduction for High Dynamic Range Imaging", Doctoral Thesis, UCL (University College London) 2010.

Kwon, O.S et al. "High fidelity color reproduction of Plasma Displays under Ambient Lighting," IEEE Transactions on Consumer Electronics, vol. 55, No. 3, pp. 1015-1020. Aug. 2009.

Liu, C.H. et al "Image Characteristic Oriented Tone Mapping for High Dynamic Range Images" IEEE International Conference on Multimedia and Expo, Jun. 23-26, 2008, pp. 1133-1136.

Peirce, Jonathan "The Potential Importance of Saturating and Supersaturating Contrast Response Functions in Visual Cortex" Journal of Vision, published Apr. 30, 2007, pp. 1-10.

Fan, R. "Segmented Logarithmic Tone Mapping from HDR to LDR" Journal of Computer Applications, vol. 28, No. 7, Jul. 2008, pp. 1724-1725.

Ono, Y. et al "Display Consistency" The Development of Network Display Consistency in Medical Imaging Systems, vol. 1, 2004, Konica Minolta, Inc.

* cited by examiner

| Quantization | Max Code Error (from CSF peaks) |
|---|---|
| inf | 11.252 |
| 4096 | 11.298 |
| 2048 | 11.373 |
| 1024 | 12.089 |
| 512 | 12.451 |
| 256 | 13.288 |

FIG. 10A

| Parameters | | Formula |
|---|---|---|
| n | 0.16956 | (2778/4096)/4 |
| m | 77.968 | (2495/4096)*128 |
| c1 | 0.96484 | (3952/4096) |
| c2 | 3.7627 | (3853/4096)*4 |
| c3 | 3.5166 | (3436/4096)*4 |

FIG. 11

PERCEPTUAL LUMINANCE NONLINEARITY-BASED IMAGE DATA EXCHANGE ACROSS DIFFERENT DISPLAY CAPABILITIES

CROSS-REFERENCE TO RELATED APPLICATIONS

The present application is a continuation of U.S. patent application Ser. No. 16/812,810 filed on Mar. 9, 2020, which is a continuation of U.S. patent application Ser. No. 16/354,106 filed on Mar. 14, 2019, and issued as U.S. Pat. No. 10,621,952 on Apr. 14, 2020, which is a continuation of U.S. patent application Ser. No. 15/960,303 filed on Apr. 23, 2018, and issued as U.S. Pat. No. 10,242,650 on Mar. 26, 2019, which is a continuation of U.S. patent application Ser. No. 15/610,499 filed on May 31, 2017, and issued as U.S. Pat. No. 9,959,837 on May 1, 2018, which is a continuation of U.S. patent application Ser. No. 15/283,237 filed on Sep. 30, 2016 and issued as U.S. Pat. No. 9,697,799 on Jul. 4, 2017, which is a continuation of U.S. patent application Ser. No. 14/925,596 filed on Oct. 28, 2015 and issued as U.S. Pat. No. 9,521,419 on Dec. 13, 2016, which is a continuation of U.S. patent application Ser. No. 14/735,875 filed on Jun. 10, 2015, and issued as U.S. Pat. No. 9,288,499 on Mar. 15, 2016, which is a continuation of U.S. patent application Ser. No. 14/363,129 filed on Jun. 5, 2014 and issued as U.S. Pat. No. 9,077,994 on Jul. 7, 2015, which, is the U.S. National Stage of International Patent Application No. PCT/US2012/068212 filed on Dec. 6, 2012, which claims priority to U.S. Provisional Patent Application No. 61/567,579 filed Dec. 6, 2011; to U.S. Provisional Patent Application No. 61/674,503 filed Jul. 23, 2012; and to U.S. Provisional Patent Application No. 61/703,449 filed Sep. 20, 2012, all hereby incorporated by reference in their entirety for all purposes. The present application may also be related to U.S. Pat. No. 9,685,139 granted on Jun. 20, 2017, hereby incorporated by reference in its entirety for all purposes.

TECHNOLOGY OF THE INVENTION

The present invention relates generally to image data. More particularly, an embodiment of the present invention relates to perceptual nonlinearity-based image data exchange across different display capabilities.

BACKGROUND OF THE INVENTION

Advances in technology allow modern display designs to render image and video content with significant improvements in various quality characteristics over the same content, as rendered on less modern displays. For example, some more modern displays are capable of rendering content with a dynamic range (DR) that is higher than the standard dynamic range (SDR) of conventional or standard displays.

For example, some modern liquid crystal displays (LCDs) have a light unit (a backlight unit, a side light unit, etc.) that provides a light field in which individual portions may be modulated separately from modulation of the liquid crystal alignment states of the active LCD elements. This dual modulation approach is extensible (e.g., to N-modulation layers wherein N comprises an integer greater than two), such as with controllable intervening layers (e.g., multiple layers of individually controllable LCD layers) in an electro-optical configuration of a display.

In contrast, some existing displays have a significantly narrower dynamic range (DR) than high dynamic range (HDR). Mobile devices, computer pads, game devices, television (TV) and computer monitor apparatus that use typical cathode ray tube (CRT), liquid crystal display (LCD) with constant fluorescent white back lighting or plasma screen technology may be constrained in their DR rendering capability to approximately three orders of magnitude. Such existing displays thus typify a standard dynamic range (SDR), sometimes also referred to as "'low' dynamic range" or "LDR," in relation to HDR.

Images captured by HDR cameras may have a scene-referred HDR that is significantly greater than dynamic ranges of most if not all display devices. Scene-referred HDR images may comprise large amounts of data, and may be converted into post-production formats (e.g., HDMI video signals with 8 bit RGB, YCbCr, or deep color options; 1.5 Gbps SDI video signals with a 10 bit 4:2:2 sampling rate; 3 Gbps SDI with a 12 bit 4:4:4 or 10 bit 4:2:2 sampling rate; and other video or image formats) for facilitating transmission and storage. Post-production images may comprise a much smaller dynamic range than that of scene-referred HDR images. Furthermore, as images are delivered to end users' display devices for rendering, device-specific and/or manufacturer-specific image transformations occur along the way, causing large amounts of visually noticeable errors in rendered images in comparison with the original scene-referred HDR images.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

The present invention is illustrated by way of example, and not by way of limitation, in the figures of the accompanying drawings and in which like reference numerals refer to similar elements and in which:

FIG. 10A illustrates maximums for code errors in units of JNDs in a plurality of code spaces each with a different one of one or more different bit lengths, according to some example embodiments;

FIG. 11 illustrates values of parameters in a functional model, according to an example embodiment.

DESCRIPTION OF EXAMPLE EMBODIMENTS

Figure 1:
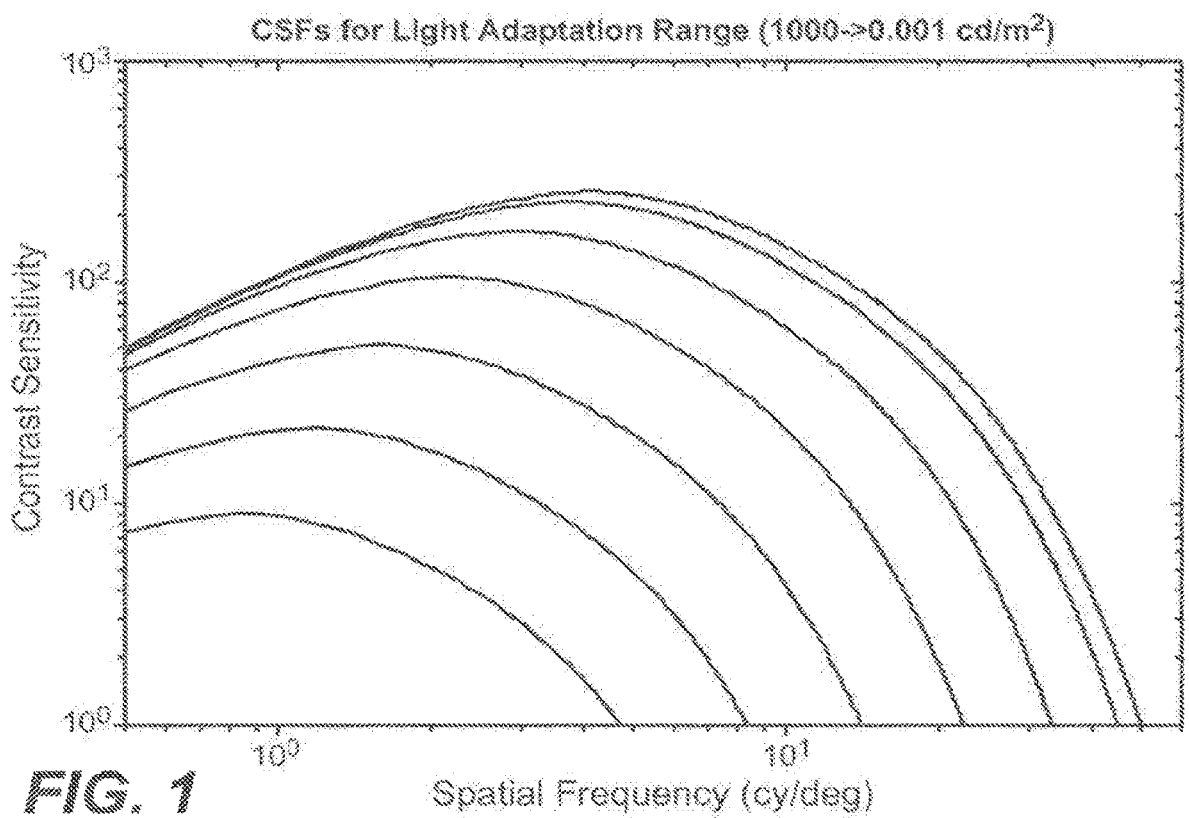
FIG. 1 illustrates an example family of contrast sensitivity function curves that span across a plurality of light adaptation levels, according to an example embodiment of the present invention.

Example embodiments, which relate to perceptual luminance nonlinearity-based image data exchange across displays of different capabilities, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. CONTRAST SENSITIVITY FUNCTION (CSF) MODEL
3. PERCEPTUAL NONLINEARITY
4. DIGITAL CODE VALUES AND GRAY LEVELS
5. MODEL PARAMETERS
6. VARIABLE SPATIAL FREQUENCIES
7. FUNCTIONAL MODELS
8. EXCHANGE IMAGE DATA BASED ON REFERENCE GSDF
9. CONVERTING REFERENCE ENCODED IMAGE DATA
10. EXAMPLE PROCESS FLOWS
11. IMPLEMENTATION MECHANISMS—HARDWARE OVERVIEW
12. ENUMERATED EXAMPLE EMBODIMENTS, EQUIVALENTS, EXTENSIONS, ALTERNATIVES AND MISCELLANEOUS

1. GENERAL OVERVIEW

This overview presents a basic description of some aspects of an embodiment of the present invention. It should be noted that this overview is not an extensive or exhaustive summary of aspects of the embodiment. Moreover, it should be noted that this overview is not intended to be understood as identifying any particularly significant aspects or elements of the embodiment, nor as delineating any scope of the embodiment in particular, nor the invention in general. This overview merely presents some concepts that relate to the example embodiment in a condensed and simplified format, and should be understood as merely a conceptual prelude to a more detailed description of example embodiments that follows below.

Human vision may not perceive a difference between two luminance values if the two luminance values are not sufficiently different from each other. Instead, human vision only perceives a difference if the luminance value differ no less than a just noticeable difference (JND). Due to perceptual nonlinearity of human vision, the amounts of individual JNDs are not uniformly sized or scaled across a range of light levels, but rather vary with different individual light levels. In addition, due to the perceptual nonlinearity, the amounts of individual JNDs are not uniformly sized or scaled across a range of spatial frequencies at a particular light level, but rather vary with different spatial frequencies below a cut-off spatial frequency.

Encoded image data with luminance quantization steps of equal sizes or linearly scaled sizes does not match with perceptual nonlinearity of human vision. Encoded image data with luminance quantization steps at a fixed spatial frequency also does not match with perceptual nonlinearity of human vision. Under these techniques, when code words are assigned to represent quantized luminance values, too many code words may be distributed in a particular region (e.g., the bright region) of the range of light levels, while too few code words may be distributed in a different region (e.g., the dark region) of the range of light levels.

In the overpopulated region, a multitude of code words may not produce perceptual differences, and are, for all practical purposes, therefore wasted. In the underpopulated region, two adjacent code words may produce a perceptual difference much greater than a JND, and possibly produces contour distortion (also known as banding) visual artifacts.

Under techniques as described herein, a contrast sensitivity function (CSF) model may be used to determine JNDs across a wide range (e.g., 0 to 12,000 cd/m$^2$) of light levels. In an example embodiment, the peak JND as a function of spatial frequency at a particular light level is selected to represent a quantum of human perception at the particular light level. The selection of peak JNDs is in accord with the behaviors of human vision that adapts to a heightened level of visual perceptibility when a background of close but different luminance values is being viewed, which is sometimes referred to in video and image display fields as a crispening effect and/or Whittle's Crispening effect and may be described herein as such. As used herein, the term "a light adaption level" may be used to refer to a light level at which a (e.g., peak) JND is selected/determined, assuming that human vision is adapted to the light level. Peak JNDs as described herein vary over spatial frequency at different light adaptation levels.

As used herein, the term "spatial frequency" may refer to a rate of spatial modulation/variation in images (wherein rate is computed in relation to or over spatial distance, in contrast to computing rate in relation to time). In contrast to conventional approaches that may fix spatial frequency at a specific value, the spatial frequency as described herein may vary, for example, in or over a range. In some embodiments, peak JNDs may be limited within a particular spatial frequency range (e.g., 0.1 to 5.0, 0.01 to 8.0 cycles/degrees, or a smaller or larger range).

A reference gray scale display function (GSDF) may be generated based on the CSF model. In some embodiments, a very wide field of view is assumed for the CSF model for generating a reference GSDF that better support entertainment display fields. The GSDF refers to a set of reference digital code values (or reference code words), a set of reference gray levels (or reference luminance values), and a mapping between the two sets. In an example embodiment, each reference digital code value corresponds to a quantum of human perception, as represented by a JND (e.g., a peak JND at a light adaptation level). In an example embodiment, an equal number of reference digital code values may correspond to a quantum of human perception.

The GSDF may be obtained by accumulating JNDs from an initial value. In an example embodiment, a middle code word value (e.g., 2048 for a 12-bit code space) is given as an initial value to a reference digital code. The initial value of the reference digital code may correspond to an initial reference gray level (e.g., 100 cd/m$^2$). Other reference gray levels for other values of the reference digital code may be obtained by positively accumulating (adding) JNDs as the reference digital code is incremented one by one, and by negatively accumulating (subtracting) JNDs as the reference digital code is decremented one by one. In an example embodiment, quantities such as contrast thresholds may be used in computing reference values in the GSDF, in place of JNDs. These quantities actually used in computation of a GSDF may be defined as unitless ratios and may differ from corresponding JNDs only by known or determinable multipliers, dividing factors and/or offsets.

A code space may be selected to include all reference digital code values in the GSDF. In some embodiments, the code space in which all the reference digital code values reside may be one of a 10-bit code space, an 11-bit code space, a 12-bit code space, a 13-bit code space, a 14-bit code space, a 15-bit code space, or a larger or smaller code space.

While a large code space (>15 bits) may be used to host all reference digital code values, in a particular embodiment, the most efficient code space (e.g., 10 bits, 12 bits, etc.) is used to host all reference digital code values generated in a reference GSDF.

The reference GSDF may be used to encode image data, for example, captured or generated by HDR cameras, studio systems, or other systems with a scene-referred HDR that is significantly greater than dynamic ranges of most if not all display devices. The encoded image data may be provided to downstream devices in a wide variety of distribution or transmission methods (e.g., HDMI video signals with 8 bit RGB, YCbCr, or deep color options; 1.5 Gbps SDI video signals with a 10 bit 4:2:2 sampling rate; 3 Gbps SDI with a 12 bit 4:4:4 or 10 bit 4:2:2 sampling rate; and other video or image formats).

In some embodiments, because adjacent reference digital code values in the reference GSDF correspond to gray levels that are within a JND, details for which human vision is capable of distinguishing may be completely or substantially preserved in the image data encoded based on the reference GSDF. A display that fully supports the reference GSDF may possibly render images with no banding or contour distortion artifacts.

Image data encoded based on the reference GSDF (or reference encoded image data) may be used to support a wide variety of less capable displays that may not fully support all reference luminance values in the reference GSDF. Because the reference encoded image data comprises all the perceptual details in the supported luminance range (which may be designed to be a superset of what displays support), reference digital code values may be optimally and efficiently transcoded to display-specific digital code values in a way to preserve as much details as a specific display is capable of supporting and to cause as few visually noticeable errors as possible. Additionally and/or optionally, decontouring and dithering may be performed in conjunction with, or as a part of, transcoding from reference digital code values to display-specific digital code values to further improve image or video quality.

Techniques as described herein are not color-space dependent. They may be used in a RGB color space, a YCbCr color space, or a different color space. Furthermore, techniques that derive reference values (e.g., reference digital code values and reference gray levels) using JNDs which vary with spatial frequency may be applied to a different channel (e.g., one of red, green, and blue channels) other than a luminance channel in a different color space (e.g., RGB) which may or may not comprise a luminance channel. For example, reference blue values may be derived in place of reference gray levels using JNDs which are applicable to the blue color channel Thus, in some embodiments, gray scale may be substituted for color. Additionally and/or optionally, different CSF models may also be used instead of Barten's model. So may different model parameters be used for the same CSF model.

In some embodiments, mechanisms as described herein form a part of a media processing system, including, but not limited to: a handheld device, game machine, television, laptop computer, netbook computer, cellular radiotelephone, electronic book reader, point of sale terminal, desktop computer, computer workstation, computer kiosk, or various other kinds of terminals and media processing units.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. CONTRAST SENSITIVITY FUNCTION (CSF) MODEL

Human visual sensitivity for spatial structures in rendered images may be best described with contrast sensitivity functions (CSFs), which describe contrast sensitivity as functions of spatial frequency (or rate of spatial modulation/variation in images as perceived by a human observer). As used herein, contrast sensitivity, S, may be considered as a gain in human visual neural signal processing, while contrast thresholds, $C_T$, may be determined from the inverse of the contrast sensitivity, for example:

$$\text{Contrast-Sensitivity} = S = 1/C_T \qquad \text{expression (1)}$$

As used herein, the term "contrast threshold" may refer to, or relate to, a lowest value (e.g., a just-noticeable difference) of (relative) contrast necessary for human eyes to perceive a difference in contrast; in some embodiments, contrast thresholds may also be depicted as a function of the just-noticeable difference divided by the light adaptation level across a range of luminance values.

In some embodiments, contrast thresholds may be directly measured in experiments, without use of any CSF model. In some other embodiments, however, contrast thresholds may be determined based on a CSF model. A CSF model may be built with a number of model parameters and may be used to derive a GSDF whose quantization steps in gray levels depend on and vary with light levels characterized by luminance values and spatial frequency. An example embodiment may be implemented based on one or more of a variety of CSF models such as those described in Peter G. J. Barten, *Contrast Sensitivity of the Human Eye and its Effects on Image Quality* (1999) (herein after Barten's model or Barten's CSF model), or Scott Daly, Chapter 17 in *Digital Images and Human Vision*, ed., by A. B. Watson, MIT Press (1993) (hereinafter Daly's model). In relation to example embodiments of the present invention, contrast thresholds used to generate a reference grayscale display function (GSDF) may be derived experimentally, theoretically, with a CSF model, or a combination thereof.

As used herein, a GSDF may refer to a mapping of a plurality of digital code values (e.g., 1, 2, 3, . . . N) to a plurality of gray levels ($L_1, L_2, L_3, \ldots, L_N$), in which the digital code values represent index values of contrast thresholds and the gray levels correspond to the contrast thresholds, as shown in TABLE 1.

TABLE 1

| Digital Code Value | Gray Level (Luminance Value) |
|---|---|
| 1 | $L_1$ |
| 2 | $L_2$ |
| 3 | $L_3$ |
| ... | ... |
| i − 1 | $L_{i-1}$ |
| I | $L_i$ |
| i + 1 | $L_{i+1}$ |
| ... | ... |
| N | $L_N$ |

In an embodiment, a gray level (e.g., $L_i$) corresponding to a digital code value (e.g., i) and an adjacent gray level (e.g., $L_{i+1}$) may be computed in relation to a contrast (e.g., C(i)) as follows:

$$C(i) = (L_{i+1} - L_i)/(L_{i+1} + L_i) \quad \text{expression (2)}$$
$$= (L_{i+1} - L_{mean}(i, i+1))/L_{mean}(i, i+1)$$
$$= \sim 1/2 \Delta L/L$$

wherein C(i) represents a contrast for a luminance range that is bounded between $L_i$ and $L_{i+1}$. $L_{mean}(i, i+1)$ comprise an arithmetic average or mean of the two adjacent gray levels $L_i$ and $L_{i+1}$. The contrast C(i) is arithmetically related to a Weber fraction $\Delta L/L$ by a factor of two. Here, $\Delta L$ represents ($L_{i+1} - L_i$), and L represents one of $L_i$, $L_{i+1}$, or an intermediate value between $L_i$ and $L_{i+1}$.

In some embodiments, a GSDF generator may set the contrast C(i) to a value equal, or otherwise proportional, to a contrast threshold (e.g., $C_T(i)$) at a luminance level L between $L_i$ and $L_{i+1}$, inclusive, as follows:

$$C(i) = k\, C_T(i) \quad \text{expression (3)}$$

wherein k represents a multiplicative constant. In relation to embodiments of the present invention, other descriptive statistics/definitions (e.g., geometric mean, medium, mode, variance, or standard deviation) and/or scaling (×2, ×3, divided or multiplied by a scaling factor, etc.) and/or offsetting (+1, +2, −1, −2, subtracted or added by an offset, etc.) and/or weighting (e.g., assigning the two adjacent gray levels with the same or different weight factors) may be used to relate contrast thresholds with contrasts for the purpose of computing gray levels in a GSDF.

As computed in expressions (1), (2) and (3), contrasts or contrast thresholds may comprise a relative value, and may thus comprise a unitless quantity (e.g., so S may also be unitless).

A CSF model may be built up from basic contrast threshold measurements or computations based on a CSF that depicts the CSF model. Human vision is unfortunately complex, adaptive and nonlinear, so that the there is no single CSF curve that describes the human vision. Instead, a family of CSF curves may be generated based on a CSF model. Even with the same CSF model, different values of model parameters produce different plots for the family of CSF curves.

3. PERCEPTUAL NONLINEARITY

FIG. 1 illustrates an example family of CSF curves that span across a plurality of light adaptation levels. For the purpose of illustration only, the highest CSF curve depicted in FIG. 1 is for a light adaptation level at a luminance value of 1000 candelas per square meter ($cd/m^2$ or 'nits'), and the other decreasing height curves are for light adaptation levels at decreasing luminance values with successive factors of 10 reductions. Notable features readable from the CSF curves are that with increasing luminance (increasing light adaptation levels), the overall contrast sensitivity including the maximum (or peak) contrast sensitivity increases. The peak spatial frequency at which the contrast sensitivity peaks on the CSF curves in FIG. 1 shifts to higher spatial frequencies. Similarly, the max perceptible spatial frequency (cut-off frequency) on the CSF curves, which is the interception of the CSF curves with the horizontal (spatial frequency) axis, also increases.

In an example embodiment, a CSF function that gives rise to a family of CSF curves as illustrated in FIG. 1 may be derived with the Barten's CSF model, which takes into account a number of key effects relating to human perception. An example CSF, S(u), (or the inverse of the corresponding contrast threshold, $m_t$) under the Barten's CSF model may be computed as shown in Expression (4), below.

$$S(u) = \frac{1}{m_t} = \frac{M_{opt}(u)/k}{\sqrt{\frac{2}{T}\left(\frac{1}{X_0^2} + \frac{1}{X_{max}^2} + \frac{u^2}{N_{max}^2}\right)\left(\frac{1}{\eta p E} + \frac{\Phi_0}{1 - e^{-(u/u_0)^2}}\right)}} \quad \text{expression (4)}$$

The example model parameters used in expression (4) above comprise the representations listed below:

2 (the numeric factor) corresponds to binocular vision (4 if monocular);

k represents a signal/noise ratio, for example, 3.0;

T represents an integration time of the eye, for example, 0.1 second;

$X_0$ represents an angular size of object (e.g., in a square shape);

$X_{max}$ represents a maximum angular size of the integration area of the eye (e.g., 12 degrees);

$N_{max}$ represents a maximum number of cycles that are accumulated via probability summation, e.g., 15 cycles;

η represents a quantum efficiency of the eye, e.g., 0.03;

p represents a photon conversion factor;

E represents a retinal illuminance, for example, in Troland units;

$\Phi_0$ represents a spectral density of neural noise, e.g., $3 \times 10^{-8}$ second*$degrees^2$; and $u_0$ represents a maximum spatial frequency for lateral inhibition, e.g., 7 cycles/degrees.

The optical modulation transfer function, $M_{opt}$, may be given as follows:

$$-2\pi^2\sigma^2 u^2 = e \quad \text{expression (5)}$$

where σ represents a model parameter related to pupil and/or light level.

Barten's CSF model as discussed above may be used to describe perceptual nonlinearity relative to luminance Other CSF models may also be used to describe perceptual nonlinearity. For example, Barten's CSF model does not account for the effect of accommodation, which causes a lowering of the cut-off spatial frequency in the high spatial frequency region of the CSF. This lowering effect due to accommodation may be expressed as a function of decreasing viewing distance.

For example, for viewing distances over 1.5 meters, the maximum cutoff spatial frequency as depicted by Barten's CSF model may be achieved, without affecting the effectiveness of Barten's model as an appropriate model to describe perceptual nonlinearity. However, for distances less than 1.5 meters, the effect of accommodation starts to become significant, reducing the accuracy of Barten's model.

Thus, for tablet displays, which have closer viewing distances, such as 0.5 meter, and smartphones, which can have viewing distances as close as 0.125 meter, Barten's CSF model may not be optimally tuned.

In some embodiments, Daly's CSF model, which takes into account the accommodation effect, may be used. In a particular embodiment, Daly's CSF model may be constructed in part based on Barten's CSF, S(u), in expression (4) above, for example, by modifying the optical modulation transfer function, $M_{opt}$, in expression (5).

4. DIGITAL CODE VALUES AND GRAY LEVELS

A GSDF as illustrated in TABLE 1 maps perceptual nonlinearity using the digital code values to represent gray levels tied to contrast thresholds in human vision. The gray levels which comprise all the mapped luminance values may be distributed in such a way that they are optimally spaced to match the perceptual nonlinearity of human vision.

In some embodiments, when the maximum number of gray levels in a GSDF are sufficiently large relative to the maximum range of luminance values, digital code values in the GSDF may be used in a way to achieve the lowest number (e.g., below a total of 4096 digital code values) of gray levels without causing the visibility of the gray level step transition (e.g., visible as a false contour or band in an image; or a color shift in dark regions of an image).

In some other embodiments, a limited number of digital code values may still be used to represent a wide dynamic range of gray levels. For example, when the maximum number of grayscale levels in a GSDF are not sufficiently large relative to the maximum range of the grayscale levels (e.g., digital code values in an 8-bit representation with the range of grayscale levels from 0 to 12,000 nits), the GSDF may still be used in a way to achieve the lowest number (e.g., below a total of 256 digital code values) of gray levels to reduce or minimize the visibility of the gray level step transition. With such a GSDF, amounts/degrees of perceptible errors/artifacts of the step transition may be evenly distributed throughout the hierarchy of a relatively low number of gray levels in the GSDF. As used herein, the term "grayscale level" or "gray level" may be used interchangeably, and may refer to a represented luminance value (a quantized luminance value represented in a GSDF).

Gray levels in a GSDF may be derived by stacking or integrating contrast thresholds across light adaptation levels (at different luminance values). In some embodiments, quantization steps between gray levels may be so chosen that a quantization step between any two adjacent gray levels lands within a JND. A contrast threshold at a particular light adaptation level (or luminance value) may be no more than the just-noticeable difference (JND) at that particular adaptation level. Gray levels may be derived by integrating or stacking fractions of contrast thresholds (or JNDs). In some embodiments, the number of digital code values is more than sufficient to represent all the JNDs in the represented dynamic range of luminance.

Contrast thresholds, or inversely contrast sensitivities, that are used to compute grayscale levels may be selected from a CSF curve at a different spatial frequency other than a fixed spatial frequency for a particular light adaptation level (or luminance value). In some embodiments, each of the contrast thresholds is selected from a CSF curve at a spatial frequency that corresponds to a peak contrast sensitivity (e.g., due to Whittle's crispening effect) for a light adaptation level. In addition, contrast thresholds may be selected from CSF curves at different spatial frequencies for different light adaptation levels.

An example expression to compute/stack the gray levels in the GSDF is as follows:

$$GSDF = \left(\sum_{Lmin} JND\right) \qquad \text{expression (6)}$$

$$JND = 1/S(f, L_A)$$

where f represents the spatial frequency, which may be other than a fixed number under techniques as described herein; and LA represents the light adaptation level. $L_{min}$ may be the lowest luminance value in all the mapped gray levels. As used herein, the term "Nit" or its abbreviation "nt" may relate or refer, synonymously or interchangeably, to a unit of image intensity, brightness, luma and/or luminance that is equivalent or equal to one (1) candela per square meter (1 Nit=1 nt=1 cd/m$^2$). In some embodiments, $L_{min}$ may comprise a value of zero. In some other embodiments, $L_{min}$ may comprise a non-zero value (e.g., a certain dark black level, $10^{-5}$ nit, $10^{-7}$ nit, etc., which may be lower than what display devices are generally able to achieve). In some embodiments, $L_{min}$ may be replaced with other than a minimum initial value, such as an intermediate value, or a maximum value, which allows stacking computations with subtraction or negative addition.

In some embodiments, stacking of the JNDs to derive gray levels in a GSDF is performed by summation, for example, as shown in expression (6). In some other embodiments, an integral may be used in place of the discrete summation. The integral may integrate along an integration path determined from a CSF (e.g., expression (4)). For example, the integration path may comprise peak contrast sensitivities (e.g., different peak sensitivities corresponding to different spatial frequencies) for all light adaptation levels in a (reference) dynamic range for the CSF.

As used herein, an integration path may refer to a visible dynamic range (VDR) curve used to represent human perceptual nonlinearity and to establish a mapping between a set of digital code values and a set of reference gray levels (quantized luminance values). The mapping may be required to meet the criteria that each quantization step (e.g., the luminance difference of two adjacent gray levels in TABLE 1) be less than the JNDs above or below a corresponding light adaptation level (luminance value). The instantaneous derivative (in units of nit/spatial-cycle) of the integration path at a particular light adaptation level (luminance value) is proportional to the JND at the particular adaptation level. As used herein, the term "VDR" or "visual dynamic range" may refer a dynamic range wider than a standard dynamic range, and may include, but is not limited to, a wide dynamic range up to the instantaneously perceivable dynamic range and color gamut which human vision can perceive at an instant.

Based on techniques as described herein, a reference GSDF that is independent of any specific displays or image processing devices may be developed. In some embodiments, one or more model parameters other than light adaptation level (luminance), spatial frequency, and angular size may be set to constant (or fixed) values.

5. MODEL PARAMETERS

In some embodiments, the CSF model is constructed with conservative model parameter values that cover a broad range of display devices. The use of the conservative model parameter values provides smaller JNDs than existing standard GSDFs. Accordingly, in some embodiments, the reference GSDF under the techniques described herein is capable of supporting luminance values with a high precision that exceeds the requirements of these display devices.

In some embodiments, model parameters as described herein include a field-of-vision (FOV) parameter. The FOV parameter may be set to a value of 45 degrees, 40 degrees, 35 degrees, 30 degrees, 25 degrees, or another larger or smaller value that supports a wide range of display devices and viewing scenarios including those used in studios, theaters or high-end entertainment systems.

Model parameters as described herein may include an angular size parameter, which may relate for example to a field of view. The angular size parameter may be set to a value of 45 degrees×45 degrees, 40 degrees×40 degrees, 35 degrees×35 degrees, 30 degrees×30 degrees, 25 degrees×25 degrees, or another larger or smaller value that supports a wide range of display devices and viewing scenarios. In some embodiments, the angular size parameter used in part to derive the reference GSDF is set to n degrees x m degrees, where either of n and m may be a numeric value between 30 and 40, and n and m may or may not be equal.

In some embodiments, a larger angular size (e.g., 40 degrees×40 degrees) is used to produce a reference GSDF with a greater number of grayscale levels and thus more contrast sensitivity. The GSDF may be used to support a wide range of viewing and/or displaying scenarios (e.g., large screen video displays) which may require a wide viewing angle of −30 to 40 degrees. The GSDF having an increased sensitivity due to the selection of large angular size may also be used to support highly variable viewing and/or displaying scenarios (e.g., cinemas). It is possible to select even larger angular sizes; however, raising the angular size significantly above a certain angular size (e.g., 40 degrees) may produce relatively limited marginal benefits.

In some embodiments, a reference GSDF model covers a large luminance range. For example, gray levels, or quantized luminance values, that are represented by the reference GSDF model ranges from 0 or approximately 0 (e.g., $10^{-7}$ cd/m$^2$) to 12,000 cd/m$^2$. The lower bound of the represented luminance values in the reference GSDF model may be $10^{-7}$ cd/m$^2$, or a lower or higher value (e.g., 0, $10^{-5}$, $10^{-8}$, $10^{-9}$ cd/m$^2$, etc.). The GSDF may be used to support a wide range of viewing and/or displaying scenarios with different ambient light levels. The GSDF may be used to support a wide range of display devices with different dark black levels (in theaters, indoor, or outdoor).

The upper bound of the represented luminance values in the reference GSDF model may be 12,000 cd/m$^2$, or a lower or higher value (e.g., 6000-8000, 8000-10000, 10000-12000, 12000-15000 cd/m$^2$, etc.). The GSDF may be used to support a wide range of viewing and/or displaying scenarios with high dynamic ranges. The GSDF may be used to support a wide range of display devices with different maximum luminance levels (HDR TVs, SDR displays, laptops, tablets, handheld devices, etc.).

6. VARIABLE SPATIAL FREQUENCIES

Figure 2:
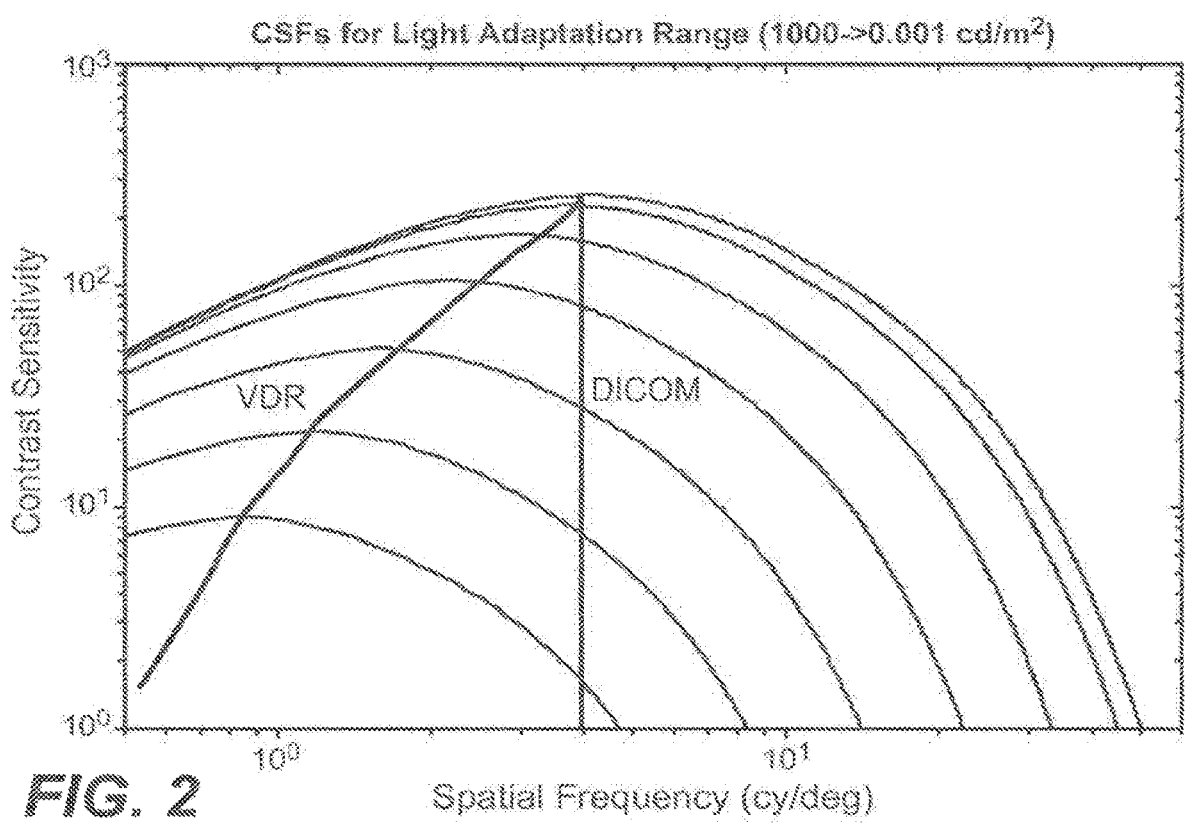
FIG. 2 illustrates an example integration path, according to an example embodiment of the present invention.

FIG. 2 illustrates an example integration path (denoted as VDR) that may be used as an integration path for obtaining gray levels in a reference GSDF as described herein, in accordance with an example embodiment of the present invention. In embodiments, the VDR curve is used to accurately capture the peak contrast sensitivity of human vision over a high dynamic range of luminance values.

As illustrated in FIG. 2, peak contrast sensitivities do not occur at a fixed spatial frequency value, but rather occur at smaller spatial frequencies as light adaptation levels (luminance values) drop. This means that techniques (e.g., DICOM) with a fixed spatial frequency may significantly underestimate contrast sensitivities of human vision for the dark light adaptation levels (low luminance values). Lower contrast sensitivities give rise to higher contrast thresholds, resulting in larger quantization step sizes in quantized luminance values.

Unlike the Digital Imaging and Communications in Medicine (DICOM) standard, a VDR curve under techniques as described herein does not fix the spatial frequency model parameter at a fixed value such as 4 cycles per degree. Rather, the VDR curve varies with the spatial frequency and accurately captures the peak contrast sensitivities of human vision at a plurality of light adaptation levels. The VDR curve properly takes into account the crispening effect due to human vision's adaptability to a wide range of light adaptation levels, and helps generate a high-precision reference GSDF. Here, the term "high-precision" means that perceptual errors due to quantization of luminance values are removed or substantially reduced based on a reference GSDF that best and most efficiently captures human visual nonlinearity within the constraint of a fixed size code space (e.g., one of 10 bits, 12 bits, etc.).

A computation process may be used to calculate gray levels in the reference GSDF (e.g., TABLE 1). In an example embodiment, the computation process is iterative or recursive, repeatedly determines the contrast thresholds (or modulation threshold, for example, $m_t$ in expression 4) from the VDR curve, and applies the contrast thresholds to obtain successive gray levels in the reference GSDF. This computation process may be implemented with the following expressions (7):

$$m_t = \frac{L_{max} - L_{min}}{L_{max} + L_{min}} \text{ so:} \qquad \text{expression (7)}$$

$$L_{j+1} = L_j \frac{1 + m_t}{1 - m_t} \text{ and}$$

$$L_{j-1} = L_j \frac{1 - m_t}{1 + m_t}$$

where j−1, j and j+1 represent indexes to three adjacent digital code values; $L_{j-1}$, $L_j$ and $L_{j+1}$ correspond to gray levels to which the digital code values j−1, j and j+1 are mapped, respectively. $L_{max}$ and $L_{min}$ respectfully represent maximum luminance value and minimum luminance value across a JND or a fraction of a JND. Using a JND or a fraction thereof maintains the high precision of the reference GSDF.

The contrast threshold $m_t$ associated with the JND may be defined as a relative quantity, e.g., a difference between $L_{max}$ and $L_{min}$, as divided by a particular luminance value of either $L_{max}$ or $L_{min}$, or in between $L_{max}$ and $L_{min}$ (e.g., an average of $L_{max}$ and $L_{min}$). In some embodiments, $m_t$ may be alternatively defined as the difference between $L_{max}$ and $L_{min}$, as divided by a multiplier (e.g., 2) of a particular luminance value of either $L_{max}$ or $L_{min}$, or in between $L_{max}$ and $L_{min}$. In quantizing luminance values in a GSDF to a plurality of gray levels, $L_{max}$ and $L_{min}$ may refer to adjacent gray levels in the plurality of gray levels. As a result, $L_1$ may be related to $L_{j-1}$ and $L_{j+1}$ through $m_t$, respectively, as shown in expression (7).

In alternative embodiments, instead of using linear expressions as illustrated in expression (7), non-linear expression may be used to relate JNDs or contrast thresholds with gray levels. For example, an alternative expression based on the standard deviation divided by the mean may be used in place of a simple ratio for the contrast threshold as illustrated.

In some embodiments, a reference GSDF covers a range of 0 to 12,000 cd/m² with digital code values represented as 12-bit integer value. To further improve the precision of the reference GSDF, $m_t$ may be multiplied with a fraction value f. Furthermore, a center digital value L2048 (note that the digital code values are at least limited to 0 and 4096 as in a 12-bit code space that is compatible with SDI) may be mapped to 100 cd/m². Expression (7) may yield the following expressions (8):

$$L_{2048} = 100 \text{ cd}/m^2$$

$$L_{j+1} = L_j \frac{1 + f * m_t}{1 - f * m_t} \text{ and}$$

$$L_{j-1} = L_j \frac{1 - f * m_t}{1 + f * m_t}$$

expression (8)

wherein the fraction value f is set to 0.918177. In the example embodiment, the minimum allowed value for the digital codes is set to code word (or integer value) 16 is set to 0 (cd/m²). The second lowest digital code value 17 ends up at $5.27 \times 10^{-7}$ cd/m², while the digital code value 4076 ends up at 12,000 cd/m².

Figure 3:
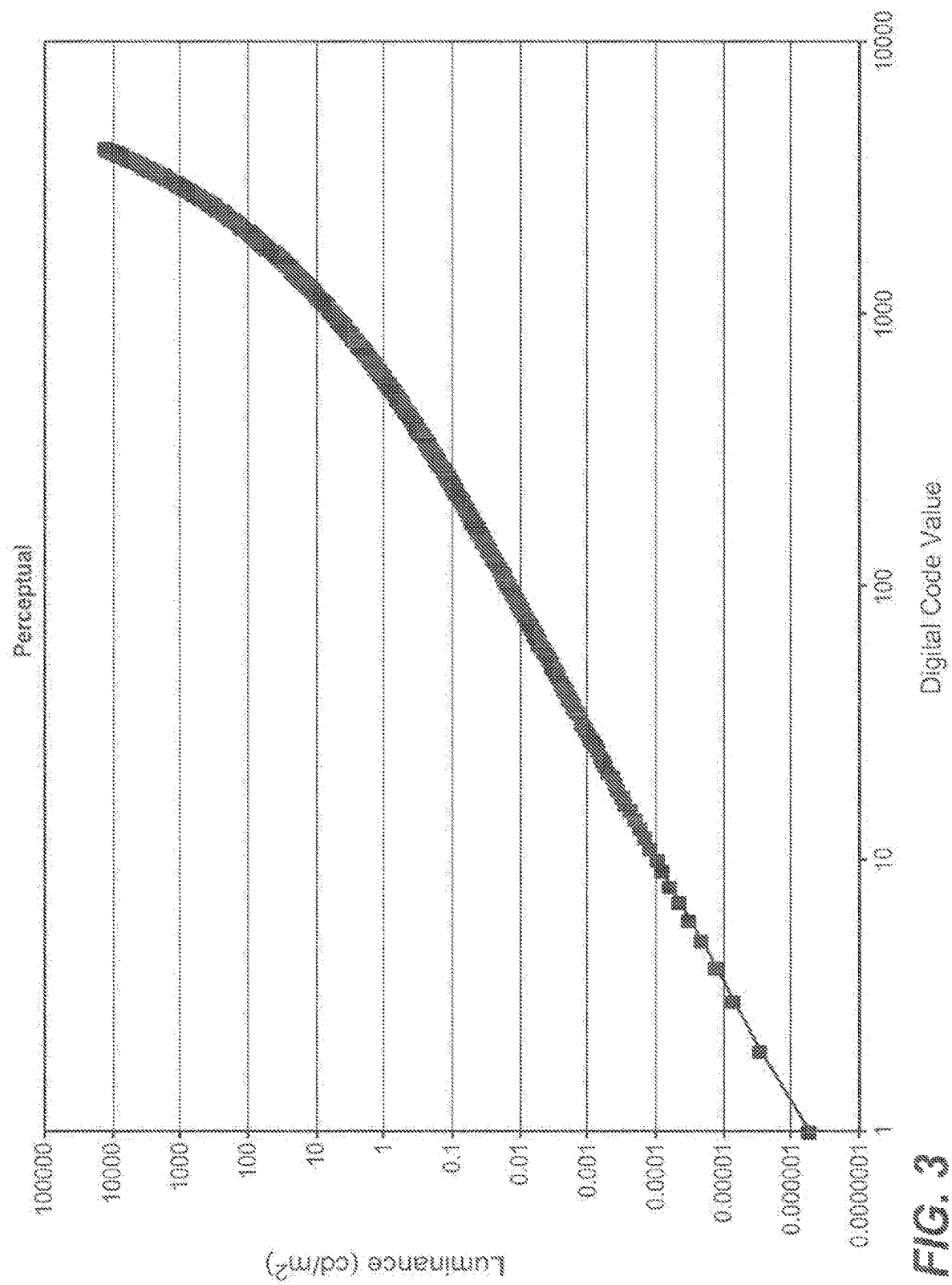
FIG. 3 illustrates an example gray scale display function, in accordance with an example embodiment of the present invention.

FIG. 3 illustrates an example GSDF that maps between a plurality of gray levels (in logarithmic luminance values) and a plurality of digital code values in a 12-bit code space, in accordance with an example embodiment of the present invention.

Figure 4:
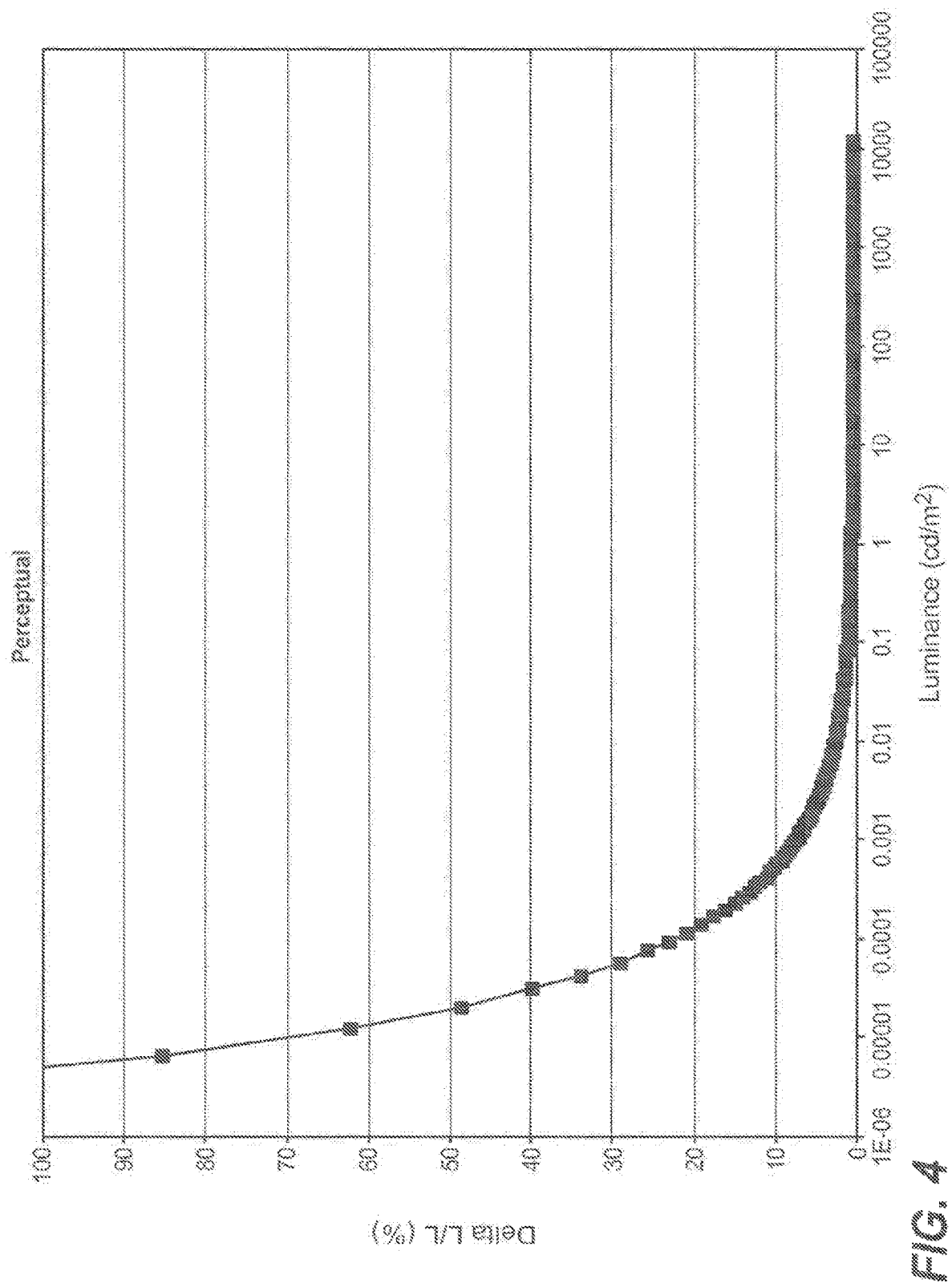
FIG. 4 illustrates a curve depicting Weber fractions, according to an example embodiment of the present invention.

FIG. 4 illustrates a curve depicting Weber fractions (Delta L/L, or ΔL/L) based on gray levels of the example GSDF of FIG. 3. Perceptual nonlinearity of human vision as illustrated by FIG. 4 is represented as a function of luminance values on a logarithmic luminance axis. Comparable visual differences (e.g., JNDs) of human vision correspond to larger Delta L/L values at lower luminance values. The curve of Weber fractions asymptotes to a constant value for high luminance values (e.g., a Weber fraction of 0.002 where Weber's law is met at higher luminance values).

7. FUNCTIONAL MODELS

One or more analytical functions may be used to obtain a mapping between digital code values and gray levels in a GSDF (reference GSDF or device-specific GSDF) as described herein. The one or more analytical functions may be proprietary, standard-based, or extensions from standard-based functions. In some embodiments, a GSDF generator (e.g., 504 of FIG. 5) may generate a GSDF in the form of one or more forward look-up tables (LUTs) and/or one or more inverse LUTs based on the one or more analytical functions (or formulas). At least some of these LUTs may be provided to a variety of image data codecs (e.g., 506 of FIG. 5) or a wide variety of display device to be used in converting between reference gray levels and reference digital code levels for the purpose of encoding reference image data. Additionally, optionally, or alternatively, at least some of the analytical functions (with their coefficients in integer or floating point representations) may be directly provided to image data codecs or a wide variety of display device to be used in obtaining mappings between digital code values and gray levels in a GSDF as described herein and/or converting between gray levels and digital code levels for the purpose of encoding image data.

In some embodiments, analytical functions as described herein comprise a forward function that may be used to predict a digital code value based on a corresponding gray level, as follows:

$$D = \left[ \frac{c_1 + c_2 L^n}{1 + c_3 L^n} \right]^m$$

expression (9)

where D represents a (e.g., 12 bit) value of digital code, L represents a luminance value or gray level in nits, n may represent a slope in a middle section of a log D/log L curve as given by expression (9), m may represent the sharpness of the knee of the log D/log L curve, and c1, c2 and c3 may define the end and middle points of the log D/log L curve.

In some embodiments, the analytical functions comprise an inverse function that corresponds to the forward function in expression (9) and may be used to predict a luminance value based on a corresponding digital code value, as follows:

$$L = \left[ \frac{D^{1/m} - c_1}{c_2 - c_3 D^{1/m}} \right]^{1/n}$$

expression (10)

Digital code values predicted based on a plurality of luminance values using expression (9) may be compared with observed digital code values. The observed digital code values may be, but are not limited only to any of, numeric calculation based on a CSF model as previously discussed. In an embodiment, a deviation between the predicted digital code values and the observed digital code values may be computed and minimized to derive optimal values of the parameters n, m, $c_1$, $c_2$, and $c_3$ in expression (9).

Likewise, luminance values predicted based on a plurality of digital code values using expression (10) may be compared with observed luminance values. The observed luminance values may, but are not limited to, be generated using numeric computations based on a CSF model as previously discussed, or using human visual experimentation data. In an embodiment, the deviation between the predicted luminance values and the observed luminance values may be derived as a function of the parameters n, m, $c_1$, $c_2$, and $c_3$ and minimized to derive optimal values of the parameters n, m, $c_1$, $c_2$, and $c_3$ in expression (10).

A set of optimal values of the parameters n, m, $c_1$, $c_2$, and $c_3$ as determined with expression (9) may or may not be the same as a set of optimal values of the parameters n, m, $c_1$, $c_2$, and $c_3$ as determined with expression (10). In case of differences between the two sets, one or both of the two sets may be used to generate a mapping between digital code values and luminance values. In some embodiments, the two sets of optimal values of the parameters n, m, $c_1$, $c_2$, and $c_3$, if different, may be harmonized, for example, based on minimization of round trip errors, which are introduced by performing both forward and inverse coding operations with both expressions (9) and (10). In some embodiments, multiple round trips may be made to study resultant errors in digital code values and/or in luminance values or gray levels. In some embodiments, selection of the parameters in expressions (9) and (10) may be based at least in part on a criterion that no significant error occurs in one, two, or more round trips. Examples of no significant round trip errors may include, but are not limited only to any of, errors smaller than 0.0001%, 0.001%, 0.01%, 0.1%, 1%, 2%, or other configurable values.

Embodiments include using a code space of one of one or more different bit lengths to represent digital control values. Optimized values of the parameters in expressions (9) and (10) may be obtained for each of a plurality of code spaces each with a different one of one of one or more different bit lengths. Based on the optimized values of expressions (9) and (10), distributions of code errors (e.g., forward transformation errors, inverse transformation errors or round trip errors in digital code values based on expressions (9) and (10)) may be determined. In some embodiments, a numeric difference of one (1) in two digital code values corresponds to a contrast threshold (or corresponds to a JND) at a light level between two luminance values represented by the two digital code values. FIG. 10A illustrates maximums for code errors in units of JNDs in a plurality of code spaces each with a different one of one of one or more different precisions (with different bit lengths), according to some example embodiments. For example, based on functional models as described herein, the maximum code error for a code space of infinite or unlimited bit length is 11.252. In comparison, based on a functional model as described herein, the maximum code error for a code space of a 12 bit length (or 4096) is 11.298. This indicates that a code space of a 12 bit length for digital code values is an excellent choice with a functional model as represented by expressions (9) and (10).

Figure 10B:
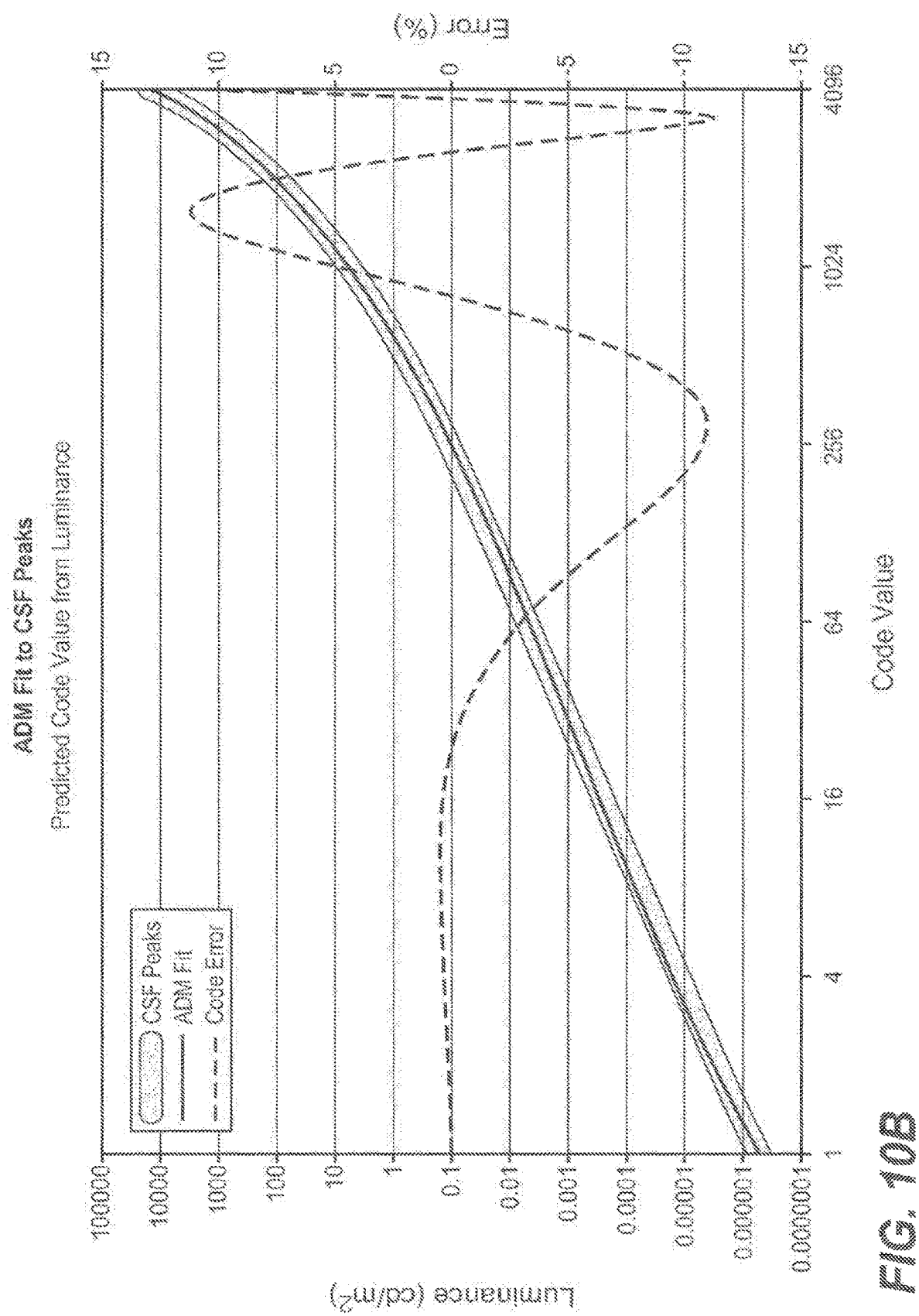
FIG. 10B through FIG. 10E illustrate distributions of code errors, according to some example embodiments.
Figure 10C:
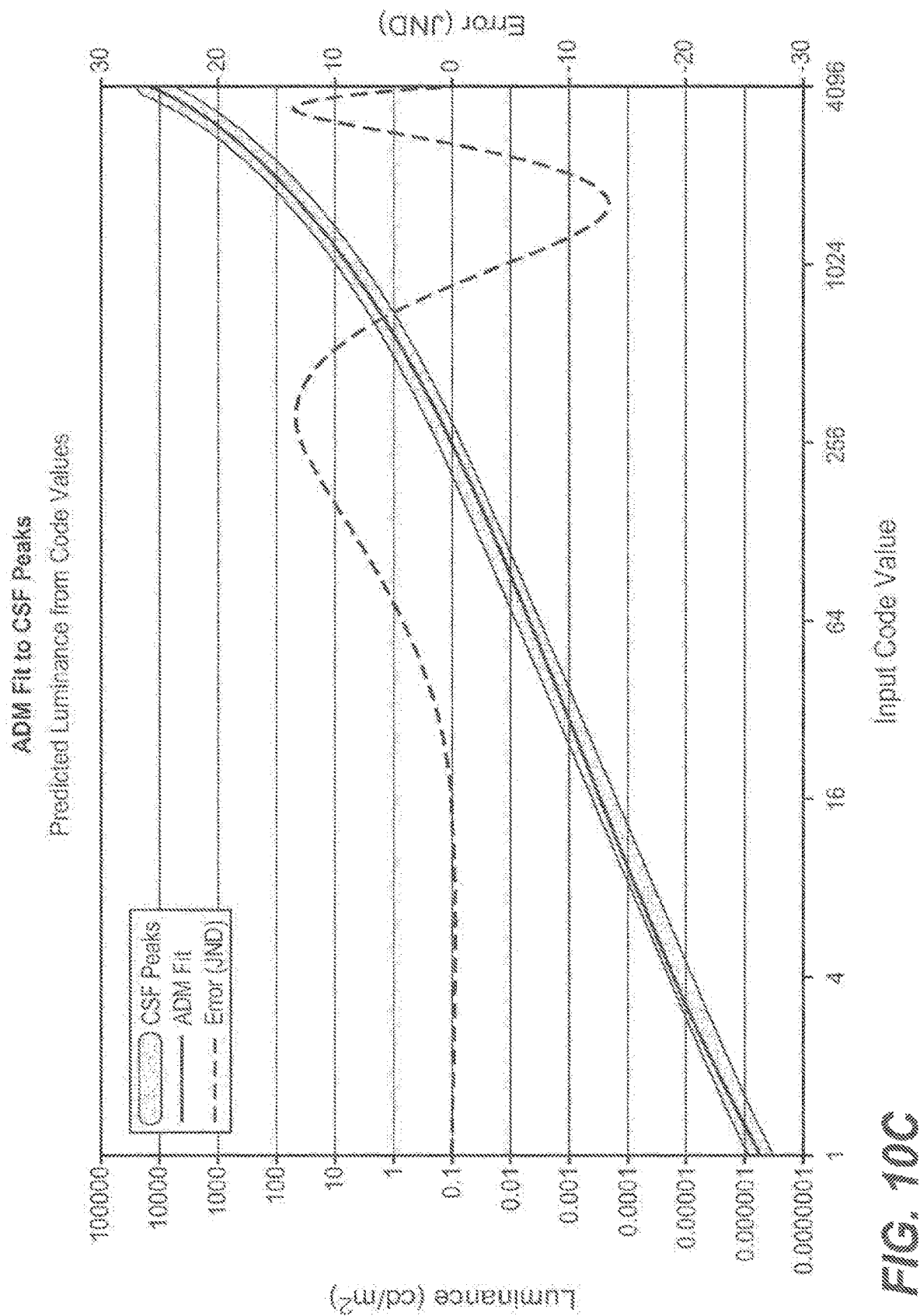

FIG. 10B illustrates a distribution of code errors for a code space of the 12 bit length (or 4096) with a forward transformation (from luminance values to digital code values) as specified by expression (9), according to an example embodiment. FIG. 10C illustrates a distribution of code errors for a code space of the 12 bit length (or 4096) with a backward transformation (from digital code values to luminance values) as specified by expression (10), according to an example embodiment. Both FIG. 10B and FIG. 10C indicate maximum code errors of less than 12.5.

FIG. 11 illustrates values of parameters that may be used in expressions (9) and (10), according to an example embodiment. In some embodiments, as illustrated, integer-based formulas may be used to represent/approximate these non-integer values in a specific implementation of a functional model as described herein. In some other embodiments, fixed point, floating point values with one of one or more precisions (e.g., 14-, 16-, or 32 bits) may be used to represent these non-integer values in a specific implementation of a functional model as described herein.

Figure 10D:
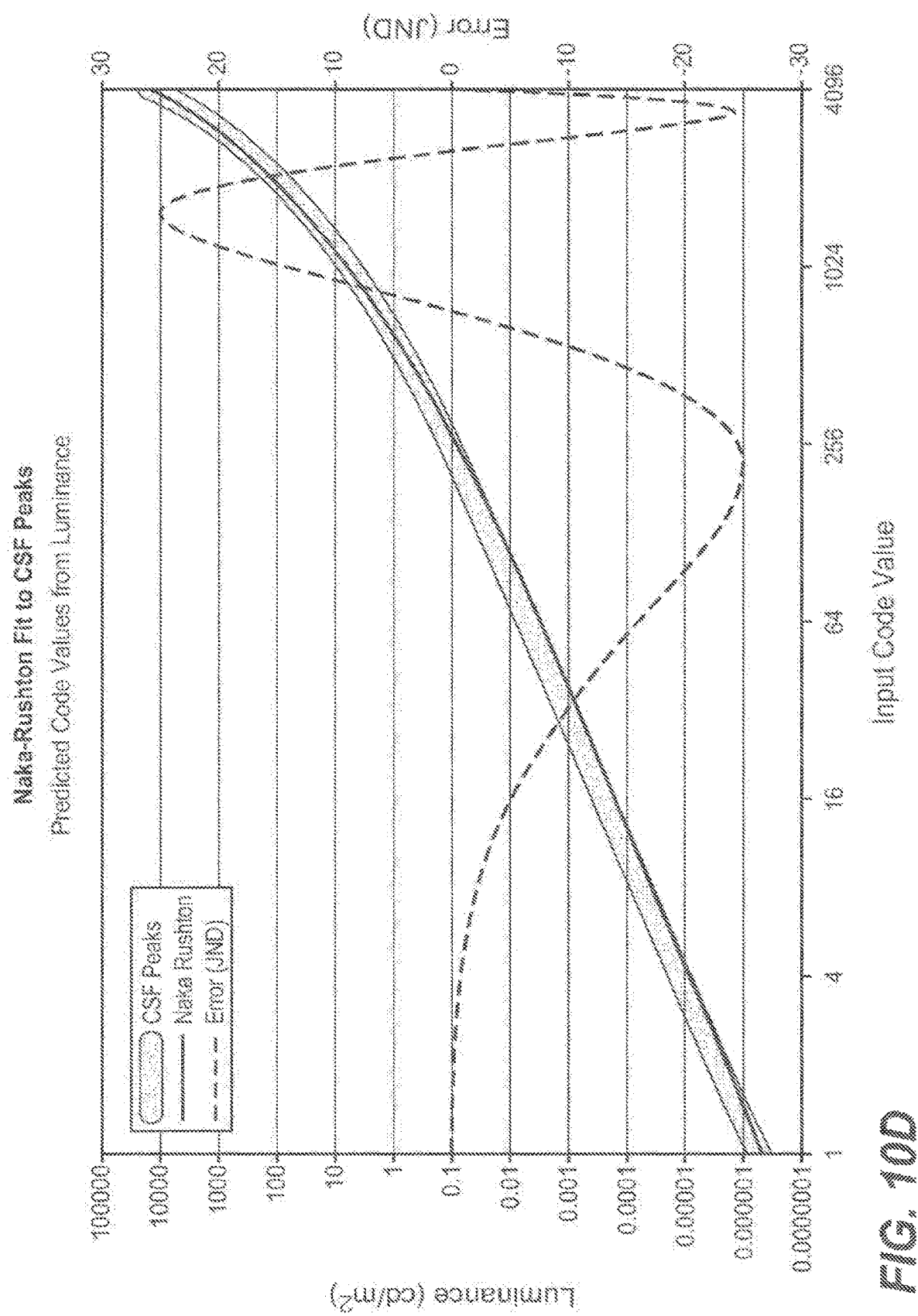

Embodiments include using a functional model with formulas other than those (which may be tone-mapping curves) given in expressions (9) and (10). For example, a cone model with a Naka-Rushton formula as follows may be used by a functional model as described herein:

$$L_d = \left[ L_d^{max}\left(\frac{L^n}{\sigma + L^n}\right)\right]^m \qquad \text{expression (11)}$$

wherein L represent luminance values, n, m and σ represent model parameters in association with the cone model, and, $L_d$ represents predicted values that may be encoded with digital code values. Similar methods of obtaining model parameters through minimizing deviations may be used to derive optimal values of the model parameters for expression (11). FIG. 10D illustrates a distribution of code errors for a code space of the 12 bit length (or 4096) with a forward transformation (from luminance values to digital code values) as specified by expression (11), according to an example embodiment. In an embodiment, the maximum code error as illustrated in FIG. 10D is 25 JNDs.

Figure 10E:
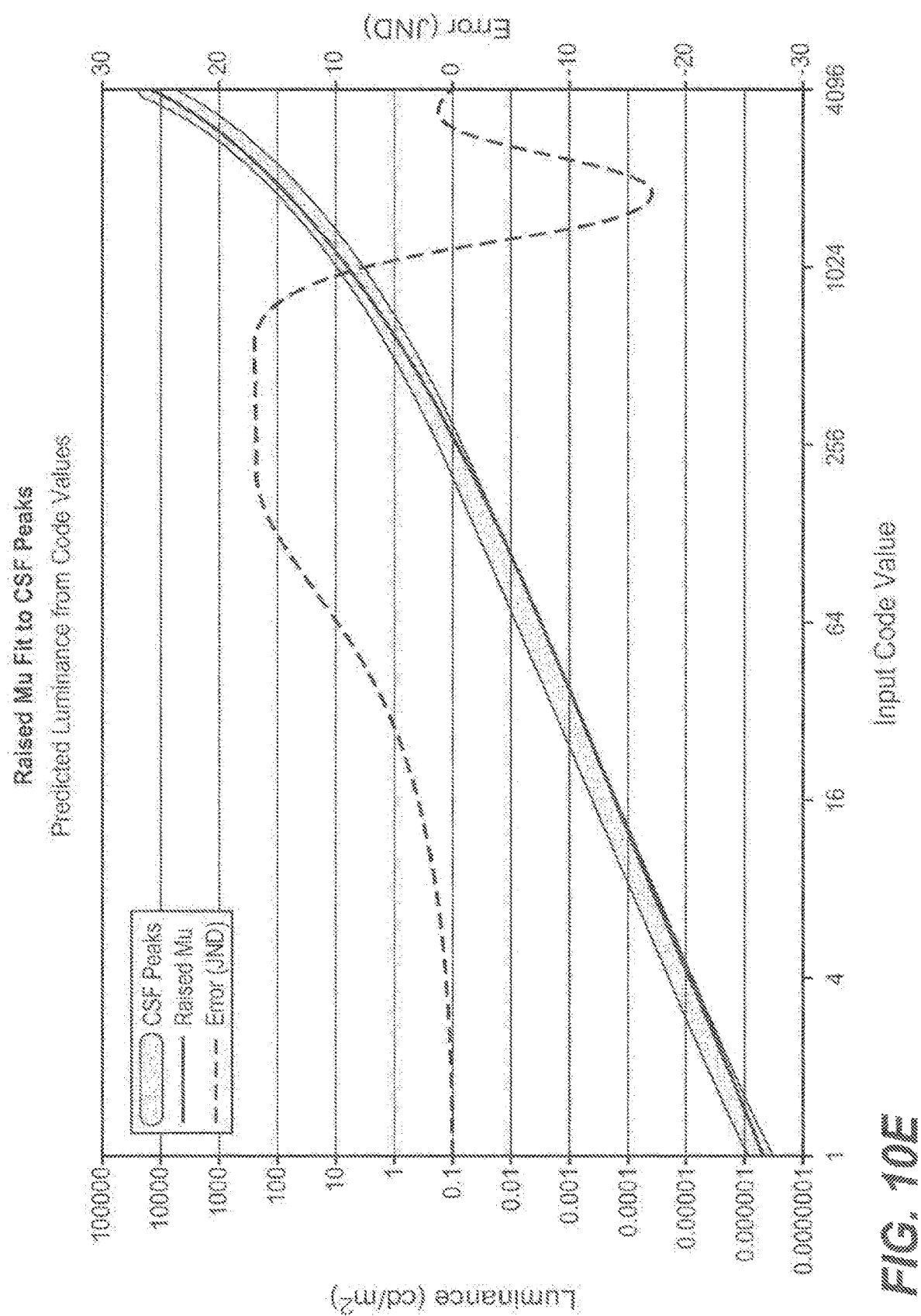

In another example, a functional model may be generated with a Raised mu formula as follows:

$$y = (1 + \mu)^{x^{1+(1-x)^{6.2}}} \qquad \text{expression (12)}$$

wherein x represents luminance values, and y represents predicted digital code values. An optimal value of the model parameter μ may be obtained through minimizing deviations. FIG. 10E illustrates a distribution of code errors for a code space of the 12 bit length (or 4096) with a forward transformation (from luminance values to digital code values) as specified by expression (12), according to an example embodiment. In an embodiment, the maximum code error as illustrated in FIG. 10D is 17 JNDs.

As illustrated herein, in some embodiments, a functional model may be used to predict code values from luminance values or predict luminance values from code values. Formulas used by the functional model may be invertible. Same or similar processing logic may be implemented to perform forward and inverse transformation between these values. In some embodiments, model parameters including but not limited only to any of exponents may be represented by fixed-point values or integer-based formulas. Thus, at least a part of the processing logic may be efficiently implemented in hardware only, software only, or a combination of hardware and software. Similarly, at least a part of LUTs generated with the functional model or model formulas (such as expressions (9) through (12)) may be efficiently implemented in hardware only, software only, or a combination of hardware and software (including ASIC or FPGA). In some embodiments, one, two, or more functional models may be implemented in a single computing device, a configuration of multiple computing devices, a server, etc. In some embodiments, errors in predicted code values may be within 14 code values of target or observed values over a full range of visible dynamic range of luminance values. In some embodiments, this holds true for both forward and inverse transformations. Same or different sets of model parameters may be used in forward and inverse transformations. Round-trip accuracy may be maximized with optimal values of the model parameters. Different code spaces may be used. In particular embodiment a code space of 12 bit length (4096)

may be used to host digital code values with minimal code errors across the full range of visible dynamic range.

As used herein, a reference GSDF may refer to a GSDF comprising reference digital code values and reference gray levels as related under a functional model (the model parameters of which may be determined with target or observed values under a CSF model), as determined with numeric computations (e.g., without determining any functional representation of a mapping between digital code values and luminance values) based on a CSF model, or as determined with data from human visual studies. In some embodiments, a device GSDF may also comprise a mapping between digital code values and gray levels that may be analytically represented with a functional model as described herein.

8. EXCHANGE IMAGE DATA BASED ON REFERENCE GSDF

For the purpose of illustration, it has been described that digital code values reside in a 12 bit code space. The present invention, however, is not so limited. Digital code values with different code spaces (e.g., different bit depths other than 12 bits) may be used in a reference GSDF. For example, 10 bit integer values may be used to represent digital codes. Instead of mapping a digital code value 4076 to a luminance value 12000 cd/m$^2$ in a 12-bit representation of digital codes, a digital code value 1019 may be mapped to the luminance value 12000 cd/m$^2$ in a 10-bit representation of digital codes. Thus, these and other variations in code spaces (bit depths) may be used for digital code values in a reference GSDF.

The reference GSDF may be used to exchange image data across different GSDFs which may be individually designed for each type of image acquisition device or image rendering device. For example, a GSDF implemented with a specific type of image acquisition device or image rendering device may implicitly or explicitly depend on model parameters that do not match model parameters of a standard GSDF or a device-specific GSDF with another type of image acquisition device or image rendering device.

A reference GSDF may correspond to curve shapes as depicted in FIG. 3 and FIG. 4. Generally speaking, the shapes of GSDFs depend on parameters used to derive or design the GSDFs. Hence, a reference GSDF depends on a reference CSF model and reference model parameters used to generate the reference GSDF from the reference CSF model. The curve shape of a device-specific GSDF depends on the specific device, including display parameters and viewing conditions if the specific device is a display.

In an example, a display whose supported range of luminance values is limited to less than 500 cd/m$^2$ may not experience the increase in slope at a high luminance value region (which occurs when the human vision shifts to a logarithmic behavior for all frequencies) as shown in FIG. 3. Driving the display with a curve shape of FIG. 3 may lead to nonoptimal (e.g., suboptimal) allocation of gray levels, with too many gray levels allocated in the bright regions, and not enough allocated in the dark regions.

In another example, a low contrast display is designed to be used outdoors in various daylight conditions. The display's luminance range may occur largely or almost entirely in the log behavior region of FIG. 3. Driving this low contrast display with a curve shape of FIG. 3 may also lead to nonoptimal (suboptimal) allocation of gray levels, with too many gray levels allocated in the dark regions, and not enough allocated in the bright regions.

Under techniques as described herein, each display may use its specific GSDF (dependent on not only the display parameters, but also on the viewing conditions which, for example, affect the actual black level) to optimally support perceptual information in image data encoded with a reference GSDF. The reference GSDF is used by one or more upstream (e.g., encoding) devices for the overall encoding of image data to preserve perceptual details as much as possible. The image data encoded in the reference GSDF is then delivered to one or more downstream (e.g., decoding) devices. In an example embodiment, encoding of image data based on the reference GSDF is independent of specific devices that are to subsequently decode and/or render the image data.

Each device (e.g., display) has its specific GSDF where device-specific gray levels are supported/optimized. The specific gray levels may be known to the maker of the display, or may have been specifically designed by the maker to support the device-specific GSDF (which may or may not be standard based). The line driver of the device may be implemented with quantized luminance values specific to the device. Optimization may be best done for the device based on the quantized luminance values specific to the device. Additionally, the dark black level (e.g., the lowest device-specific gray level), which may be used as the lower bound to the range of device-specific gray levels, may be set based in part on the present ambient light level and/or the device's optical reflectivity (which may be known to the maker). Once the dark black level is so set, device-specific gray levels may be obtained or set by implicitly or explicitly accumulating (e.g., stacking/integrating) quantization steps in the line driver of the device. The derivation and/or adjustment of gray levels may or may not be done at runtime when the device is concurrently rendering images.

Thus, under techniques as described herein, embodiments of the present invention may include, but are not limited only to, encoding image data with a reference GSDF and decoding and rendering the image data with a display-specific GSDF.

Figure 5:
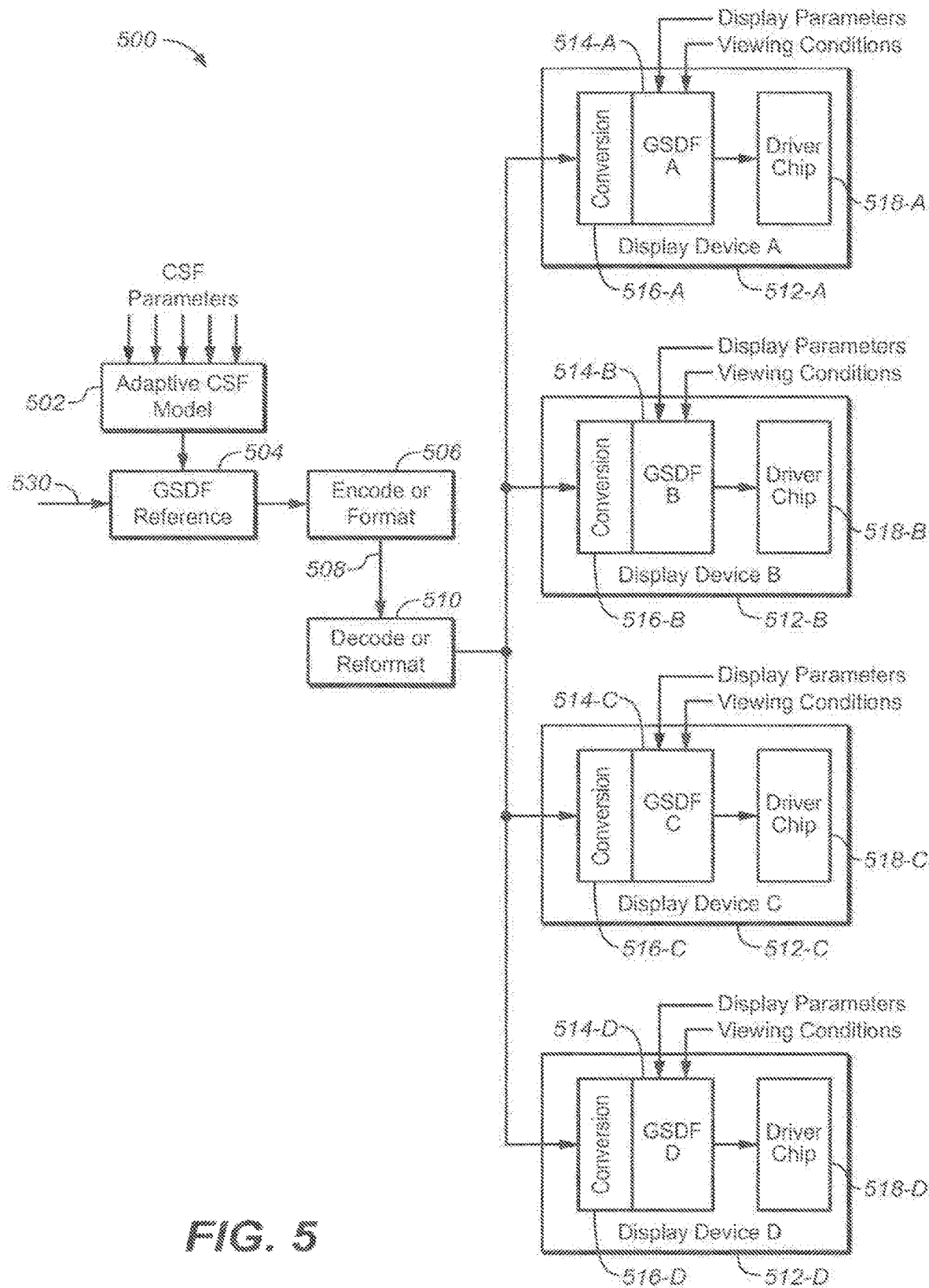
FIG. 5 illustrates an example framework of exchange image data with devices of different GSDFs, according to an example embodiment of the present invention.

Techniques as described herein may be used to exchange image data across a variety of devices with different GSDFs. FIG. 5 illustrates an example framework (500) of exchange image data with devices of different GSDFs, in accordance with an example embodiment of the present invention. As illustrated in FIG. 5, an adaptive CSF model (502) may be used to generate a reference GSDF (504). The term "adaptive" may refer to the adaptability of a CSF model to human visual nonlinearity and behaviors. The adaptive CSF model may be built based at least in part on a plurality of CSF parameters (or model parameters). The plurality of model parameters include, for example, light adaptation level, display area in degree width, noise level, accommodation (physical viewing distance), luminance or color modulation vector (which may be, for example, related to test images or image patterns used in the adaptive CSF model (502)).

An upstream (e.g., encoding) device may receive image data to be encoded with the reference GSDF (504) before the image data or its derivative is transmitted or distributed to downstream (e.g., decoding) devices. The image data to be encoded may initially be in any of a plurality of formats (standard based, proprietary, extension thereof, etc.) and/or may be derived from any of a plurality of image sources (camera, image server, tangible media, etc.). Examples of image data to be encoded include, but are not limited only to, raw or other high bit-depth image(s) 530. The raw or other high bit-depth image(s) may come from a camera, a studio system, an art director system, another upstream image processing system, an image server, a content database, etc. The image data may include, but is not limited only to, that of digital photos, video image frames, 3D images, non-3D images, computer-generated graphics, etc. The image data may comprise scene-referred images, device-referred images, or images with various dynamic ranges. Examples of image data to be encoded may include a high-quality version of original images that are to be edited, down-sampled, and/or compressed, along with metadata, into a coded bitstream for distribution to image receiving systems (downstream image processing system such as displays of various makers). The raw or other high bit-depth image(s) may be of a high sampling rate used by a professional, an art studio, a broadcast company, a high-end media production entity, etc. Image data to be encoded may also be in whole or in part computer generated, or may even be obtained based in whole or in part from existing image sources such as old movies and documentaries.

As used herein, the phrase "image data to be encoded" may refer to image data of one or more images; the image data to be encoded may comprise floating-point or fixed-point image data, and may be in any color space. In an example embodiment, the one or more images may in an RGB color space. In another example embodiment, the one or more images may be in a YUV color space. In an example, each pixel in an image as described herein comprises floating-point pixel values for all channels (e.g., red, green, and blue color channels in the RGB color space) defined in the color space. In another example, each pixel in an image as described herein comprises fixed-point pixel values for all channels (e.g., 16 bits or higher/lower numbers of bits fixed-point pixel values for red, green, and blue color channels in the RGB color space) defined in the color space. Each pixel may optionally and/or alternatively comprise downsampled pixel values for one or more of the channels in the color space.

In some embodiments, in response to receiving the image data to be encoded, an upstream device in the framework (500) maps luminance values as specified by or determined from the image data to reference digital code values in the reference GSDF, and generates, based on the image data to be encoded, reference encoded image data encoded with the reference digital code values. The mapping operation, from the luminance values based on the image data to be encoded to the reference digital code values, may include selecting reference digital code values whose corresponding reference gray levels (e.g., as shown in TABLE 1) match, or approximate as closely as any other reference luminance values in the reference GSDF, the luminance values as specified by or determined from the image data to be encoded and replacing the luminance values with the reference digital code values in the reference encoded image data.

Additionally, optionally or alternatively, preprocessing and post processing steps (which may include, but are not limited only to, color space conversion, down sampling, upsampling, tone mapping, color grading, decompression, compression, etc.) may be performed as a part of generating the reference encoded image data.

In an example embodiment, the framework (500) may comprise software and/or hardware components (e.g., an encode or format unit (506)) configured to encode and/or format the reference encoded image data into one or more coded bitstreams or image files. The coded bitstreams or image files may be in a standard-based format, a proprietary format, or an extension format based at least in part on a standard-based format. Additionally and/or optionally, the coded bitstreams or image files may comprise metadata containing one or more of related parameters (e.g., model parameters; minimum luminance value, maximum luminance value, minimum digital code value, maximum digital code value, etc., as illustrated in TABLE 1, FIG. 3 and FIG. 4; an identifying field that identifies a CSF among a plurality of CSFs; reference viewing distance) related to the reference GSDF, pre-processing or post processing used to generate the reference encoded image data.

In some embodiments, the framework (500) may comprise one or more discrete upstream devices. For example, at least one of the one or more upstream devices in the framework (500) may be configured to encode image data based on the reference GSDF. The upstream devices may comprise software and/or hardware components configured to perform the functionality related to 502, 504, and 506, of FIG. 5. The coded bitstreams or image files may be outputted by the upstream devices (502, 504, and 506, of FIG. 5) through network connections, digital interfaces, tangible storage media, etc., and delivered in an image data flow (508) to other image processing devices for processing or rendering.

In some example embodiments, the framework (500) further comprises one or more downstream devices as one or more discrete devices. The downstream devices may be configured to receive/access, from the image data flow (508), the coded bitstreams or image files outputted by the one or more upstream devices. For example, the downstream devices may comprise software and/or hardware components (e.g., a decode or reformat unit (510)) configured to decode and/or reformat the coded bitstreams and image files, and recover/retrieve the reference encoded image data therein. As illustrated in FIG. 5, the downstream devices may comprise a diverse set of display devices.

In some embodiments, a display device (not shown) may be designed and/or implemented to support the reference GSDF. High-precision HDR image rendering may be provided if the display device supports each and every gray level in the reference GSDF. The display device may render images at details at a finer level than, or at the same level as, what human vision may possibly detect.

In some embodiments, a display device's native digital code values (which may be implemented as digitized voltage values, e.g., digital drive levels or DDLs, in the display system) in a device-specific GSDF may correspond to device-specific gray levels (or luminance values) different from those in the reference GSDF. The device-specific gray levels may be designed to support sRGB, Rec. 709, or other specifications including those using representations related to complementary densities. Additionally, optionally, or alternatively, the device-specific gray levels may be based on the essential DAC characteristics of display driving.

In some embodiments, a display device A (512-A) may be designed and/or implemented to support a device-specific GSDF A (514-A) of a visible dynamic range (VDR) display. GSDF A (514-A) may be based on a bit depth of 12 bits (a 12 bit code space) for device-specific digital code values, a 10,000:1 contrast ratio (CR), and a >P3 gamut. GSDF A (514-A) may support gray levels within a first sub-range (e.g., 0 to 5,000 cd/m$^2$) in the entire range of the reference GSDF (504). Alternatively and/or optionally, GSDF A (514-A) may support the entire range (0 to 12,000 cd/m$^2$, for example) in the reference GSDF (504) but may comprise fewer than all the reference gray levels in the reference GSDF (504).

In some embodiments, a display device B (512-B) may be designed and/or implemented to support a device-specific GSDF B (514-B) for a dynamic range narrower than the VDR. For example, display device B (512-B) may be a standard dynamic range (SDR) display. As used herein, the terms "standard dynamic range" and "low dynamic range," and/or their corresponding abbreviations "SDR" and "LDR" may be used synonymously and/or interchangeably. In some embodiments, GSDF B (514-B) may support a bit depth of 8 bits for device-specific digital code values, a 500-5,000:1 contrast ratio (CR), and a color gamut as defined in Rec. 709. In some embodiments, GSDF B (514-B) may provide gray levels within a second sub-range (e.g., 0 to 2000 cd/m$^2$) of the reference GSDF (504).

In some embodiments, a display device C (512-C) may be designed and/or implemented to support a device-specific GSDF C (514-C) for a dynamic range even narrower than the SDR. For example, display device C (512-C) may be a tablet display. In some embodiments, GSDF C (514-C) may support a bit depth of 8 bits for device-specific digital code values, a 100-800:1 contrast ratio (CR), and a color gamut smaller than that defined in Rec. 709. In some embodiments, GSDF C (514-C) may support gray levels within a third sub-range (e.g., 0 to 1,200 cd/m$^2$) of the reference GSDF (504).

In some embodiments, a display device (e.g., display device D (512-D)) may be designed and/or implemented to supports a device-specific GSDF (e.g., GSDF D (514-D)) for a very limited dynamic range much narrower than the SDR. For example, display device D (512-D) may comprise an e-paper display. In some embodiments, GSDF D (514-D), may support a bit depth of 6 bits or less for device-specific digital code values; a contrast ratio (CR) of 10:1 or less, and a color gamut much smaller than that defined in Rec. 709. In some embodiments, GSDF D (514-D) may support gray levels within a fourth sub-range (e.g., 0 to 100 cd/m$^2$) of the reference GSDF (504).

Precision in image rendering may be gracefully scaled down with each of display devices A through D (512-A through -D). In some embodiments, the subset of gray levels in each of device specific GSDF A through D (514-A through -D) may be correlated with, or mapped to, supported reference gray levels in the reference GSDF (504) in such a way as to evenly distribute perceptually noticeable errors in the range of gray levels supported by that display device.

In some embodiments, a display device (e.g., one of 512-A through -D) with a device-specific GSDF (e.g., one of 514-A through -D) receives/extracts reference encoded image data encoded based on a reference GSDF. In response, the display device, or a conversion unit (one of 516-A through -D) therein, maps reference digital code values as specified in the reference encoded image data, to device-specific digital code values that are native to the display device. This may be performed in one of several ways. In an example, mapping from the reference digital code values to the device-specific digital code values includes selecting device-specific gray levels (corresponding to the device-specific digital code values) that match, or approximate as closely as any other device-specific gray levels, the reference gray levels (corresponding to the reference digital code values). In another example, mapping from the reference digital code values to the device-specific digital code values includes (1) determining tone-mapped luminance values based on the reference gray levels (corresponding to the reference digital code values) associated with the reference GSDF, and (2) selecting device-specific gray levels (corresponding to the device-specific digital code values) that match, or approximate as closely as any other device-specific gray levels, the tone-mapped luminance values.

Subsequently, the display device, or a driver chip (one of 518-A through -D) therein, may use the display-specific digital code values to render images with device-specific gray levels that correspond to the display-specific code values.

Generally speaking, a reference GSDF may be based on a different CSF model than that on which a display-specific GSDF is based. Conversion/mapping between the reference GSDF and the device-specific GSDF is necessary. Even if the same CSF model is used to generate both the reference GSDF and a device-specific GSDF, different values of model parameters may be used in deriving the GSDFs. For the reference GSDF, model parameter values may be conservatively set to preserve details for a wide variety of downstream devices, while for the device-specific GSDF, model parameter values may reflect specific design/implementation and viewing conditions under which the display device is to render images. Conversion/mapping between the reference GSDF and the device-specific GSDF is still necessary, as the specific display device's viewing condition parameters (e.g., the ambient light level, the display device's optical reflectivity, etc.) are different from the model parameter values used to derive the reference GSDF. Here, the viewing condition parameters may include those that impinge display quality (e.g., contrast ratio, etc.) and elevate the black level (e.g., the lowest gray level, etc.). Conversion/mapping between the reference GSDF and the device-specific GSDF under techniques as described herein improves quality in image rendering (e.g., improve the contrast ratio by increasing luminance values at high value regions, etc.).

9. CONVERTING REFERENCE ENCODED DATA

Figure 6:
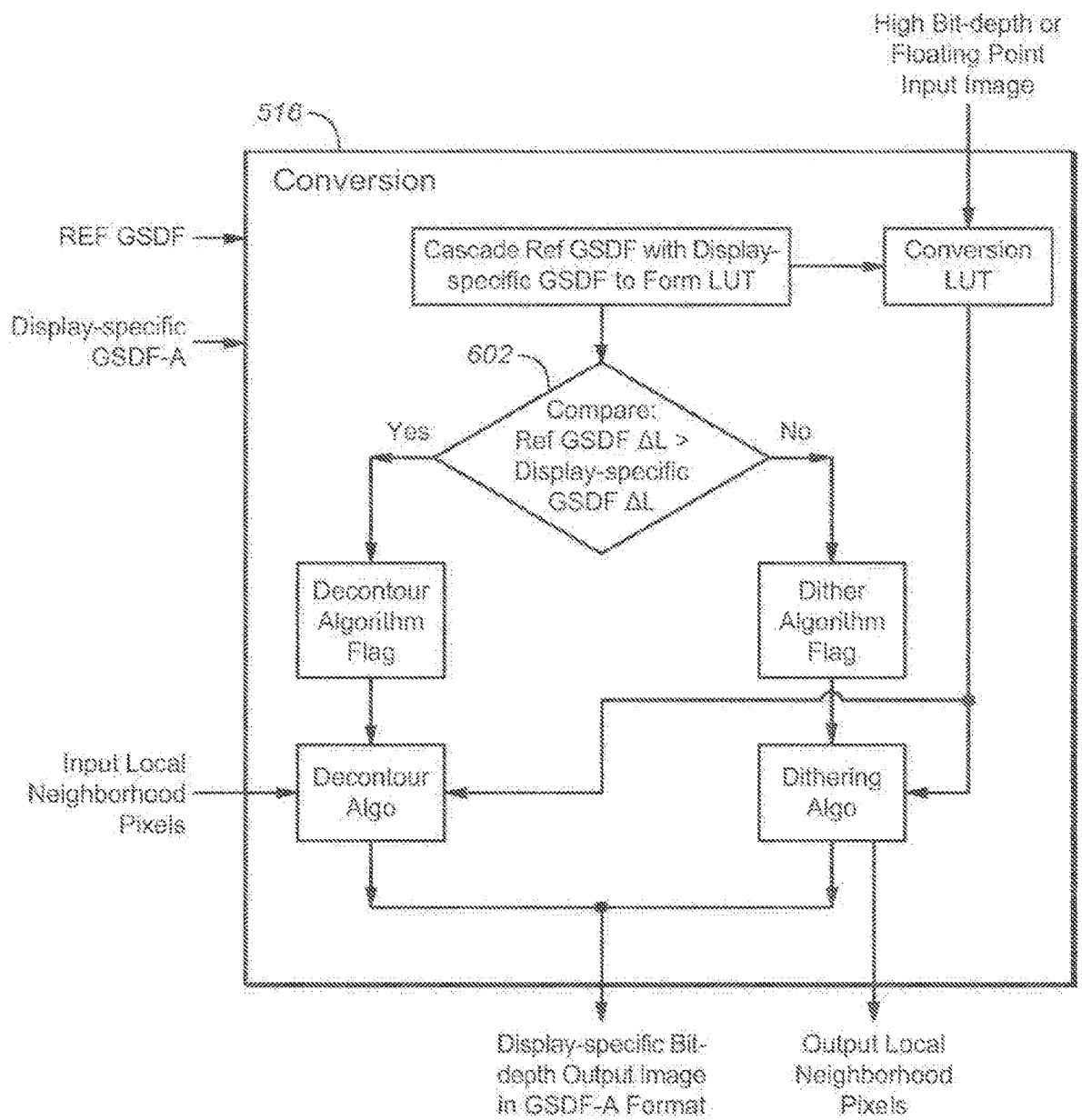
FIG. 6 illustrates an example conversion unit, according to an example embodiment of the present invention.

FIG. 6 illustrates an example conversion unit (e.g., 516), in accordance with some embodiments of the present invention. The conversion unit (516) may, but is not limited only to, be one (e.g., 516-A) of a plurality of conversion units (e.g., 516-A through -D) as illustrated in FIG. 5. In some embodiments, the conversion unit (516) may receive first definition data for a reference GSDF (REF GSDF) and second definition data for a device-specific GSDF (e.g., GSDF-A (514-A of FIG. 5)). As used herein, the terms "device-specific" and "display-specific" may be used interchangeably, if the device is a display.

Based on the definition data received, the conversion unit (516) cascades the reference GSDF with display-specific GSDF to form a conversion lookup table (Conversion LUT). Cascading between the two GSDFs may include comparing gray levels in the two GSDFs, and based on the results of comparing gray levels, establishing a mapping between reference digital code values in the reference GSDF and display-specific digital code values in the display-specific GSDF.

More specifically, given a reference digital code value in the reference GSDF, its corresponding reference gray level may be determined based on the reference GSDF. The reference gray level so determined may be used to locate a device-specific gray level in the display-specific GSDF. In an example embodiment, the device-specific gray level located may match, or approximate as closely as any other display-specific gray levels in the display-specific GSDF, the reference gray level. In another example embodiment, a tone-mapped luminance value may be obtained by a global or local tone-mapping operator acting on the reference gray level; the device-specific gray level located may match, or approximate as closely as any other display-specific gray levels in the display-specific GSDF, the tone-mapped luminance value.

With the device-specific gray level, a corresponding display-specific digital code value may be identified from the display-specific GSDF. An entry may be added or defined in the conversion LUT, consisting of the reference digital code value and the display-specific code value.

The steps as described above may be repeated for other reference digital code values in the reference GSDF.

In some embodiments, a conversion LUT may be pre-built and stored before image data whose processing is to be done based in part on the conversion LUT is received and processed. In alternative embodiments, image data that is to be processed with a conversion LUT is analyzed. The results of the analysis may be used to set up or at least adjust correspondence relationships between the reference digital code values and the device-specific digital code values. For example, if the image data indicates a particular concentration or distribution of luminance values, the conversion LUT may be set up in a way to preserve a large amount of details in the concentrated region of luminance values.

In some embodiments, the conversion unit (516) comprises one or more software and/or hardware components (a comparison sub-unit (602)) configured to compare quantization steps (e.g., luminance value differences, or $\Delta L$s, between adjacent digital code values) in both the reference GSDF and display-specific GSDF (514-A). For example, the quantization step at a reference digital code value in the reference GSDF may be a reference luminance value difference (reference GSDF $\Delta L$), while the quantization step at a display-specific digital code value in the display-specific GSDF may be a display-specific luminance value difference (display-specific GSDF $\Delta L$). Here, the display-specific digital code value corresponds to (or forms a pair in the conversion LUT with) the reference digital code value. In some embodiments, the comparison sub-unit (602) compares these two luminance value differences. This operation is essentially a test which may be performed either based on $\Delta L$ values, or optionally and/or alternatively, based on the relative slopes of the two GSDF curves.

Quantization steps for luminance values in the display-specific GSDF may typically exceed those of the reference GSDF, as one or more reference gray levels from the reference GSDF (e.g., corresponding to a high bit-depth domain, etc.) are merged into display-specific gray levels from the display-specific GSDF (e.g., corresponding to a low bit-depth domain, etc.). In these cases, dithering is used to remove banding artifacts. As part of overall dithering, dithering is also performed on local surrounding output pixels (in space and/or in time). In a sense, the human eye may be represented as a low-pass filter. At least in this sense, averaging local surrounding pixels as described herein thus creates desired output gray levels that reduce and/or remove banding visual artifacts, which otherwise could be present due to large quantization steps in the display-specific GSDF.

In less common cases, quantization steps for luminance values for the reference GSDF may occasionally exceed those of the display-specific GSDF. A decontouring algorithm-based process is used, synthesizing an output gray level based on an input gray level, for example, by averaging neighboring input pixels.

Correspondingly, if the reference GSDF $\Delta L$ is greater than the display-specific GSDF $\Delta L$, which is the "Y" path in FIG. 6, then a decontour algorithm flag is set for an entry, in the conversion LUT, that comprises the reference digital code value and the display-specific digital code value.

If the reference GSDF $\Delta L$ is less than the display-specific GSDF $\Delta L$, which is the "N" path in FIG. 6, then a dither algorithm flag is set for an entry, in the conversion LUT, that comprises the reference digital code value and the display-specific digital code value.

If the reference GSDF $\Delta L$ is equal to the display-specific GSDF $\Delta L$, then neither a decontour algorithm flag nor a dither algorithm flag is set for an entry, in the conversion LUT, that comprises the reference digital code value and the display-specific digital code value. Decontour and dither algorithm flags may be stored with entries in the conversion LUT, or may be stored in a related data structure outside, but operatively linked with, the conversion LUT.

In some embodiments, the conversion unit (516) is configured to receive reference encoded image data, which may be in the form of high bit-depth or floating point input image, and to map reference digital code values specified in the reference GSDF to display-specific digital code values specified in the display-specific GSDF. In addition to mapping digital code values between the GSDFs, the conversion unit (516) may be configured to perform decontouring or dithering based on the settings of algorithm flags (decontour algorithm flags or dithering algorithm flags) previously discussed.

As noted, the reference GSDF likely contains a greater amount of details than a display-specific GSDF; thus, the "Y" path of FIG. 6 may not occur, or may occur less often. In some embodiments, the "Y" path and related processing may be omitted to simplify the implementation of a conversion unit.

In some embodiments, given a reference digital code value as determined for a pixel in the reference encoded image data, the conversion unit (516) looks up in the conversion LUT for a corresponding display-specific digital code value, and replaces the reference digital code value with the corresponding display-specific digital code value. Additionally and/or optionally, the conversion unit (516) determines whether a decontour or dithering algorithm should be performed for the pixel, based on the existence/setting of an algorithm flag for an entry, in the conversion LUT, that comprises the reference digital code value and the display-specific digital code value.

If it is determined that neither a decontour algorithm nor a dithering algorithm should be performed (e.g., no indication or flag for performing either algorithm), then no decontour or dithering is performed for the pixel for the time being.

If it is determined that a decontour algorithm should be performed, then the conversion unit (516) may perform one or more decontour algorithms (Decontour Algo). Performing the one or more decontour algorithms may include receiving image data of input local neighborhood pixels and inputting the image data of the local neighborhood pixels to the decontour algorithms.

If it is determined that a dithering algorithm should be performed, then the conversion unit (516) may perform one or more dithering algorithms (Dithering Algo).

The pixel may still be involved in decontour or dithering if the conversion unit (516) determines that decontour or dithering needs to be performed with respect to neighborhood pixels. In an example, the device-specific (output) gray level of the pixel may be used for dithering local neighborhood pixels. In another example, the reference (input) gray level of the pixel may be used for decontouring local neighborhood pixels.

In some embodiments, the conversion unit (516) outputs the processing results of the foregoing steps to downstream processing units or sub-units. The processing results comprise display-specific encoded image data in the format of display-specific bit-depth output image encoded with digital code values in the display-specific GSDF (e.g., GSDF-A).

Figure 7:
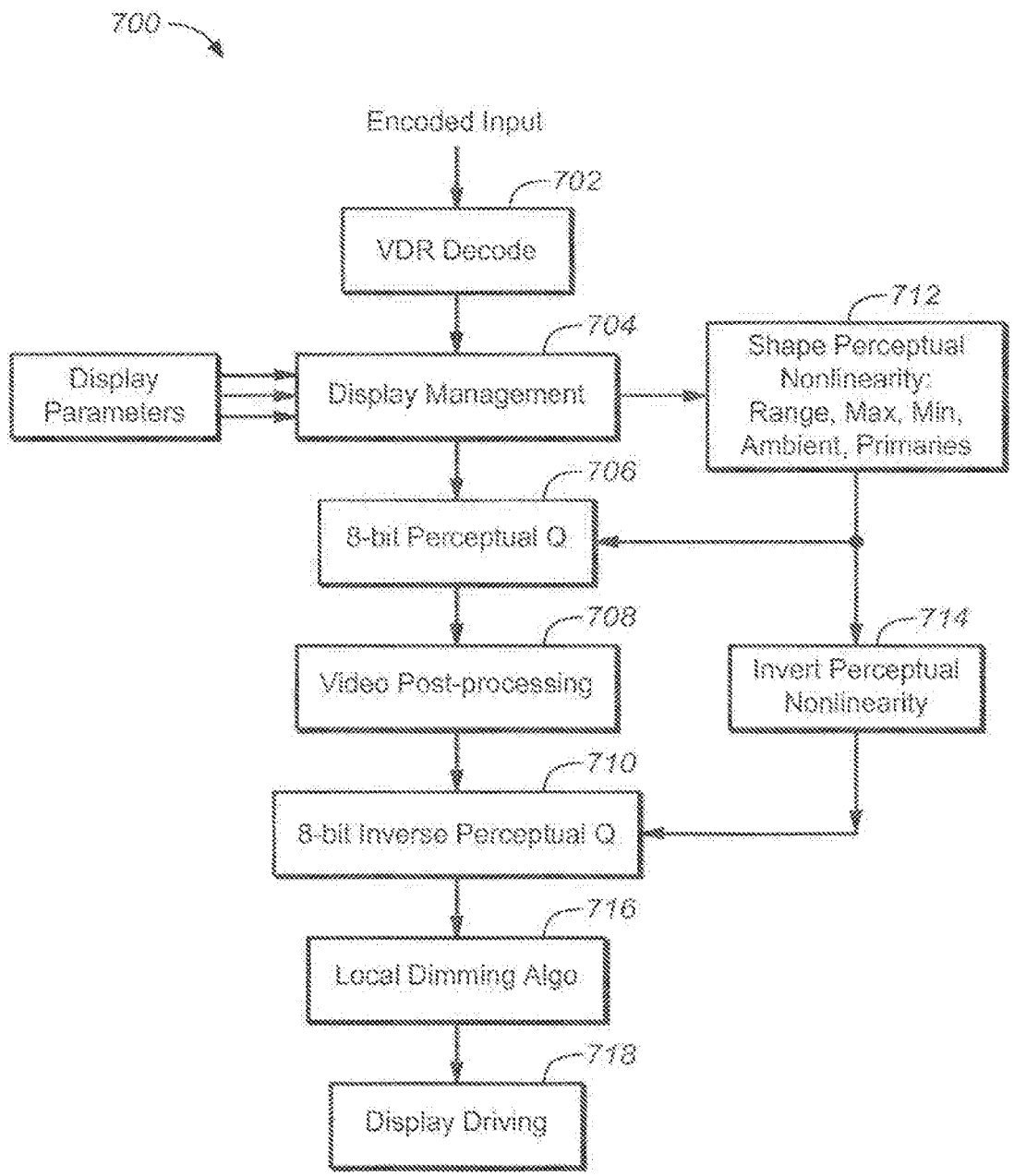
FIG. 7 illustrate an example SDR display, according to an example embodiment of the present invention.

FIG. 7 illustrates an example SDR display (700) which implements 8 bit image processing. The SDR display (700), or a VDR decode unit (702) therein, receives an encoded input. The encoded input comprises reference coded image data in an image data container which may be in one of a plurality of image data container formats. The VDR decode unit (702) decodes the encoded input and determines/retrieves the reference encoded image data from therein. The reference encoded image data may comprise image data for individual pixels in a color space (e.g., a RGB color space, a YCbCr color space, etc.). The image data for individual pixels may be encoded with reference digital code values in a reference GSDF.

Additionally and/or optionally, the SDR display (700) comprises a display management unit (704) that maintains display parameters for the SDR display (700). The display parameters may at least in part define a display-specific GSDF (e.g., GSDF-B of FIG. 5) associated with the SDR display (700). The display parameters defining the display-specific GSDF may include maximum (max) and minimum (min) gray levels supported by the SDR display (700). The display parameters may also include color primaries (primaries) supported by the SDR display, display size (size), optical reflectivity of the SDR display's image rendering surface, ambient light level. Some of the display parameters may be preconfigured with fixed values. Some of the display parameters may be measured in real-time or near real-time by the SDR display (700). Some of the display parameters may be configurable by a user of the SDR display (700). Some of the display parameters may be preconfigured with default values and may be overridden by measurement or by a user. The display management unit (704) establishes/shapes perceptual nonlinearity of the display-specific gray levels based on the reference GSDF, and may additionally and/or optionally perform tone mapping as a part of establishing/shaping the display-specific gray levels. For example, a conversion LUT as illustrated in FIG. 5 and/or other related meta data (e.g., dithering and decontour processing flags, etc.) may be established by the display management unit (704) for the purpose of establishing/shaping perceptual nonlinearity of the display-specific gray levels in accordance with the reference GSDF. Cascading operations as previously discussed may be implemented with the display management unit (704) to create the conversion LUT and/or other related metadata (712) relating to one or both of the reference GSDF and display-specific GSDF. The conversion LUT and/or other related metadata (712) may be accessed and used by other units or sub-units in the SDR display (700). Further, the conversion LUT and/or other related metadata may be used as, or to derive, metadata (714) for inverting perceptual nonlinearity. As used herein, inverting perceptual nonlinearity may include converting display-specific digital code values to display-specific digital driving levels (e.g., digitized voltage levels in the display device).

Additionally and/or optionally, the SDR display (700) includes a conversion unit (516) as illustrated in FIG. 5 and FIG. 6, and an 8 bit perceptual quantizer (706). In some embodiments, the SDR display (700), or the conversion unit (516) and the 8 bit perceptual quantizer (706) therein, converts the reference encoded image data into a display-specific bit-depth output image encoded with display-specific digital code values associated with the display-specific GSDF (e.g., GSDF-A or GSDF-B of FIG. 5), and quantizes the display-specific bit-depth output image into perceptually encoded image data in a 8 bit code space. As used herein, the term "perceptually encoded" may refer to a type of encoding that is based on a human visual perceptual model, such as a CSF that gives rise to the reference GSDF.

Additionally and/or optionally, the SDR display (700) comprises a video post-processing unit (708) that may, but is not limited only to, perform zero, one, or more of image processing operations on the perceptually encoded image data in an 8 bit luminance representation. These image processing operations may include, but are not limited only to, compression, decompression, color space conversion, downsampling, upsampling, or color grading. The results of these operations may be outputted to other parts of the SDR display (700).

In an example embodiment, the SDR display (700) comprises an 8 bit inverse perceptual quantizer (710) configured to convert display-specific digital code values in the results of image processing operations to display-specific digital driving levels (e.g., digitized voltage levels). The display-specific digital driving levels generated (or converted back from digital code values) by the inverse perceptual quantizer (710) may specifically support one of several types of luminance nonlinearities supportable in the SDR display (700). In an example, the inverse perceptual quantizer (710) converts display-specific digital code values to display-specific digital driving levels to support luminance nonlinearities associated with Rec. 709. In another example, the inverse perceptual quantizer (710) converts display-specific digital code values to display-specific digital driving levels to support luminance nonlinearities associated with a linear luminance domain or a log luminance domain (which may be relatively easy to be integrated with local dimming operations). In another example, the inverse perceptual quantizer (710) converts display-specific digital code values to display-specific digital driving levels to support a display-specific CSF (or its associated GSDF), with optimal placement of display-specific gray levels for the specific display (700), and possibly adjusted for the viewing conditions specific to the display (700).

10. EXAMPLE PROCESS FLOWS

Figure 8A:
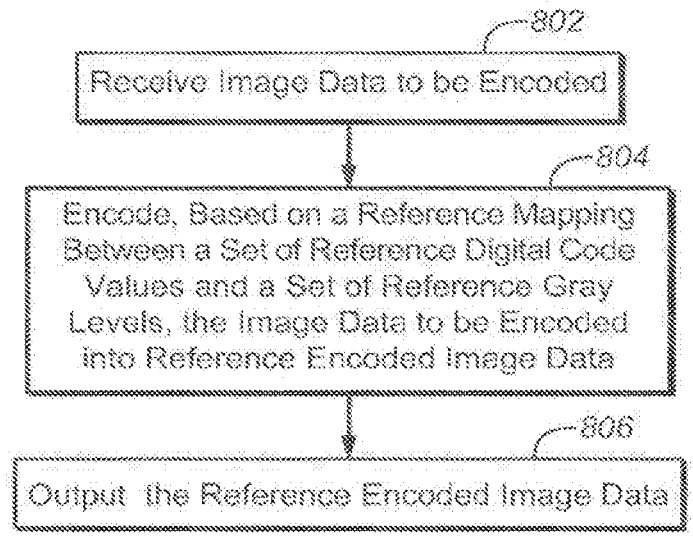
FIG. 8A and FIG. 8B illustrate example process flows, according to an example embodiment of the present invention.

FIG. 8A illustrates an example process flow according to an embodiment of the present invention. In some embodiments, one or more computing devices or components such as one or more computing devices in framework (500) may perform this process flow. In block 802, a computing device receives image data to be encoded.

In block 804, the computing device encodes, based on a reference mapping between a set of reference digital code values and a set of reference gray levels, the image data to be encoded into reference encoded image data. Here, luminance values in the image data to be encoded are represented by the set of reference digital code values. A luminance difference between two reference gray levels represented by two adjacent reference digital code values in the set of reference digital code values may be inversely proportional to a peak contrast sensitivity of human vision adapted at a particular light level.

In block 806, the computing device outputs the reference encoded image data.

In an embodiment, the computing device determines a reference gray scale display function (GSDF) based on a contrast sensitivity function (CSF) model; the reference GSDF specifies the reference mapping between the set of reference digital code values and the set of reference gray levels. The CSF model comprises one or more model parameters, which may have an angular size that falls in a range comprising one or more of: between 25 degrees×25 degrees and 30 degrees×30 degrees, between 30 degrees×30 degrees and 35 degrees×35 degrees, between 35 degrees×35 degrees and 40 degrees×40 degrees, between 40 degrees×40 degrees and 45 degrees×45 degrees, or greater than 45 degrees×45 degrees.

In an embodiment, the computing device assigns an intermediate luminance value, within a range of luminance values supported by the set of reference gray levels, to an intermediate digital code value in a code space that hosts the set of reference digital code values, and derives, by performing one or more of stacking or integration computations, a plurality of sub-mappings, each sub-mapping maps a reference digital code value in the set of reference digital code values to a reference gray level in the set of reference gray levels. The intermediate luminance value may be selected within a range comprising one or more of: less than 50 nits, between 50 nits and 100 nits inclusive, between 100 and 500 nits inclusive, or no less than 500 nits.

In an example embodiment, the set of reference gray levels covers a dynamic range with an upper limit having a value of: less than 500 nits, between 500 nits and 1000 nits inclusive, between 1000 and 5000 nits inclusive, between 5000 nits and 10000 nits inclusive, between 10000 nits and 15000 nits inclusive, or greater than 15000 nits.

In an embodiment, the peak contrast sensitivity is determined from a contrast sensitivity curve among a plurality of contrast sensitivity curves determined based on a contrast sensitivity function (CSF) model having model parameters comprising one or more of a luminance value variable, a spatial frequency variable, or one or more other variables.

In an embodiment, at least two peak contrast sensitivities determined based on at least two contrast sensitivity curves in the plurality of contrast sensitivity curves occur at two different spatial frequency values.

In an embodiment, the computing device converts one or more input images represented, received, transmitted, or stored with the image data to be encoded from an input video signal into one or more output images represented, received, transmitted, or stored with the reference encoded image data contained in an output video signal.

In an embodiment, the image data to be encoded comprises image data encoded in one of a high-resolution high dynamic range (HDR) image format, a RGB color spaces associated with the Academy Color Encoding Specification (ACES) standard of the Academy of Motion Picture Arts and Sciences (AMPAS), a P3 color space standard of the Digital Cinema Initiative, a Reference Input Medium Metric/Reference Output Medium Metric (RIMM/ROMM) standard, an sRGB color space, a RGB color space associated with the BT.709 Recommendation standard of the International Telecommunications Union (ITU), etc.

In an embodiment, the luminance difference between the two reference gray levels represented by the two adjacent reference digital code values is less than a just noticeable difference threshold at the particular light level.

In an embodiment, the particular light level is a luminance value between the two luminance values, inclusive.

In an embodiment, the set of reference digital code values comprises integer values in a code space with a bit depth of: less than 12 bits; between 12 bits and 14 bits, inclusive; at least 14 bits; 14 bits or more.

In an embodiment, the set of reference gray levels may comprise a set of quantized luminance values.

Figure 8B:
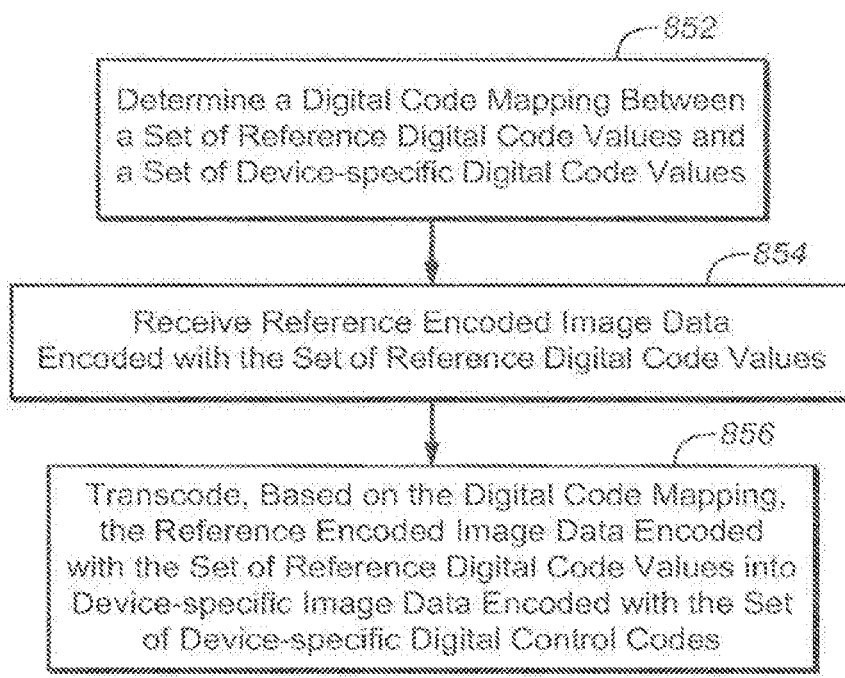

FIG. 8B illustrates another example process flow according to an embodiment of the present invention. In some embodiments, one or more computing devices or components such as one or more computing devices in framework (500) may perform this process flow. In block 852, a computing device determines a digital code mapping between a set of reference digital code values and a set of device-specific digital code values. Here, the set of reference digital code values is mapped in a reference mapping to a set of reference gray levels, while the set of device-specific digital code values is mapped in a device-specific mapping to a set of device-specific gray levels.

In block 854, the computing device receives reference encoded image data encoded with the set of reference digital code values. Luminance values in the reference encoded image data are based on the set of reference digital code values. A luminance difference between two reference gray levels represented by two adjacent reference digital code values in the set of reference digital code values may be inversely proportional to a peak contrast sensitivity of human vision adapted at a particular light level.

In block 856, the computing device transcodes, based on the digital code mapping, the reference encoded image data encoded with the set of reference digital code values into device-specific image data encoded with the set of device-specific digital control codes. Luminance values in the device-specific image data are based on the set of device-specific digital code values.

In an embodiment, the computing device determines a set of correspondence relationships between the set of reference digital code values and the set of device-specific digital code values. Here, a correspondence relationship in the set of correspondence relationship relates a reference digital code value in the set of reference digital code values to a device-specific digital code value. The computing device further compares a first luminance difference at the reference digital code value and a second luminance difference at the device-specific digital code value, and stores, based on comparing the first luminance difference and the second luminance difference, an algorithm flag as to whether dithering, decontouring, or no operation should be performed for the reference digital code value.

In an embodiment, the computing device determines a reference digital code value from the reference encoded image data for a pixel, and further determines whether an algorithm flag is set for the reference digital code value. In response to determining that an algorithm flag is set for decontour, the computing device performs a decontour algorithm on the pixel. Alternatively, in response to determining that an algorithm flag is set for dithering, the computing device performs a dithering algorithm on the pixel.

In an embodiment, the computing device renders one or more images on a display based on the device-specific image data encoded with the set of device-specific digital control codes. Here, the display may be, but is not limited only to, one of a visible dynamic range (VDR) display, a standard dynamic range (SDR) display, a tablet computer display, or a handheld device display.

In an embodiment, a device-specific gray scale display function (GSDF) specifies the device-specific mapping between the set of device-specific digital code values and the set of device-specific gray levels.

In an embodiment, the device-specific mapping is derived based on one or more display parameters and zero or more viewing condition parameters.

In an embodiment, the set of device-specific gray levels covers a dynamic range with an upper limit having a value of: less than 100 nits, no less than 100 nits but less than 500 nits, between 500 nits and 1000 nits inclusive, between 1000 and 5000 nits inclusive, between 5000 nits and 10000 nits inclusive, or greater than 10000 nits.

In an embodiment, the computing device converts one or more input images represented, received, transmitted, or stored with the reference encoded image data from an input video signal into one or more output images represented, received, transmitted, or stored with the device-specific image data contained in an output video signal.

In an embodiment, the device-specific image data supports image rendering in one of a high-resolution high dynamic range (HDR) image format, a RGB color spaces associated with the Academy Color Encoding Specification (ACES) standard of the Academy of Motion Picture Arts and Sciences (AMPAS), a P3 color space standard of the Digital Cinema Initiative, a Reference Input Medium Metric/Reference Output Medium Metric (RIMM/ROMM) standard, an sRGB color space, or a RGB color space associated with the BT.709 Recommendation standard of the International Telecommunications Union (ITU).

In an embodiment, the set of device-specific digital code values comprises integer values in a code space with a bit depth of: 8 bits; greater than 8 but less than 12 bits; 12 bits or more.

In an embodiment, the set of device-specific gray levels may comprise a set of quantized luminance values.

In various embodiments, an encoder, a decoder, a system, etc., performs any or a part of the foregoing methods as described.

11. IMPLEMENTATION MECHANISMS—HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
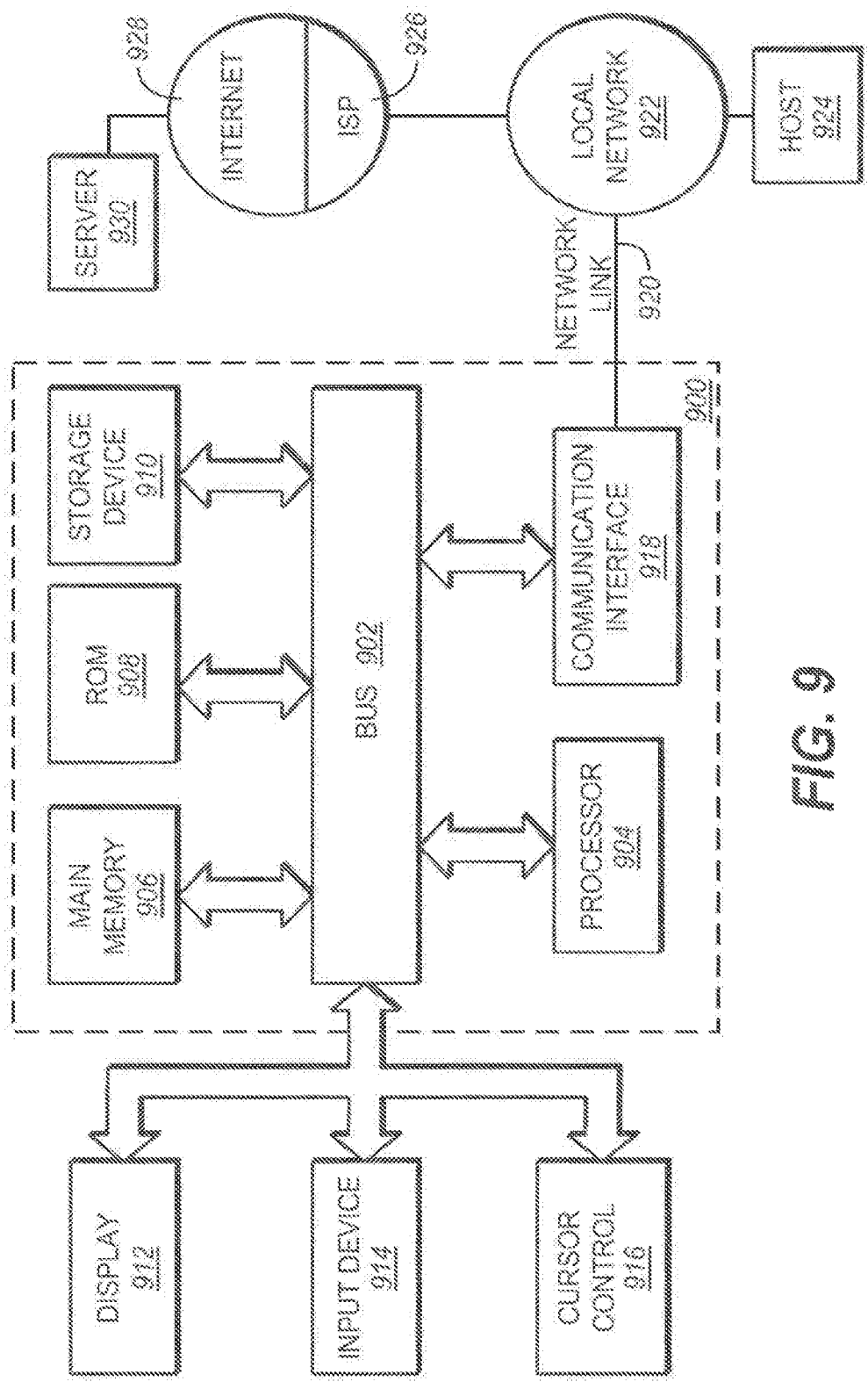
FIG. 9 illustrates an example hardware platform on which a computer or a computing device as described herein may be implemented, according an example embodiment of the present invention.

For example, FIG. 9 is a block diagram that illustrates a computer system 900 upon which an example embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a liquid crystal display, for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

12. ENUMERATED EXAMPLE EMBODIMENTS, EQUIVALENTS, EXTENSIONS, ALTERNATIVES AND MISCELLANEOUS

Enumerated example embodiments ("EEEs") of the present invention have been described above in relation to perceptual luminance nonlinearity-based image data exchange across displays of different capabilities. Thus, an embodiment of the present invention may relate to one or more of the examples, enumerated in Table 2 below.

TABLE 2

| Enumerated Example Embodiments |
|---|
| (EEE1.) A method, comprising: receiving image data to be encoded; encoding, based on a reference mapping between a set of reference digital code values and a set of reference gray levels, the received image data into reference encoded image data, wherein luminance values in the received image data are represented by the set of reference digital code values, wherein a luminance difference between two reference gray levels in the received image data is represented by two adjacent reference digital code values in the set of reference digital code values, and wherein the luminance different between the two adjacent reference digital code values is inversely proportional to a peak contrast sensitivity of human vision that is adapted at a particular light level; and outputting the reference encoded image data. |
| (EEE2.) The method as recited in enumerated example embodiment 1, further comprising determining a reference gray scale display function (GSDF) based on a contrast sensitivity function (CSF) model, wherein the reference GSDF specifies the reference mapping between the set of reference digital code values and the set of reference gray levels. |
| (EEE3.) The method as recited in enumerated example embodiment 2, wherein the CSF model comprises one or more model parameters, and wherein the one or more model parameters comprise an angular size that falls in a range comprising one or more of: between 25 degrees × 25 degrees and 30 degrees × 30 degrees, inclusive, between 30 degrees × 30 degrees and 35 degrees × 35 degrees, inclusive, between 35 degrees × 35 degrees and 40 degrees × 40 degrees, inclusive, between 40 degrees × 40 degrees and 45 degrees × 45 degrees, inclusive, or greater than 45 degrees × 45 degrees. |
| (EEE4.) The method as recited in enumerated example embodiment 1, further comprising: assigning an intermediate luminance value, within a range of luminance values supported by the set of reference gray levels, to an intermediate digital code value in a code space that hosts the set of reference digital code values; and deriving, by performing one or more of stacking or integration computations, a plurality of sub-mappings, each sub-mapping maps a reference digital code value in the set of reference digital code values to a reference gray level in the set of reference gray levels. |
| (EEE5.) The method as recited in enumerated example embodiment 4, wherein the intermediate luminance value is selected within a range comprising one or more of: less than 50 nits, between 50 nits and 100 nits, inclusive, between 100 and 500 nits, inclusive, or greater than 500 nits. |
| (EEE6.) The method as recited in enumerated example embodiment 1, wherein the set of reference gray levels covers a dynamic range with an upper limit having a value of: less than 500 nits, between 500 nits and 1000 nits, inclusive, between 1000 and 5000 nits, inclusive, between 5000 nits and 10000 nits, |

TABLE 2-continued

Enumerated Example Embodiments inclusive, between 10000 nits and 15000 nits, inclusive, or greater
than 15000 nits.
(EEE7.) The method as recited in enumerated example embodiment 1,
wherein the peak contrast sensitivity is determined from a contrast sensitivity
curve among a plurality of contrast sensitivity curves determined based on
a contrast sensitivity function (CSF) model having model parameters
comprising one or more of a luminance value variable, a spatial frequency
variable, or one or more other variables.
(EEE8.) The method as recited in enumerated example embodiment 7, wherein
at least two peak contrast sensitivities determined based on at least two contrast
sensitivity curves in the plurality of contrast sensitivity curves occur at two
different spatial frequency values.
(EEE9.) The method as recited in enumerated example embodiment 1, further
comprising converting one or more input images represented, received,
transmitted, or stored with the image data to be encoded from an input video
signal into one or more output images represented, received, transmitted, or
stored with the reference encoded image data contained in an output
video signal.
(EEE10.) The method as recited in enumerated example embodiment 1, wherein
the image data to be encoded comprises image data encoded in one of a
high-resolution high dynamic range (HDR) image format, a RGB color space
associated with the Academy Color Encoding Specification (ACES) standard
of the Academy of Motion Picture Arts and Sciences (AMPAS), a P3 color
space standard of the Digital Cinema Initiative, a Reference Input Medium
Metric/Reference Output Medium Metric (RIMM/ROMM) standard, an sRGB
color space, or a RGB color space associated with the BT.709 Recommendation
standard of the International Telecommunications Union (ITU).
(EEE11.) The method as recited in enumerated example embodiment 1, wherein
the luminance difference between the two reference gray levels represented by the
two adjacent reference digital code values is less than a just noticeable difference
(JND) threshold at the particular light level.
(EEE12.) The method as recited in enumerated example embodiment 1, wherein
the particular light level comprises a luminance value between the two luminance
values, inclusive.
(EEE 13.) The method as recited in enumerated example embodiment 1, wherein
the set of reference digital code values comprises integer values in a code space
with a bit depth of at least one of: less than 12 bits; between 12 bits and 14 bits,
inclusive; at least 14 bits; or 14 bits or more.
(EEE14.) The method as recited in enumerated example embodiment 1, wherein
the set of reference gray levels may comprise a set of quantized luminance values.
(EEE15.) The method as recited in enumerated example embodiment 1, wherein the
reference GSDF is determined based at least in part on a functional model
represented with one or more functions.
(EEE16.) The method as recited in enumerated example embodiment 15, wherein the
functional model comprises one or more model parameters, and wherein values of
the model parameters are optimized through minimizing deviations between
predicted code values and target code values.
(EEE17.) A method, comprising the steps of: determining a digital code mapping
between a set of reference digital code values and a set of device-specific digital
code values, wherein the set of reference digital code values is mapped in a
reference mapping to a set of reference gray levels, and wherein the set of
device-specific digital code values is mapped in a device-specific mapping to a
set of device-specific gray levels; receiving reference encoded image data
encoded with the set of reference digital code values, wherein luminance values in
the reference encoded image data are based on the set of reference digital code
values, wherein a luminance difference between two reference gray levels
represented by two adjacent reference digital code values in the set of reference
digital code values is inversely proportional to a peak contrast sensitivity of human
vision adapted at a particular light level; and transcoding, based on the digital
code mapping, the reference encoded image data encoded with the set of reference
digital code values into device-specific image data encoded with the set of
device-specific digital control codes, wherein luminance values in the
device-specific image data are based on the set of device-specific digital code values.
(EEE18.) The method as recited in enumerated example embodiment 17, further
comprising: determining a set of correspondence relationships between the set
of reference digital code values and the set of device-specific digital code values,
wherein a correspondence relationship in the set of correspondence relationship
relates a reference digital code value in the set of reference digital code values
to a device-specific digital code value; comparing a first luminance difference
at the reference digital code value and a second luminance difference at the
device-specific digital code value; and storing, based on comparing the first
luminance difference and the second luminance difference, an algorithm flag
as to whether dithering, decontouring, or no operation should be performed for
the reference digital code value.
(EEE19.) The method as recited in enumerated example embodiment 17, further
comprising: determining a reference digital code value from the reference encoded
image data for a pixel; and determining whether an algorithm flag is set for the
reference digital code value.

TABLE 2-continued

Enumerated Example Embodiments (EEE20.) The method as recited in enumerated example embodiment 19, further comprising, in response to determining that an algorithm flag is set for decontour, performing a decontour algorithm on the pixel.
(EEE21.) The method as recited in enumerated example embodiment 19, further comprising, in response to determining that an algorithm flag is set for dithering, performing a dithering algorithm on the pixel.
(EEE22.) The method as recited in enumerated example embodiment 17, further comprising rendering one or more images on a display based on the device-specific image data encoded with the set of device-specific digital control codes, the display being one of a visible dynamic range (VDR) display, a standard dynamic range (SDR) display, a tablet computer display, or a handheld device display.
(EEE23.) The method as recited in enumerated example embodiment 17, wherein a device-specific gray scale display function (GSDF) specifies the device-specific mapping between the set of device-specific digital code values and the set of device-specific gray levels.
(EEE24.) The method as recited in enumerated example embodiment 17, wherein the device-specific mapping is derived based on one or more display parameters and zero or more viewing condition parameters.
(EEE25.) The method as recited in enumerated example embodiment 17, wherein the set of device-specific gray levels covers a dynamic range with an upper limit having a value of: less than 100 nits; no less than 100 nits but less than 500 nits; between 500 nits and 1000 nits, inclusive; between 1000 and 5000 nits, inclusive; between 5000 nits and 10000 nits, inclusive; or greater than 10000 nits.
(EEE26.) The method as recited in enumerated example embodiment 17, further comprising converting one or more input images represented, received, transmitted, or stored with the reference encoded image data from an input video signal into one or more output images represented, received, transmitted, or stored with the device-specific image data contained in an output video signal.
(EEE27.) The method as recited in enumerated example embodiment 17, wherein the device-specific image data supports image rendering in one of a high-resolution high dynamic range (HDR) image format, a RGB color space associated with the Academy Color Encoding Specification (ACES) standard of the Academy of Motion Picture Arts and Sciences (AMPAS), a P3 color space standard of the Digital Cinema Initiative, a Reference Input Medium Metric/Reference Output Medium Metric (RIMM/ROMM) standard, an sRGB color space, or a RGB color space associated with the BT.709 Recommendation standard of the International Telecommunications Union (ITU).
(EEE28.) The method as recited in enumerated example embodiment 17, wherein the luminance difference between the two reference gray levels represented by the two adjacent reference digital code values is less than a just noticeable difference threshold at the particular light level.
(EEE29.) The method as recited in enumerated example embodiment 17, wherein the particular light level comprises a luminance value between the two luminance values, inclusive.
(EEE30.) The method as recited in enumerated example embodiment 17, wherein the set of device-specific digital code values comprises integer values in a code space with a bit depth of: 8 bits; greater than 8 but less than 12 bits; or 12 bits or more.
(EEE31.) The method as recited in enumerated example embodiment 17, wherein the set of device-specific gray levels comprises a set of quantized luminance values.
(EEE32.) The method as recited in enumerated example embodiment 17, wherein at least one of the reference mapping and the device-specific mapping is determined based at least in part on a functional model represented with one or more functions.
(EEE33.) The method as recited in enumerated example embodiment 32, wherein the functional model comprises one or more model parameters, and wherein values of the model parameters are optimized through minimizing deviations between predicted code values and target code values.
(EEE34.) An encoder performing any of the methods as recited in enumerated example embodiments 1-16, inclusive.
(EEE35.) A decoder performing any of the methods as recited in enumerated example embodiments 17-33, inclusive.
(EEE36.) A system performing any of the methods as recited in enumerated example embodiments 1-33, inclusive.
(EEE37.) A system, comprising:
an encoder, which is configured to: receive image data to be encoded, encode, based on a reference mapping between a set of reference digital code values and a set of reference gray levels, the received image data into reference encoded image data, wherein luminance values in the image data to be encoded being are represented by the set of reference digital code values, wherein a luminance difference between two reference gray levels represented by two adjacent reference digital code values in the set of reference digital code values is inversely proportional to a peak contrast sensitivity of human vision adapted at a particular light level; and output the reference encoded image data; and a decoder, which is configured to: determine a digital code mapping between the set of reference digital code values and a set of device-specific digital code values, wherein the set of device-specific digital code values is mapped in a device-specific mapping to a set of device-specific gray levels; receive the reference encoded image data; and transcode, based on the digital code mapping, the reference encoded image data encoded with the set of reference digital TABLE 2-continued Enumerated Example Embodiments code values into device-specific image data encoded with the set of device-specific
digital control codes, wherein luminance values in the device-specific image data
are based on the set of device-specific digital code values.
(EEE38.) An image decoder, comprising:
a mapping determiner, which determines a digital code mapping between a set of
reference digital code values and a set of device-specific digital code values,
wherein the set of reference digital code values is mapped in a reference mapping
to a set of reference gray levels, and wherein the set of device-specific digital code
values is mapped in a device-specific mapping to a set of device-specific gray
levels; a receiver, which receives reference encoded image data encoded with the
set of reference digital code values, wherein luminance values in the reference
encoded image data are based on the set of reference digital code values, wherein
a luminance difference between two reference gray levels represented by two adjacent
reference digital code values in the set of reference digital code values is inversely
contrast sensitivity of human vision adapted at a particular light level; and a
proportional to a peak transcoder which, based on the digital code mapping, transforms
the reference encoded image data encoded with the set of reference digital code values
into device-specific image data encoded with the set of device-specific digital control
codes, wherein luminance values in the device-specific image data are based on the
set of device-specific digital code values.
(EEE39.) The decoder as recited in enumerated example embodiment 38, wherein the
decoder is configured to: determine a set of correspondence relationships between the
set of reference digital code values and the set of device-specific digital code values,
wherein a correspondence relationship in the set of correspondence relationship relates
a reference digital code value in the set of reference digital code values to a
device-specific digital code value; compare a first luminance difference at the
reference digital code value and a second luminance difference at the device-specific
digital code value; and store an algorithm flag, based on comparing the first luminance
difference and the second luminance difference, wherein the algorithm flag functions
to flag whether dithering, decontouring, or no operation should be performed for the
reference digital code value.
(EEE40.) The decoder as recited in enumerated example embodiment 38, wherein the
decoder is further configured to: determine a reference digital code value from the
reference encoded image data for a pixel; and determine whether an algorithm flag
is set for the reference digital code value.
(EEE41.) The decoder as recited in enumerated example embodiment 40, wherein the
decoder is further configured to perform a decontour function on the pixel, in response to
determining that an algorithm flag is set for decontour.
(EEE42.) The decoder as recited in enumerated example embodiment 40, wherein the
decoder is further configured to perform a dithering operation on the pixel, in response to
determining that an algorithm flag is set for dithering.
(EEE43.) The decoder as recited in enumerated example embodiment 38, wherein the
decoder is further configured to: render one or more images on a display based on the
device-specific image data encoded with the set of device-specific digital control codes,
the display comprising at least one of a visible dynamic range (VDR) display, a standard
dynamic range (SDR) display, a tablet computer display, or a handheld device display.
(EEE44.) The decoder as recited in enumerated example embodiment 38, wherein a
device-specific gray scale display function (GSDF) specifies the device-specific mapping
between the set of device-specific digital code values and the set of device-specific
gray levels.
(EEE45.) The decoder as recited in enumerated example embodiment 38, wherein the
device-specific mapping is derived based on one or more display parameters and zero
or more viewing condition parameters.
(EEE46.) The decoder as recited in enumerated example embodiment 38, wherein the
set of device-specific gray levels spans (e.g., covers) a dynamic range with an upper
limit having a value of: less than 100 nits; no less than 100 nits but less than 500 nits;
between 500 nits and 1000 nits, inclusive; between 1000 and 5000 nits, inclusive;
between 5000 nits and 10000 nits, inclusive; or greater than 10000 nits.
(EEE47.) The decoder as recited in enumerated example embodiment 38, further
comprising a converter for converting one or more input images represented, received,
transmitted, or stored with the reference encoded image data from an input video
signal into one or more output images represented, received, transmitted, or stored
with the device-specific image data contained in an output video signal.
(EEE48.) The decoder as recited in enumerated example embodiment 38, wherein the
device-specific image data supports image rendering in one of a high-resolution high
dynamic range (HDR) image format, a RGB color space associated with the Academy
Color Encoding Specification (ACES) standard of the Academy of Motion Picture Arts
and Sciences (AMPAS), a P3 color space standard of the Digital Cinema Initiative, a
Reference Input Medium Metric/Reference Output Medium Metric (RIMM/ROMM)
standard, an sRGB color space, or a RGB color space associated with the BT.709
Recommendation standard of the International Telecommunications Union (ITU).
(EEE49.) The decoder as recited in enumerated example embodiment 38, wherein the
luminance difference between the two reference gray levels represented by the two
adjacent reference digital code values is less than a just noticeable difference (JND)
threshold at the particular light level.
(EEE50.) The decoder as recited in enumerated example embodiment 38, wherein the
particular light level comprises a luminance value that lies between the two luminance
values, inclusive.

TABLE 2-continued

Enumerated Example Embodiments (EEE51.) The decoder as recited in enumerated example embodiment 38, wherein the set of device-specific digital code values comprises integer values in a code space with a bit depth of: 8 bits; greater than 8 but less than 12 bits; or 12 bits or more.
(EEE52.) The decoder as recited in enumerated example embodiment 31, wherein the set of device-specific gray levels comprises a set of quantized luminance values.
(EEE53.) The decoder as recited in enumerated example embodiment 38, wherein at least one of the reference mapping and the device-specific mapping is determined based at least in part on a functional model represented with one or more functions.
(EEE54.) The decoder as recited in enumerated example embodiment 53, wherein the functional model comprises one or more model parameters, and wherein values of the model parameters are optimized through minimizing deviations between predicted code values and target code values.
(EEE55.) A non-transitory computer readable storage medium comprising instructions that are encoded and stored therewith, which when executed with a computer or a processor thereof, cause, control or program the computer or the processor to execute, perform or control a process, the process for decoding an image, the image decoding process comprising the steps of: determining a digital code mapping between a set of reference digital code values and a set of device-specific digital code values, wherein the set of reference digital code values is mapped in a reference mapping to a set of reference gray levels, and wherein the set of device-specific digital code values is mapped in a device-specific mapping to a set of device-specific gray levels; receiving reference encoded image data encoded with the set of reference digital code values, wherein luminance values in the reference encoded image data are based on the set of reference digital code values, wherein a luminance difference between two reference gray levels represented by two adjacent reference digital code values in the set of reference digital code values is inversely proportional to a peak contrast sensitivity of human vision adapted at a particular light level; and transcoding, based on the digital code mapping, the reference encoded image data encoded with the set of reference digital code values into device-specific image data encoded with the set of device-specific digital control codes, wherein luminance.
(EEE56.) An image decoding system, comprising: means for determining a digital code mapping between a set of reference digital code values and a set of device-specific digital code values, wherein the set of reference digital code values is mapped in a reference mapping to a set of reference gray levels, and wherein the set of device-specific digital code values is mapped in a device-specific mapping to a set of device-specific gray levels; means for receiving reference encoded image data encoded with the set of reference digital code values, wherein luminance values in the reference encoded image data are based on the set of reference digital code values, wherein a luminance difference between two reference gray levels represented by two adjacent reference digital code values in the set of reference digital code values is inversely proportional to a peak contrast sensitivity of human vision adapted at a particular light level; and means for transcoding, based on the digital code mapping, the reference encoded image data encoded with the set of reference digital code values into device-specific image data encoded with the set of device-specific digital control codes, wherein luminance values in the device-specific image data are based on the set of device-specific digital code values.
(EEE57.) A method, comprising the steps of: receiving reference encoded image data encoded with reference code values, the reference code values representing a set of reference gray levels, a first pair of neighboring gray levels in the set of gray levels relating to a first peak contrast sensitivity of human vision adapted at a first light level, and a second pair of neighboring gray levels in the set of gray levels relating to a second peak contrast sensitivity of human vision adapted at a second different light level; accessing a code mapping between reference code values and device-specific code values, the device-specific code values representing a set of device-specific gray levels; and transcoding, based on the code mapping, the reference encoded image data into device-specific image data encoded with the device-specific control codes.
(EEE58.) The method as recited in enumerated example embodiment 57, wherein the set of reference gray levels covers a dynamic range with an upper limit having a value of: less than 500 nits; between 500 nits and 1000 nits, inclusive; between 1000 and 5000 nits, inclusive; between 5000 nits and 10000 nits, inclusive; between 10000 nits and 15000 nits, inclusive, or greater than 15000 nits.
(EEE59.) The method as recited in enumerated example embodiment 57, wherein the set of reference gray levels is configured based on a human vision model that supports a field of view of greater than 40 degrees.
(EEE60.) The method as recited in enumerated example embodiment 57, wherein the set of reference gray levels relates to variable spatial frequencies below a cut-off spatial frequency.
(EEE61.) The method as recited in enumerated example embodiment 57, wherein the code mapping is configured to evenly distribute perceptually noticeable errors in a dynamic range covered by the device-specific gray levels.
(EEE62.) The method as recited in enumerated example embodiment 57, wherein a first luminance value difference of the first pair of neighboring gray levels in the set of gray levels relates to the first peak contrast sensitivity inversely with a multiplicative constant, and wherein a second luminance value difference of the second pair of neighboring gray levels relates to the second peak contrast sensitivity inversely with the same multiplicative constant.

TABLE 2-continued

Enumerated Example Embodiments (EEE63.) The method as recited in enumerated example embodiment 57, wherein a reference code value in the reference code values and a reference gray level represented by the reference code value have different numeric values.
(EEE64.) The method as recited in enumerated example embodiment 57, wherein transcoding, based on the code mapping, the reference encoded image data into device-specific image data encoded with the device-specific control codes includes: determining a first luminance value difference between two adjacent reference code values at a reference code value; determining a second luminance value difference between two adjacent device-specific code values at a device-specific code value, wherein the device-specific code value corresponds to the reference code value; and apply, based on a comparison of the first luminance value difference and the second luminance value difference, one of a dithering algorithm or a decontouring algorithm to at least one pixel in the device-specific image data.
(EEE65.) A imaging device comprising: a data receiver configured to receive reference encoded image data comprising reference code values, the reference encoded image data being encoded by an external coding system, the reference code values representing reference gray levels, the reference gray levels being selected using a reference grayscale display function based on perceptual non-linearity of human vision adapted at different light levels to spatial frequencies; a data converter configured to access a code mapping between the reference code values and device-specific code values of the imaging device, the device-specific code values configured to produce device-specific gray levels configured for the imaging device, the data converter being configured to transcode, based on the code mapping, the reference encoded image data into device-specific image data encoded with the device-specific code values, wherein the imaging device is at least one of a: game machine, television, laptop computer, desktop computer, netbook computer, computer workstation, cellular radiotelephone, electronic book reader, point of sale terminal, and computer kiosk.

The following Table 3 describes the calculation of the Perceptual Curve EOTF for converting digital video code values into absolute linear luminance levels at the point of display. Also included is the inverse OETF calculation for converting absolute linear luminance into digital code values.

TABLE 3

Exemplary Specification for Perceptual Curve EOTF

Exemplary Equation Definitions:
D = Perceptual Curve digital code value, SDI-legal unsigned integer, 10 or 12 bits
b = number of bits per component in digital signal representation, 10 or 12
V = normalized Perceptual Curve signal value, $0 \le V \le 1$
Y = normalized luminance value, $0 \le Y \le 1$
L = absolute luminance value, $0 \le L \le 10{,}000$ cd/m$^2$
Exemplary EOTF Decode Equations:

$$V = \frac{D - 4 \cdot 2^{b-10}}{1015 \cdot 2^{b-10}}$$

$$Y = \left(\frac{\max\left[(V^{1/m} - c_1), 0\right]}{c_2 - c_3 V^{1/m}}\right)^{1/n}$$

$$L = 10{,}000 \cdot Y$$

Exemplary OETF Encode Equations:

$$Y = \frac{L}{10{,}000}$$

$$V = \left(\frac{c_1 + c_2 Y^n}{1 + c_3 Y^n}\right)^m$$

$$D = \mathrm{INT}\left(1015 \cdot V \cdot 2^{b-10}\right) + 4 \cdot 2^{b-10}$$

Exemplary Constants:

$$n = \frac{2610}{4096} \times \frac{1}{4} \approx 0.15930176$$

TABLE 3-continued

Exemplary Specification for Perceptual Curve EOTF $$m = \frac{2523}{4096} \times 128 = 78.84375$$

$$c_1 = c_3 - c_2 + 1 = \frac{3424}{4096} = 0.8359375$$

$$c_2 = \frac{2413}{4096} \times 32 = 18.8515625$$

$$c_3 = \frac{2392}{4096} \times 32 = 18.6875$$

Notes:
1. The operator INT returns the value of 0 for fractional parts in the range of 0 to 0.4999. . . and +1 for fractional parts in the range of 0.5 to 0.9999. . . , i.e. it rounds up fractions above 0.5.
2. All constants are defined as exact multiples of 12 bit rationals to avoid rounding concerns.
3. R, G, or B signal components are to be computed in the same way as the Y signal component described above.

The following Table 4 shows exemplary values for 10 bits.

TABLE 4

Exemplary Table of Values for 10 bits

| D | V | Y | L (cd/m$^2$) |
|---|---|---|---|
| 0 | | Reserved | |
| 1 | | Reserved | |
| 2 | | Reserved | |
| 3 | | Reserved | |
| 4 | 0.00000 | 0.000E+00 | 0.00000 |
| 5 | 0.00099 | 4.096E−09 | 0.00004 |
| 6 | 0.00197 | 1.329E−08 | 0.00013 |
| 7 | 0.00296 | 2.659E−08 | 0.00027 |
| 8 | 0.00394 | 4.374E−08 | 0.00044 |
| 9 | 0.00493 | 6.463E−08 | 0.00065 |
| 10 | 0.00591 | 8.922E−08 | 0.00089 |
| 11 | 0.00690 | 1.175E−07 | 0.00117 |
| 12 | 0.00788 | 1.495E−07 | 0.00149 |
| 13 | 0.00887 | 1.852E−07 | 0.00185 |
| 14 | 0.00985 | 2.248E−07 | 0.00225 |

TABLE 4-continued

Exemplary Table of Values for 10 bits

| D | V | Y | L (cd/m²) |
|---|---|---|---|
| 15 | 0.01084 | 2.681E−07 | 0.00268 |
| 16 | 0.01182 | 3.154E−07 | 0.00315 |
| 17 | 0.01281 | 3.666E−07 | 0.00367 |
| 18 | 0.01379 | 4.219E−07 | 0.00422 |
| 19 | 0.01478 | 4.812E−07 | 0.00481 |
| 20 | 0.01576 | 5.447E−07 | 0.00545 |
| 21 | 0.01675 | 6.125E−07 | 0.00613 |
| 22 | 0.01773 | 6.846E−07 | 0.00685 |
| 23 | 0.01872 | 7.610E−07 | 0.00761 |
| 24 | 0.01970 | 8.420E−07 | 0.00842 |
| 25 | 0.02069 | 9.275E−07 | 0.00927 |
| 26 | 0.02167 | 1.018E−06 | 0.01018 |
| 27 | 0.02266 | 1.112E−06 | 0.01112 |
| 28 | 0.02365 | 1.212E−06 | 0.01212 |
| 29 | 0.02463 | 1.317E−06 | 0.01317 |
| 30 | 0.02562 | 1.426E−06 | 0.01426 |
| 31 | 0.02660 | 1.541E−06 | 0.01541 |
| 32 | 0.02759 | 1.661E−06 | 0.01661 |
| 33 | 0.02857 | 1.786E−06 | 0.01786 |
| 34 | 0.02956 | 1.916E−06 | 0.01916 |
| 35 | 0.03054 | 2.052E−06 | 0.02052 |
| 36 | 0.03153 | 2.193E−06 | 0.02193 |
| 37 | 0.03251 | 2.340E−06 | 0.02340 |
| 38 | 0.03350 | 2.493E−06 | 0.02493 |
| 39 | 0.03448 | 2.652E−06 | 0.02652 |
| 40 | 0.03547 | 2.816E−06 | 0.02816 |
| 41 | 0.03645 | 2.987E−06 | 0.02987 |
| 42 | 0.03744 | 3.163E−06 | 0.03163 |
| 43 | 0.03842 | 3.346E−06 | 0.03346 |
| 44 | 0.03941 | 3.536E−06 | 0.03536 |
| 45 | 0.04039 | 3.731E−06 | 0.03731 |
| 46 | 0.04138 | 3.934E−06 | 0.03934 |
| 47 | 0.04236 | 4.143E−06 | 0.04143 |
| 48 | 0.04335 | 4.358E−06 | 0.04358 |
| 49 | 0.04433 | 4.581E−06 | 0.04581 |
| 50 | 0.04532 | 4.810E−06 | 0.04810 |
| 51 | 0.04631 | 5.047E−06 | 0.05047 |
| 52 | 0.04729 | 5.291E−06 | 0.05291 |
| 53 | 0.04828 | 5.542E−06 | 0.05542 |
| 54 | 0.04926 | 5.801E−06 | 0.05801 |
| 55 | 0.05025 | 6.067E−06 | 0.06067 |
| 56 | 0.05123 | 6.341E−06 | 0.06341 |
| 57 | 0.05222 | 6.623E−06 | 0.06623 |
| 58 | 0.05320 | 6.913E−06 | 0.06913 |
| 59 | 0.05419 | 7.211E−06 | 0.07211 |
| 60 | 0.05517 | 7.517E−06 | 0.07517 |
| 61 | 0.05616 | 7.831E−06 | 0.07831 |
| 62 | 0.05714 | 8.154E−06 | 0.08154 |
| 63 | 0.05813 | 8.485E−06 | 0.08485 |
| 64 | 0.05911 | 8.825E−06 | 0.08825 |
| 65 | 0.06010 | 9.174E−06 | 0.09174 |
| 66 | 0.06108 | 9.532E−06 | 0.09532 |
| 67 | 0.06207 | 9.899E−06 | 0.09899 |
| 68 | 0.06305 | 1.027E−05 | 0.10275 |
| 69 | 0.06404 | 1.066E−05 | 0.10660 |
| 70 | 0.06502 | 1.106E−05 | 0.11055 |
| 71 | 0.06601 | 1.146E−05 | 0.11460 |
| 72 | 0.06700 | 1.187E−05 | 0.11874 |
| 73 | 0.06798 | 1.230E−05 | 0.12298 |
| 74 | 0.06897 | 1.273E−05 | 0.12733 |
| 75 | 0.06995 | 1.318E−05 | 0.13177 |
| 76 | 0.07094 | 1.363E−05 | 0.13632 |
| 77 | 0.07192 | 1.410E−05 | 0.14097 |
| 78 | 0.07291 | 1.457E−05 | 0.14573 |
| 79 | 0.07389 | 1.506E−05 | 0.15060 |
| 80 | 0.07488 | 1.556E−05 | 0.15558 |
| 81 | 0.07586 | 1.607E−05 | 0.16067 |
| 82 | 0.07685 | 1.659E−05 | 0.16587 |
| 83 | 0.07783 | 1.712E−05 | 0.17119 |
| 84 | 0.07882 | 1.766E−05 | 0.17662 |
| 85 | 0.07980 | 1.822E−05 | 0.18217 |
| 86 | 0.08079 | 1.878E−05 | 0.18783 |
| 87 | 0.08177 | 1.936E−05 | 0.19362 |
| 88 | 0.08276 | 1.995E−05 | 0.19953 |
| 89 | 0.08374 | 2.056E−05 | 0.20556 |
| 90 | 0.08473 | 2.117E−05 | 0.21172 |
| 91 | 0.08571 | 2.180E−05 | 0.21801 |
| 92 | 0.08670 | 2.244E−05 | 0.22443 |
| 93 | 0.08768 | 2.310E−05 | 0.23097 |
| 94 | 0.08867 | 2.377E−05 | 0.23765 |
| 95 | 0.08966 | 2.445E−05 | 0.24447 |
| 96 | 0.09064 | 2.514E−05 | 0.25142 |
| 97 | 0.09163 | 2.585E−05 | 0.25850 |
| 98 | 0.09261 | 2.657E−05 | 0.26573 |
| 99 | 0.09360 | 2.731E−05 | 0.27310 |
| 100 | 0.09458 | 2.806E−05 | 0.28061 |
| 101 | 0.09557 | 2.883E−05 | 0.28826 |
| 102 | 0.09655 | 2.961E−05 | 0.29607 |
| 103 | 0.09754 | 3.040E−05 | 0.30402 |
| 104 | 0.09852 | 3.121E−05 | 0.31212 |
| 105 | 0.09951 | 3.204E−05 | 0.32038 |
| 106 | 0.10049 | 3.288E−05 | 0.32879 |
| 107 | 0.10148 | 3.374E−05 | 0.33736 |
| 108 | 0.10246 | 3.461E−05 | 0.34608 |
| 109 | 0.10345 | 3.550E−05 | 0.35497 |
| 110 | 0.10443 | 3.640E−05 | 0.36402 |
| 111 | 0.10542 | 3.732E−05 | 0.37324 |
| 112 | 0.10640 | 3.826E−05 | 0.38262 |
| 113 | 0.10739 | 3.922E−05 | 0.39217 |
| 114 | 0.10837 | 4.019E−05 | 0.40189 |
| 115 | 0.10936 | 4.118E−05 | 0.41179 |
| 116 | 0.11034 | 4.219E−05 | 0.42186 |
| 117 | 0.11133 | 4.321E−05 | 0.43211 |
| 118 | 0.11232 | 4.425E−05 | 0.44254 |
| 119 | 0.11330 | 4.531E−05 | 0.45315 |
| 120 | 0.11429 | 4.639E−05 | 0.46394 |
| 121 | 0.11527 | 4.749E−05 | 0.47492 |
| 122 | 0.11626 | 4.861E−05 | 0.48609 |
| 123 | 0.11724 | 4.975E−05 | 0.49746 |
| 124 | 0.11823 | 5.090E−05 | 0.50901 |
| 125 | 0.11921 | 5.208E−05 | 0.52076 |
| 126 | 0.12020 | 5.327E−05 | 0.53271 |
| 127 | 0.12118 | 5.449E−05 | 0.54486 |
| 128 | 0.12217 | 5.572E−05 | 0.55722 |
| 129 | 0.12315 | 5.698E−05 | 0.56978 |
| 130 | 0.12414 | 5.825E−05 | 0.58255 |
| 131 | 0.12512 | 5.955E−05 | 0.59552 |
| 132 | 0.12611 | 6.087E−05 | 0.60872 |
| 133 | 0.12709 | 6.221E−05 | 0.62212 |
| 134 | 0.12808 | 6.357E−05 | 0.63575 |
| 135 | 0.12906 | 6.496E−05 | 0.64959 |
| 136 | 0.13005 | 6.637E−05 | 0.66366 |
| 137 | 0.13103 | 6.780E−05 | 0.67796 |
| 138 | 0.13202 | 6.925E−05 | 0.69248 |
| 139 | 0.13300 | 7.072E−05 | 0.70724 |
| 140 | 0.13399 | 7.222E−05 | 0.72223 |
| 141 | 0.13498 | 7.375E−05 | 0.73746 |
| 142 | 0.13596 | 7.529E−05 | 0.75292 |
| 143 | 0.13695 | 7.686E−05 | 0.76863 |
| 144 | 0.13793 | 7.846E−05 | 0.78458 |
| 145 | 0.13892 | 8.008E−05 | 0.80079 |
| 146 | 0.13990 | 8.172E−05 | 0.81724 |
| 147 | 0.14089 | 8.339E−05 | 0.83395 |
| 148 | 0.14187 | 8.509E−05 | 0.85091 |
| 149 | 0.14286 | 8.681E−05 | 0.86814 |
| 150 | 0.14384 | 8.856E−05 | 0.88562 |
| 151 | 0.14483 | 9.034E−05 | 0.90338 |
| 152 | 0.14581 | 9.214E−05 | 0.92140 |
| 153 | 0.14680 | 9.397E−05 | 0.93969 |
| 154 | 0.14778 | 9.583E−05 | 0.95826 |
| 155 | 0.14877 | 9.771E−05 | 0.97711 |
| 156 | 0.14975 | 9.962E−05 | 0.99624 |
| 157 | 0.15074 | 1.016E−04 | 1.01565 |
| 158 | 0.15172 | 1.035E−04 | 1.03535 |
| 159 | 0.15271 | 1.055E−04 | 1.05534 |
| 160 | 0.15369 | 1.076E−04 | 1.07563 |
| 161 | 0.15468 | 1.096E−04 | 1.09622 |
| 162 | 0.15567 | 1.117E−04 | 1.11710 |
| 163 | 0.15665 | 1.138E−04 | 1.13829 |
| 164 | 0.15764 | 1.160E−04 | 1.15979 |
| 165 | 0.15862 | 1.182E−04 | 1.18160 |
| 166 | 0.15961 | 1.204E−04 | 1.20372 |

TABLE 4-continued

Exemplary Table of Values for 10 bits

| D | V | Y | L (cd/m²) |
|---|---|---|---|
| 167 | 0.16059 | 1.226E−04 | 1.22616 |
| 168 | 0.16158 | 1.249E−04 | 1.24892 |
| 169 | 0.16256 | 1.272E−04 | 1.27201 |
| 170 | 0.16355 | 1.295E−04 | 1.29543 |
| 171 | 0.16453 | 1.319E−04 | 1.31918 |
| 172 | 0.16552 | 1.343E−04 | 1.34326 |
| 173 | 0.16650 | 1.368E−04 | 1.36769 |
| 174 | 0.16749 | 1.392E−04 | 1.39246 |
| 175 | 0.16847 | 1.418E−04 | 1.41758 |
| 176 | 0.16946 | 1.443E−04 | 1.44304 |
| 177 | 0.17044 | 1.469E−04 | 1.46887 |
| 178 | 0.17143 | 1.495E−04 | 1.49505 |
| 179 | 0.17241 | 1.522E−04 | 1.52160 |
| 180 | 0.17340 | 1.549E−04 | 1.54851 |
| 181 | 0.17438 | 1.576E−04 | 1.57579 |
| 182 | 0.17537 | 1.603E−04 | 1.60345 |
| 183 | 0.17635 | 1.631E−04 | 1.63148 |
| 184 | 0.17734 | 1.660E−04 | 1.65990 |
| 185 | 0.17833 | 1.689E−04 | 1.68871 |
| 186 | 0.17931 | 1.718E−04 | 1.71791 |
| 187 | 0.18030 | 1.748E−04 | 1.74750 |
| 188 | 0.18128 | 1.777E−04 | 1.77749 |
| 189 | 0.18227 | 1.808E−04 | 1.80789 |
| 190 | 0.18325 | 1.839E−04 | 1.83870 |
| 191 | 0.18424 | 1.870E−04 | 1.86991 |
| 192 | 0.18522 | 1.902E−04 | 1.90155 |
| 193 | 0.18621 | 1.934E−04 | 1.93361 |
| 194 | 0.18719 | 1.966E−04 | 1.96609 |
| 195 | 0.18818 | 1.999E−04 | 1.99900 |
| 196 | 0.18916 | 2.032E−04 | 2.03235 |
| 197 | 0.19015 | 2.066E−04 | 2.06614 |
| 198 | 0.19113 | 2.100E−04 | 2.10037 |
| 199 | 0.19212 | 2.135E−04 | 2.13506 |
| 200 | 0.19310 | 2.170E−04 | 2.17019 |
| 201 | 0.19409 | 2.206E−04 | 2.20579 |
| 202 | 0.19507 | 2.242E−04 | 2.24185 |
| 203 | 0.19606 | 2.278E−04 | 2.27837 |
| 204 | 0.19704 | 2.315E−04 | 2.31537 |
| 205 | 0.19803 | 2.353E−04 | 2.35285 |
| 206 | 0.19901 | 2.391E−04 | 2.39081 |
| 207 | 0.20000 | 2.429E−04 | 2.42926 |
| 208 | 0.20099 | 2.468E−04 | 2.46821 |
| 209 | 0.20197 | 2.508E−04 | 2.50765 |
| 210 | 0.20296 | 2.548E−04 | 2.54760 |
| 211 | 0.20394 | 2.588E−04 | 2.58805 |
| 212 | 0.20493 | 2.629E−04 | 2.62902 |
| 213 | 0.20591 | 2.671E−04 | 2.67051 |
| 214 | 0.20690 | 2.713E−04 | 2.71252 |
| 215 | 0.20788 | 2.755E−04 | 2.75507 |
| 216 | 0.20887 | 2.798E−04 | 2.79815 |
| 217 | 0.20985 | 2.842E−04 | 2.84177 |
| 218 | 0.21084 | 2.886E−04 | 2.88594 |
| 219 | 0.21182 | 2.931E−04 | 2.93066 |
| 220 | 0.21281 | 2.976E−04 | 2.97594 |
| 221 | 0.21379 | 3.022E−04 | 3.02179 |
| 222 | 0.21478 | 3.068E−04 | 3.06820 |
| 223 | 0.21576 | 3.115E−04 | 3.11519 |
| 224 | 0.21675 | 3.163E−04 | 3.16276 |
| 225 | 0.21773 | 3.211E−04 | 3.21092 |
| 226 | 0.21872 | 3.260E−04 | 3.25967 |
| 227 | 0.21970 | 3.309E−04 | 3.30903 |
| 228 | 0.22069 | 3.359E−04 | 3.35898 |
| 229 | 0.22167 | 3.410E−04 | 3.40955 |
| 230 | 0.22266 | 3.461E−04 | 3.46074 |
| 231 | 0.22365 | 3.513E−04 | 3.51255 |
| 232 | 0.22463 | 3.565E−04 | 3.56500 |
| 233 | 0.22562 | 3.618E−04 | 3.61808 |
| 234 | 0.22660 | 3.672E−04 | 3.67180 |
| 235 | 0.22759 | 3.726E−04 | 3.72618 |
| 236 | 0.22857 | 3.781E−04 | 3.78121 |
| 237 | 0.22956 | 3.837E−04 | 3.83690 |
| 238 | 0.23054 | 3.893E−04 | 3.89327 |
| 239 | 0.23153 | 3.950E−04 | 3.95031 |
| 240 | 0.23251 | 4.008E−04 | 4.00803 |
| 241 | 0.23350 | 4.066E−04 | 4.06645 |
| 242 | 0.23448 | 4.126E−04 | 4.12556 |
| 243 | 0.23547 | 4.185E−04 | 4.18537 |
| 244 | 0.23645 | 4.246E−04 | 4.24590 |
| 245 | 0.23744 | 4.307E−04 | 4.30715 |
| 246 | 0.23842 | 4.369E−04 | 4.36912 |
| 247 | 0.23941 | 4.432E−04 | 4.43182 |
| 248 | 0.24039 | 4.495E−04 | 4.49527 |
| 249 | 0.24138 | 4.559E−04 | 4.55946 |
| 250 | 0.24236 | 4.624E−04 | 4.62440 |
| 251 | 0.24335 | 4.690E−04 | 4.69011 |
| 252 | 0.24433 | 4.757E−04 | 4.75659 |
| 253 | 0.24532 | 4.824E−04 | 4.82385 |
| 254 | 0.24631 | 4.892E−04 | 4.89189 |
| 255 | 0.24729 | 4.961E−04 | 4.96073 |
| 256 | 0.24828 | 5.030E−04 | 5.03036 |
| 257 | 0.24926 | 5.101E−04 | 5.10081 |
| 258 | 0.25025 | 5.172E−04 | 5.17207 |
| 259 | 0.25123 | 5.244E−04 | 5.24416 |
| 260 | 0.25222 | 5.317E−04 | 5.31707 |
| 261 | 0.25320 | 5.391E−04 | 5.39084 |
| 262 | 0.25419 | 5.465E−04 | 5.46545 |
| 263 | 0.25517 | 5.541E−04 | 5.54091 |
| 264 | 0.25616 | 5.617E−04 | 5.61725 |
| 265 | 0.25714 | 5.694E−04 | 5.69446 |
| 266 | 0.25813 | 5.773E−04 | 5.77255 |
| 267 | 0.25911 | 5.852E−04 | 5.85153 |
| 268 | 0.26010 | 5.931E−04 | 5.93142 |
| 269 | 0.26108 | 6.012E−04 | 6.01221 |
| 270 | 0.26207 | 6.094E−04 | 6.09393 |
| 271 | 0.26305 | 6.177E−04 | 6.17657 |
| 272 | 0.26404 | 6.260E−04 | 6.26014 |
| 273 | 0.26502 | 6.345E−04 | 6.34467 |
| 274 | 0.26601 | 6.430E−04 | 6.43014 |
| 275 | 0.26700 | 6.517E−04 | 6.51658 |
| 276 | 0.26798 | 6.604E−04 | 6.60400 |
| 277 | 0.26897 | 6.692E−04 | 6.69239 |
| 278 | 0.26995 | 6.782E−04 | 6.78178 |
| 279 | 0.27094 | 6.872E−04 | 6.87217 |
| 280 | 0.27192 | 6.964E−04 | 6.96357 |
| 281 | 0.27291 | 7.056E−04 | 7.05600 |
| 282 | 0.27389 | 7.149E−04 | 7.14945 |
| 283 | 0.27488 | 7.244E−04 | 7.24395 |
| 284 | 0.27586 | 7.339E−04 | 7.33949 |
| 285 | 0.27685 | 7.436E−04 | 7.43610 |
| 286 | 0.27783 | 7.534E−04 | 7.53378 |
| 287 | 0.27882 | 7.633E−04 | 7.63254 |
| 288 | 0.27980 | 7.732E−04 | 7.73240 |
| 289 | 0.28079 | 7.833E−04 | 7.83335 |
| 290 | 0.28177 | 7.935E−04 | 7.93542 |
| 291 | 0.28276 | 8.039E−04 | 8.03862 |
| 292 | 0.28374 | 8.143E−04 | 8.14295 |
| 293 | 0.28473 | 8.248E−04 | 8.24842 |
| 294 | 0.28571 | 8.355E−04 | 8.35505 |
| 295 | 0.28670 | 8.463E−04 | 8.46285 |
| 296 | 0.28768 | 8.572E−04 | 8.57183 |
| 297 | 0.28867 | 8.682E−04 | 8.68200 |
| 298 | 0.28966 | 8.793E−04 | 8.79337 |
| 299 | 0.29064 | 8.906E−04 | 8.90595 |
| 300 | 0.29163 | 9.020E−04 | 9.01976 |
| 301 | 0.29261 | 9.135E−04 | 9.13480 |
| 302 | 0.29360 | 9.251E−04 | 9.25109 |
| 303 | 0.29458 | 9.369E−04 | 9.36864 |
| 304 | 0.29557 | 9.487E−04 | 9.48746 |
| 305 | 0.29655 | 9.608E−04 | 9.60757 |
| 306 | 0.29754 | 9.729E−04 | 9.72897 |
| 307 | 0.29852 | 9.852E−04 | 9.85168 |
| 308 | 0.29951 | 9.976E−04 | 9.97571 |
| 309 | 0.30049 | 1.010E−03 | 10.10108 |
| 310 | 0.30148 | 1.023E−03 | 10.22779 |
| 311 | 0.30246 | 1.036E−03 | 10.35585 |
| 312 | 0.30345 | 1.049E−03 | 10.48529 |
| 313 | 0.30443 | 1.062E−03 | 10.61612 |
| 314 | 0.30542 | 1.075E−03 | 10.74834 |
| 315 | 0.30640 | 1.088E−03 | 10.88197 |
| 316 | 0.30739 | 1.102E−03 | 11.01703 |
| 317 | 0.30837 | 1.115E−03 | 11.15352 |
| 318 | 0.30936 | 1.129E−03 | 11.29147 |

TABLE 4-continued

Exemplary Table of Values for 10 bits

| D | V | Y | L (cd/m²) |
|---|---|---|---|
| 319 | 0.31034 | 1.143E−03 | 11.43087 |
| 320 | 0.31133 | 1.157E−03 | 11.57176 |
| 321 | 0.31232 | 1.171E−03 | 11.71414 |
| 322 | 0.31330 | 1.186E−03 | 11.85803 |
| 323 | 0.31429 | 1.200E−03 | 12.00343 |
| 324 | 0.31527 | 1.215E−03 | 12.15037 |
| 325 | 0.31626 | 1.230E−03 | 12.29886 |
| 326 | 0.31724 | 1.245E−03 | 12.44891 |
| 327 | 0.31823 | 1.260E−03 | 12.60054 |
| 328 | 0.31921 | 1.275E−03 | 12.75376 |
| 329 | 0.32020 | 1.291E−03 | 12.90859 |
| 330 | 0.32118 | 1.307E−03 | 13.06505 |
| 331 | 0.32217 | 1.322E−03 | 13.22314 |
| 332 | 0.32315 | 1.338E−03 | 13.38288 |
| 333 | 0.32414 | 1.354E−03 | 13.54430 |
| 334 | 0.32512 | 1.371E−03 | 13.70739 |
| 335 | 0.32611 | 1.387E−03 | 13.87219 |
| 336 | 0.32709 | 1.404E−03 | 14.03870 |
| 337 | 0.32808 | 1.421E−03 | 14.20695 |
| 338 | 0.32906 | 1.438E−03 | 14.37694 |
| 339 | 0.33005 | 1.455E−03 | 14.54869 |
| 340 | 0.33103 | 1.472E−03 | 14.72223 |
| 341 | 0.33202 | 1.490E−03 | 14.89756 |
| 342 | 0.33300 | 1.507E−03 | 15.07471 |
| 343 | 0.33399 | 1.525E−03 | 15.25369 |
| 344 | 0.33498 | 1.543E−03 | 15.43451 |
| 345 | 0.33596 | 1.562E−03 | 15.61720 |
| 346 | 0.33695 | 1.580E−03 | 15.80177 |
| 347 | 0.33793 | 1.599E−03 | 15.98824 |
| 348 | 0.33892 | 1.618E−03 | 16.17663 |
| 349 | 0.33990 | 1.637E−03 | 16.36695 |
| 350 | 0.34089 | 1.656E−03 | 16.55922 |
| 351 | 0.34187 | 1.675E−03 | 16.75346 |
| 352 | 0.34286 | 1.695E−03 | 16.94970 |
| 353 | 0.34384 | 1.715E−03 | 17.14794 |
| 354 | 0.34483 | 1.735E−03 | 17.34820 |
| 355 | 0.34581 | 1.755E−03 | 17.55051 |
| 356 | 0.34680 | 1.775E−03 | 17.75488 |
| 357 | 0.34778 | 1.796E−03 | 17.96133 |
| 358 | 0.34877 | 1.817E−03 | 18.16989 |
| 359 | 0.34975 | 1.838E−03 | 18.38056 |
| 360 | 0.35074 | 1.859E−03 | 18.59338 |
| 361 | 0.35172 | 1.881E−03 | 18.80835 |
| 362 | 0.35271 | 1.903E−03 | 19.02551 |
| 363 | 0.35369 | 1.924E−03 | 19.24486 |
| 364 | 0.35468 | 1.947E−03 | 19.46644 |
| 365 | 0.35567 | 1.969E−03 | 19.69025 |
| 366 | 0.35665 | 1.992E−03 | 19.91632 |
| 367 | 0.35764 | 2.014E−03 | 20.14468 |
| 368 | 0.35862 | 2.038E−03 | 20.37534 |
| 369 | 0.35961 | 2.061E−03 | 20.60832 |
| 370 | 0.36059 | 2.084E−03 | 20.84364 |
| 371 | 0.36158 | 2.108E−03 | 21.08134 |
| 372 | 0.36256 | 2.132E−03 | 21.32141 |
| 373 | 0.36355 | 2.156E−03 | 21.56390 |
| 374 | 0.36453 | 2.181E−03 | 21.80882 |
| 375 | 0.36552 | 2.206E−03 | 22.05620 |
| 376 | 0.36650 | 2.231E−03 | 22.30605 |
| 377 | 0.36749 | 2.256E−03 | 22.55840 |
| 378 | 0.36847 | 2.281E−03 | 22.81327 |
| 379 | 0.36946 | 2.307E−03 | 23.07068 |
| 380 | 0.37044 | 2.333E−03 | 23.33067 |
| 381 | 0.37143 | 2.359E−03 | 23.59324 |
| 382 | 0.37241 | 2.386E−03 | 23.85843 |
| 383 | 0.37340 | 2.413E−03 | 24.12626 |
| 384 | 0.37438 | 2.440E−03 | 24.39674 |
| 385 | 0.37537 | 2.467E−03 | 24.66992 |
| 386 | 0.37635 | 2.495E−03 | 24.94581 |
| 387 | 0.37734 | 2.522E−03 | 25.22443 |
| 388 | 0.37833 | 2.551E−03 | 25.50582 |
| 389 | 0.37931 | 2.579E−03 | 25.78999 |
| 390 | 0.38030 | 2.608E−03 | 26.07697 |
| 391 | 0.38128 | 2.637E−03 | 26.36679 |
| 392 | 0.38227 | 2.666E−03 | 26.65947 |
| 393 | 0.38325 | 2.696E−03 | 26.95504 |
| 394 | 0.38424 | 2.725E−03 | 27.25352 |
| 395 | 0.38522 | 2.755E−03 | 27.55495 |
| 396 | 0.38621 | 2.786E−03 | 27.85934 |
| 397 | 0.38719 | 2.817E−03 | 28.16672 |
| 398 | 0.38818 | 2.848E−03 | 28.47713 |
| 399 | 0.38916 | 2.879E−03 | 28.79059 |
| 400 | 0.39015 | 2.911E−03 | 29.10712 |
| 401 | 0.39113 | 2.943E−03 | 29.42676 |
| 402 | 0.39212 | 2.975E−03 | 29.74953 |
| 403 | 0.39310 | 3.008E−03 | 30.07546 |
| 404 | 0.39409 | 3.040E−03 | 30.40459 |
| 405 | 0.39507 | 3.074E−03 | 30.73692 |
| 406 | 0.39606 | 3.107E−03 | 31.07251 |
| 407 | 0.39704 | 3.141E−03 | 31.41137 |
| 408 | 0.39803 | 3.175E−03 | 31.75354 |
| 409 | 0.39901 | 3.210E−03 | 32.09905 |
| 410 | 0.40000 | 3.245E−03 | 32.44792 |
| 411 | 0.40099 | 3.280E−03 | 32.80018 |
| 412 | 0.40197 | 3.316E−03 | 33.15588 |
| 413 | 0.40296 | 3.352E−03 | 33.51503 |
| 414 | 0.40394 | 3.388E−03 | 33.87767 |
| 415 | 0.40493 | 3.424E−03 | 34.24383 |
| 416 | 0.40591 | 3.461E−03 | 34.61355 |
| 417 | 0.40690 | 3.499E−03 | 34.98684 |
| 418 | 0.40788 | 3.536E−03 | 35.36376 |
| 419 | 0.40887 | 3.574E−03 | 35.74432 |
| 420 | 0.40985 | 3.613E−03 | 36.12857 |
| 421 | 0.41084 | 3.652E−03 | 36.51652 |
| 422 | 0.41182 | 3.691E−03 | 36.90823 |
| 423 | 0.41281 | 3.730E−03 | 37.30372 |
| 424 | 0.41379 | 3.770E−03 | 37.70303 |
| 425 | 0.41478 | 3.811E−03 | 38.10618 |
| 426 | 0.41576 | 3.851E−03 | 38.51322 |
| 427 | 0.41675 | 3.892E−03 | 38.92418 |
| 428 | 0.41773 | 3.934E−03 | 39.33909 |
| 429 | 0.41872 | 3.976E−03 | 39.75800 |
| 430 | 0.41970 | 4.018E−03 | 40.18093 |
| 431 | 0.42069 | 4.061E−03 | 40.60792 |
| 432 | 0.42167 | 4.104E−03 | 41.03901 |
| 433 | 0.42266 | 4.147E−03 | 41.47423 |
| 434 | 0.42365 | 4.191E−03 | 41.91363 |
| 435 | 0.42463 | 4.236E−03 | 42.35723 |
| 436 | 0.42562 | 4.281E−03 | 42.80509 |
| 437 | 0.42660 | 4.326E−03 | 43.25723 |
| 438 | 0.42759 | 4.371E−03 | 43.71369 |
| 439 | 0.42857 | 4.417E−03 | 44.17451 |
| 440 | 0.42956 | 4.464E−03 | 44.63974 |
| 441 | 0.43054 | 4.511E−03 | 45.10941 |
| 442 | 0.43153 | 4.558E−03 | 45.58355 |
| 443 | 0.43251 | 4.606E−03 | 46.06222 |
| 444 | 0.43350 | 4.655E−03 | 46.54545 |
| 445 | 0.43448 | 4.703E−03 | 47.03328 |
| 446 | 0.43547 | 4.753E−03 | 47.52575 |
| 447 | 0.43645 | 4.802E−03 | 48.02291 |
| 448 | 0.43744 | 4.852E−03 | 48.52479 |
| 449 | 0.43842 | 4.903E−03 | 49.03144 |
| 450 | 0.43941 | 4.954E−03 | 49.54290 |
| 451 | 0.44039 | 5.006E−03 | 50.05921 |
| 452 | 0.44138 | 5.058E−03 | 50.58042 |
| 453 | 0.44236 | 5.111E−03 | 51.10657 |
| 454 | 0.44335 | 5.164E−03 | 51.63771 |
| 455 | 0.44433 | 5.217E−03 | 52.17387 |
| 456 | 0.44532 | 5.272E−03 | 52.71511 |
| 457 | 0.44631 | 5.326E−03 | 53.26147 |
| 458 | 0.44729 | 5.381E−03 | 53.81299 |
| 459 | 0.44828 | 5.437E−03 | 54.36973 |
| 460 | 0.44926 | 5.493E−03 | 54.93172 |
| 461 | 0.45025 | 5.550E−03 | 55.49901 |
| 462 | 0.45123 | 5.607E−03 | 56.07166 |
| 463 | 0.45222 | 5.665E−03 | 56.64970 |
| 464 | 0.45320 | 5.723E−03 | 57.23319 |
| 465 | 0.45419 | 5.782E−03 | 57.82218 |
| 466 | 0.45517 | 5.842E−03 | 58.41671 |
| 467 | 0.45616 | 5.902E−03 | 59.01683 |
| 468 | 0.45714 | 5.962E−03 | 59.62260 |
| 469 | 0.45813 | 6.023E−03 | 60.23406 |
| 470 | 0.45911 | 6.085E−03 | 60.85126 |

TABLE 4-continued

Exemplary Table of Values for 10 bits

| D | V | Y | L (cd/m²) |
|---|---|---|---|
| 471 | 0.46010 | 6.147E−03 | 61.47426 |
| 472 | 0.46108 | 6.210E−03 | 62.10311 |
| 473 | 0.46207 | 6.274E−03 | 62.73785 |
| 474 | 0.46305 | 6.338E−03 | 63.37855 |
| 475 | 0.46404 | 6.403E−03 | 64.02525 |
| 476 | 0.46502 | 6.468E−03 | 64.67801 |
| 477 | 0.46601 | 6.534E−03 | 65.33688 |
| 478 | 0.46700 | 6.600E−03 | 66.00191 |
| 479 | 0.46798 | 6.667E−03 | 66.67316 |
| 480 | 0.46897 | 6.735E−03 | 67.35069 |
| 481 | 0.46995 | 6.803E−03 | 68.03455 |
| 482 | 0.47094 | 6.872E−03 | 68.72480 |
| 483 | 0.47192 | 6.942E−03 | 69.42149 |
| 484 | 0.47291 | 7.012E−03 | 70.12468 |
| 485 | 0.47389 | 7.083E−03 | 70.83443 |
| 486 | 0.47488 | 7.155E−03 | 71.55079 |
| 487 | 0.47586 | 7.227E−03 | 72.27383 |
| 488 | 0.47685 | 7.300E−03 | 73.00361 |
| 489 | 0.47783 | 7.374E−03 | 73.74018 |
| 490 | 0.47882 | 7.448E−03 | 74.48361 |
| 491 | 0.47980 | 7.523E−03 | 75.23395 |
| 492 | 0.48079 | 7.599E−03 | 75.99127 |
| 493 | 0.48177 | 7.676E−03 | 76.75562 |
| 494 | 0.48276 | 7.753E−03 | 77.52708 |
| 495 | 0.48374 | 7.831E−03 | 78.30570 |
| 496 | 0.48473 | 7.909E−03 | 79.09155 |
| 497 | 0.48571 | 7.988E−03 | 79.88469 |
| 498 | 0.48670 | 8.069E−03 | 80.68519 |
| 499 | 0.48768 | 8.149E−03 | 81.49310 |
| 500 | 0.48867 | 8.231E−03 | 82.30851 |
| 501 | 0.48966 | 8.313E−03 | 83.13146 |
| 502 | 0.49064 | 8.396E−03 | 83.96204 |
| 503 | 0.49163 | 8.480E−03 | 84.80031 |
| 504 | 0.49261 | 8.565E−03 | 85.64633 |
| 505 | 0.49360 | 8.650E−03 | 86.50017 |
| 506 | 0.49458 | 8.736E−03 | 87.36191 |
| 507 | 0.49557 | 8.823E−03 | 88.23161 |
| 508 | 0.49655 | 8.911E−03 | 89.10934 |
| 509 | 0.49754 | 9.000E−03 | 89.99518 |
| 510 | 0.49852 | 9.089E−03 | 90.88920 |
| 511 | 0.49951 | 9.179E−03 | 91.79146 |
| 512 | 0.50049 | 9.270E−03 | 92.70205 |
| 513 | 0.50148 | 9.362E−03 | 93.62103 |
| 514 | 0.50246 | 9.455E−03 | 94.54848 |
| 515 | 0.50345 | 9.548E−03 | 95.48448 |
| 516 | 0.50443 | 9.643E−03 | 96.42909 |
| 517 | 0.50542 | 9.738E−03 | 97.38241 |
| 518 | 0.50640 | 9.834E−03 | 98.34449 |
| 519 | 0.50739 | 9.932E−03 | 99.31543 |
| 520 | 0.50837 | 1.003E−02 | 100.29530 |
| 521 | 0.50936 | 1.013E−02 | 101.28417 |
| 522 | 0.51034 | 1.023E−02 | 102.28213 |
| 523 | 0.51133 | 1.033E−02 | 103.28927 |
| 524 | 0.51232 | 1.043E−02 | 104.30565 |
| 525 | 0.51330 | 1.053E−02 | 105.33136 |
| 526 | 0.51429 | 1.064E−02 | 106.36648 |
| 527 | 0.51527 | 1.074E−02 | 107.41110 |
| 528 | 0.51626 | 1.085E−02 | 108.46530 |
| 529 | 0.51724 | 1.095E−02 | 109.52917 |
| 530 | 0.51823 | 1.106E−02 | 110.60279 |
| 531 | 0.51921 | 1.117E−02 | 111.68624 |
| 532 | 0.52020 | 1.128E−02 | 112.77962 |
| 533 | 0.52118 | 1.139E−02 | 113.88301 |
| 534 | 0.52217 | 1.150E−02 | 114.99650 |
| 535 | 0.52315 | 1.161E−02 | 116.12018 |
| 536 | 0.52414 | 1.173E−02 | 117.25414 |
| 537 | 0.52512 | 1.184E−02 | 118.39847 |
| 538 | 0.52611 | 1.196E−02 | 119.55326 |
| 539 | 0.52709 | 1.207E−02 | 120.71860 |
| 540 | 0.52808 | 1.219E−02 | 121.89459 |
| 541 | 0.52906 | 1.231E−02 | 123.08132 |
| 542 | 0.53005 | 1.243E−02 | 124.27889 |
| 543 | 0.53103 | 1.255E−02 | 125.48739 |
| 544 | 0.53202 | 1.267E−02 | 126.70692 |
| 545 | 0.53300 | 1.279E−02 | 127.93758 |
| 546 | 0.53399 | 1.292E−02 | 129.17946 |
| 547 | 0.53498 | 1.304E−02 | 130.43266 |
| 548 | 0.53596 | 1.317E−02 | 131.69729 |
| 549 | 0.53695 | 1.330E−02 | 132.97344 |
| 550 | 0.53793 | 1.343E−02 | 134.26122 |
| 551 | 0.53892 | 1.356E−02 | 135.56073 |
| 552 | 0.53990 | 1.369E−02 | 136.87207 |
| 553 | 0.54089 | 1.382E−02 | 138.19535 |
| 554 | 0.54187 | 1.395E−02 | 139.53067 |
| 555 | 0.54286 | 1.409E−02 | 140.87814 |
| 556 | 0.54384 | 1.422E−02 | 142.23786 |
| 557 | 0.54483 | 1.436E−02 | 143.60995 |
| 558 | 0.54581 | 1.450E−02 | 144.99451 |
| 559 | 0.54680 | 1.464E−02 | 146.39166 |
| 560 | 0.54778 | 1.478E−02 | 147.80150 |
| 561 | 0.54877 | 1.492E−02 | 149.22415 |
| 562 | 0.54975 | 1.507E−02 | 150.65972 |
| 563 | 0.55074 | 1.521E−02 | 152.10833 |
| 564 | 0.55172 | 1.536E−02 | 153.57009 |
| 565 | 0.55271 | 1.550E−02 | 155.04511 |
| 566 | 0.55369 | 1.565E−02 | 156.53351 |
| 567 | 0.55468 | 1.580E−02 | 158.03542 |
| 568 | 0.55567 | 1.596E−02 | 159.55094 |
| 569 | 0.55665 | 1.611E−02 | 161.08021 |
| 570 | 0.55764 | 1.626E−02 | 162.62334 |
| 571 | 0.55862 | 1.642E−02 | 164.18046 |
| 572 | 0.55961 | 1.658E−02 | 165.75168 |
| 573 | 0.56059 | 1.673E−02 | 167.33714 |
| 574 | 0.56158 | 1.689E−02 | 168.93696 |
| 575 | 0.56256 | 1.706E−02 | 170.55126 |
| 576 | 0.56355 | 1.722E−02 | 172.18018 |
| 577 | 0.56453 | 1.738E−02 | 173.82384 |
| 578 | 0.56552 | 1.755E−02 | 175.48237 |
| 579 | 0.56650 | 1.772E−02 | 177.15591 |
| 580 | 0.56749 | 1.788E−02 | 178.84459 |
| 581 | 0.56847 | 1.805E−02 | 180.54854 |
| 582 | 0.56946 | 1.823E−02 | 182.26789 |
| 583 | 0.57044 | 1.840E−02 | 184.00279 |
| 584 | 0.57143 | 1.858E−02 | 185.75337 |
| 585 | 0.57241 | 1.875E−02 | 187.51977 |
| 586 | 0.57340 | 1.893E−02 | 189.30212 |
| 587 | 0.57438 | 1.911E−02 | 191.10058 |
| 588 | 0.57537 | 1.929E−02 | 192.91528 |
| 589 | 0.57635 | 1.947E−02 | 194.74636 |
| 590 | 0.57734 | 1.966E−02 | 196.59398 |
| 591 | 0.57833 | 1.985E−02 | 198.45827 |
| 592 | 0.57931 | 2.003E−02 | 200.33939 |
| 593 | 0.58030 | 2.022E−02 | 202.23748 |
| 594 | 0.58128 | 2.042E−02 | 204.15270 |
| 595 | 0.58227 | 2.061E−02 | 206.08519 |
| 596 | 0.58325 | 2.080E−02 | 208.03511 |
| 597 | 0.58424 | 2.100E−02 | 210.00261 |
| 598 | 0.58522 | 2.120E−02 | 211.98785 |
| 599 | 0.58621 | 2.140E−02 | 213.99098 |
| 600 | 0.58719 | 2.160E−02 | 216.01217 |
| 601 | 0.58818 | 2.181E−02 | 218.05157 |
| 602 | 0.58916 | 2.201E−02 | 220.10935 |
| 603 | 0.59015 | 2.222E−02 | 222.18566 |
| 604 | 0.59113 | 2.243E−02 | 224.28067 |
| 605 | 0.59212 | 2.264E−02 | 226.39455 |
| 606 | 0.59310 | 2.285E−02 | 228.52747 |
| 607 | 0.59409 | 2.307E−02 | 230.67959 |
| 608 | 0.59507 | 2.329E−02 | 232.85108 |
| 609 | 0.59606 | 2.350E−02 | 235.04212 |
| 610 | 0.59704 | 2.373E−02 | 237.25287 |
| 611 | 0.59803 | 2.395E−02 | 239.48352 |
| 612 | 0.59901 | 2.417E−02 | 241.73423 |
| 613 | 0.60000 | 2.440E−02 | 244.00519 |
| 614 | 0.60099 | 2.463E−02 | 246.29658 |
| 615 | 0.60197 | 2.486E−02 | 248.60857 |
| 616 | 0.60296 | 2.509E−02 | 250.94136 |
| 617 | 0.60394 | 2.533E−02 | 253.29512 |
| 618 | 0.60493 | 2.557E−02 | 255.67004 |
| 619 | 0.60591 | 2.581E−02 | 258.06630 |
| 620 | 0.60690 | 2.605E−02 | 260.48411 |
| 621 | 0.60788 | 2.629E−02 | 262.92364 |
| 622 | 0.60887 | 2.654E−02 | 265.38509 |

TABLE 4-continued

Exemplary Table of Values for 10 bits

| D | V | Y | L (cd/m²) |
|---|---|---|---|
| 623 | 0.60985 | 2.679E−02 | 267.86866 |
| 624 | 0.61084 | 2.704E−02 | 270.37454 |
| 625 | 0.61182 | 2.729E−02 | 272.90293 |
| 626 | 0.61281 | 2.755E−02 | 275.45403 |
| 627 | 0.61379 | 2.780E−02 | 278.02804 |
| 628 | 0.61478 | 2.806E−02 | 280.62516 |
| 629 | 0.61576 | 2.832E−02 | 283.24561 |
| 630 | 0.61675 | 2.859E−02 | 285.88958 |
| 631 | 0.61773 | 2.886E−02 | 288.55729 |
| 632 | 0.61872 | 2.912E−02 | 291.24894 |
| 633 | 0.61970 | 2.940E−02 | 293.96476 |
| 634 | 0.62069 | 2.967E−02 | 296.70495 |
| 635 | 0.62167 | 2.995E−02 | 299.46973 |
| 636 | 0.62266 | 3.023E−02 | 302.25931 |
| 637 | 0.62365 | 3.051E−02 | 305.07393 |
| 638 | 0.62463 | 3.079E−02 | 307.91380 |
| 639 | 0.62562 | 3.108E−02 | 310.77915 |
| 640 | 0.62660 | 3.137E−02 | 313.67020 |
| 641 | 0.62759 | 3.166E−02 | 316.58719 |
| 642 | 0.62857 | 3.195E−02 | 319.53033 |
| 643 | 0.62956 | 3.225E−02 | 322.49987 |
| 644 | 0.63054 | 3.255E−02 | 325.49605 |
| 645 | 0.63153 | 3.285E−02 | 328.51909 |
| 646 | 0.63251 | 3.316E−02 | 331.56923 |
| 647 | 0.63350 | 3.346E−02 | 334.64673 |
| 648 | 0.63448 | 3.378E−02 | 337.75181 |
| 649 | 0.63547 | 3.409E−02 | 340.88473 |
| 650 | 0.63645 | 3.440E−02 | 344.04574 |
| 651 | 0.63744 | 3.472E−02 | 347.23509 |
| 652 | 0.63842 | 3.505E−02 | 350.45302 |
| 653 | 0.63941 | 3.537E−02 | 353.69979 |
| 654 | 0.64039 | 3.570E−02 | 356.97566 |
| 655 | 0.64138 | 3.603E−02 | 360.28090 |
| 656 | 0.64236 | 3.636E−02 | 363.61575 |
| 657 | 0.64335 | 3.670E−02 | 366.98049 |
| 658 | 0.64433 | 3.704E−02 | 370.37537 |
| 659 | 0.64532 | 3.738E−02 | 373.80068 |
| 660 | 0.64631 | 3.773E−02 | 377.25668 |
| 661 | 0.64729 | 3.807E−02 | 380.74365 |
| 662 | 0.64828 | 3.843E−02 | 384.26186 |
| 663 | 0.64926 | 3.878E−02 | 387.81159 |
| 664 | 0.65025 | 3.914E−02 | 391.39312 |
| 665 | 0.65123 | 3.950E−02 | 395.00674 |
| 666 | 0.65222 | 3.987E−02 | 398.65273 |
| 667 | 0.65320 | 4.023E−02 | 402.33138 |
| 668 | 0.65419 | 4.060E−02 | 406.04299 |
| 669 | 0.65517 | 4.098E−02 | 409.78784 |
| 670 | 0.65616 | 4.136E−02 | 413.56624 |
| 671 | 0.65714 | 4.174E−02 | 417.37849 |
| 672 | 0.65813 | 4.212E−02 | 421.22488 |
| 673 | 0.65911 | 4.251E−02 | 425.10573 |
| 674 | 0.66010 | 4.290E−02 | 429.02134 |
| 675 | 0.66108 | 4.330E−02 | 432.97202 |
| 676 | 0.66207 | 4.370E−02 | 436.95808 |
| 677 | 0.66305 | 4.410E−02 | 440.97986 |
| 678 | 0.66404 | 4.450E−02 | 445.03765 |
| 679 | 0.66502 | 4.491E−02 | 449.13179 |
| 680 | 0.66601 | 4.533E−02 | 453.26260 |
| 681 | 0.66700 | 4.574E−02 | 457.43041 |
| 682 | 0.66798 | 4.616E−02 | 461.63555 |
| 683 | 0.66897 | 4.659E−02 | 465.87835 |
| 684 | 0.66995 | 4.702E−02 | 470.15916 |
| 685 | 0.67094 | 4.745E−02 | 474.47831 |
| 686 | 0.67192 | 4.788E−02 | 478.83615 |
| 687 | 0.67291 | 4.832E−02 | 483.23302 |
| 688 | 0.67389 | 4.877E−02 | 487.66928 |
| 689 | 0.67488 | 4.921E−02 | 492.14528 |
| 690 | 0.67586 | 4.967E−02 | 496.66137 |
| 691 | 0.67685 | 5.012E−02 | 501.21792 |
| 692 | 0.67783 | 5.058E−02 | 505.81528 |
| 693 | 0.67882 | 5.105E−02 | 510.45383 |
| 694 | 0.67980 | 5.151E−02 | 515.13393 |
| 695 | 0.68079 | 5.199E−02 | 519.85596 |
| 696 | 0.68177 | 5.246E−02 | 524.62029 |
| 697 | 0.68276 | 5.294E−02 | 529.42731 |
| 698 | 0.68374 | 5.343E−02 | 534.27740 |
| 699 | 0.68473 | 5.392E−02 | 539.17094 |
| 700 | 0.68571 | 5.441E−02 | 544.10833 |
| 701 | 0.68670 | 5.491E−02 | 549.08996 |
| 702 | 0.68768 | 5.541E−02 | 554.11624 |
| 703 | 0.68867 | 5.592E−02 | 559.18755 |
| 704 | 0.68966 | 5.643E−02 | 564.30431 |
| 705 | 0.69064 | 5.695E−02 | 569.46692 |
| 706 | 0.69163 | 5.747E−02 | 574.67581 |
| 707 | 0.69261 | 5.799E−02 | 579.93138 |
| 708 | 0.69360 | 5.852E−02 | 585.23405 |
| 709 | 0.69458 | 5.906E−02 | 590.58426 |
| 710 | 0.69557 | 5.960E−02 | 595.98243 |
| 711 | 0.69655 | 6.014E−02 | 601.42899 |
| 712 | 0.69754 | 6.069E−02 | 606.92438 |
| 713 | 0.69852 | 6.125E−02 | 612.46904 |
| 714 | 0.69951 | 6.181E−02 | 618.06341 |
| 715 | 0.70049 | 6.237E−02 | 623.70795 |
| 716 | 0.70148 | 6.294E−02 | 629.40310 |
| 717 | 0.70246 | 6.351E−02 | 635.14933 |
| 718 | 0.70345 | 6.409E−02 | 640.94709 |
| 719 | 0.70443 | 6.468E−02 | 646.79685 |
| 720 | 0.70542 | 6.527E−02 | 652.69908 |
| 721 | 0.70640 | 6.587E−02 | 658.65426 |
| 722 | 0.70739 | 6.647E−02 | 664.66286 |
| 723 | 0.70837 | 6.707E−02 | 670.72537 |
| 724 | 0.70936 | 6.768E−02 | 676.84228 |
| 725 | 0.71034 | 6.830E−02 | 683.01407 |
| 726 | 0.71133 | 6.892E−02 | 689.24124 |
| 727 | 0.71232 | 6.955E−02 | 695.52430 |
| 728 | 0.71330 | 7.019E−02 | 701.86376 |
| 729 | 0.71429 | 7.083E−02 | 708.26011 |
| 730 | 0.71527 | 7.147E−02 | 714.71389 |
| 731 | 0.71626 | 7.212E−02 | 721.22561 |
| 732 | 0.71724 | 7.278E−02 | 727.79579 |
| 733 | 0.71823 | 7.344E−02 | 734.42496 |
| 734 | 0.71921 | 7.411E−02 | 741.11367 |
| 735 | 0.72020 | 7.479E−02 | 747.86245 |
| 736 | 0.72118 | 7.547E−02 | 754.67184 |
| 737 | 0.72217 | 7.615E−02 | 761.54240 |
| 738 | 0.72315 | 7.685E−02 | 768.47469 |
| 739 | 0.72414 | 7.755E−02 | 775.46925 |
| 740 | 0.72512 | 7.825E−02 | 782.52667 |
| 741 | 0.72611 | 7.896E−02 | 789.64751 |
| 742 | 0.72709 | 7.968E−02 | 796.83234 |
| 743 | 0.72808 | 8.041E−02 | 804.08176 |
| 744 | 0.72906 | 8.114E−02 | 811.39634 |
| 745 | 0.73005 | 8.188E−02 | 818.77668 |
| 746 | 0.73103 | 8.262E−02 | 826.22339 |
| 747 | 0.73202 | 8.337E−02 | 833.73706 |
| 748 | 0.73300 | 8.413E−02 | 841.31830 |
| 749 | 0.73399 | 8.490E−02 | 848.96773 |
| 750 | 0.73498 | 8.567E−02 | 856.68597 |
| 751 | 0.73596 | 8.645E−02 | 864.47366 |
| 752 | 0.73695 | 8.723E−02 | 872.33141 |
| 753 | 0.73793 | 8.803E−02 | 880.25988 |
| 754 | 0.73892 | 8.883E−02 | 888.25970 |
| 755 | 0.73990 | 8.963E−02 | 896.33154 |
| 756 | 0.74089 | 9.045E−02 | 904.47604 |
| 757 | 0.74187 | 9.127E−02 | 912.69387 |
| 758 | 0.74286 | 9.210E−02 | 920.98570 |
| 759 | 0.74384 | 9.294E−02 | 929.35220 |
| 760 | 0.74483 | 9.378E−02 | 937.79407 |
| 761 | 0.74581 | 9.463E−02 | 946.31199 |
| 762 | 0.74680 | 9.549E−02 | 954.90665 |
| 763 | 0.74778 | 9.636E−02 | 963.57876 |
| 764 | 0.74877 | 9.723E−02 | 972.32902 |
| 765 | 0.74975 | 9.812E−02 | 981.15816 |
| 766 | 0.75074 | 9.901E−02 | 990.06690 |
| 767 | 0.75172 | 9.991E−02 | 999.05595 |
| 768 | 0.75271 | 1.008E−01 | 1008.12607 |
| 769 | 0.75369 | 1.017E−01 | 1017.27800 |
| 770 | 0.75468 | 1.027E−01 | 1026.51247 |
| 771 | 0.75567 | 1.036E−01 | 1035.83026 |
| 772 | 0.75665 | 1.045E−01 | 1045.23213 |
| 773 | 0.75764 | 1.055E−01 | 1054.71885 |
| 774 | 0.75862 | 1.064E−01 | 1064.29119 |

TABLE 4-continued

Exemplary Table of Values for 10 bits

| D | V | Y | L (cd/m²) |
|---|---|---|---|
| 775 | 0.75961 | 1.074E−01 | 1073.94996 |
| 776 | 0.76059 | 1.084E−01 | 1083.69593 |
| 777 | 0.76158 | 1.094E−01 | 1093.52991 |
| 778 | 0.76256 | 1.103E−01 | 1103.45271 |
| 779 | 0.76355 | 1.113E−01 | 1113.46516 |
| 780 | 0.76453 | 1.124E−01 | 1123.56806 |
| 781 | 0.76552 | 1.134E−01 | 1133.76227 |
| 782 | 0.76650 | 1.144E−01 | 1144.04861 |
| 783 | 0.76749 | 1.154E−01 | 1154.42793 |
| 784 | 0.76847 | 1.165E−01 | 1164.90110 |
| 785 | 0.76946 | 1.175E−01 | 1175.46898 |
| 786 | 0.77044 | 1.186E−01 | 1186.13245 |
| 787 | 0.77143 | 1.197E−01 | 1196.89237 |
| 788 | 0.77241 | 1.208E−01 | 1207.74965 |
| 789 | 0.77340 | 1.219E−01 | 1218.70519 |
| 790 | 0.77438 | 1.230E−01 | 1229.75989 |
| 791 | 0.77537 | 1.241E−01 | 1240.91466 |
| 792 | 0.77635 | 1.252E−01 | 1252.17044 |
| 793 | 0.77734 | 1.264E−01 | 1263.52815 |
| 794 | 0.77833 | 1.275E−01 | 1274.98874 |
| 795 | 0.77931 | 1.287E−01 | 1286.55317 |
| 796 | 0.78030 | 1.298E−01 | 1298.22238 |
| 797 | 0.78128 | 1.310E−01 | 1309.99736 |
| 798 | 0.78227 | 1.322E−01 | 1321.87908 |
| 799 | 0.78325 | 1.334E−01 | 1333.86853 |
| 800 | 0.78424 | 1.346E−01 | 1345.96672 |
| 801 | 0.78522 | 1.358E−01 | 1358.17464 |
| 802 | 0.78621 | 1.370E−01 | 1370.49332 |
| 803 | 0.78719 | 1.383E−01 | 1382.92378 |
| 804 | 0.78818 | 1.395E−01 | 1395.46706 |
| 805 | 0.78916 | 1.408E−01 | 1408.12422 |
| 806 | 0.79015 | 1.421E−01 | 1420.89630 |
| 807 | 0.79113 | 1.434E−01 | 1433.78438 |
| 808 | 0.79212 | 1.447E−01 | 1446.78954 |
| 809 | 0.79310 | 1.460E−01 | 1459.91285 |
| 810 | 0.79409 | 1.473E−01 | 1473.15543 |
| 811 | 0.79507 | 1.487E−01 | 1486.51839 |
| 812 | 0.79606 | 1.500E−01 | 1500.00283 |
| 813 | 0.79704 | 1.514E−01 | 1513.60991 |
| 814 | 0.79803 | 1.527E−01 | 1527.34075 |
| 815 | 0.79901 | 1.541E−01 | 1541.19651 |
| 816 | 0.80000 | 1.555E−01 | 1555.17836 |
| 817 | 0.80099 | 1.569E−01 | 1569.28748 |
| 818 | 0.80197 | 1.584E−01 | 1583.52505 |
| 819 | 0.80296 | 1.598E−01 | 1597.89226 |
| 820 | 0.80394 | 1.612E−01 | 1612.39034 |
| 821 | 0.80493 | 1.627E−01 | 1627.02051 |
| 822 | 0.80591 | 1.642E−01 | 1641.78399 |
| 823 | 0.80690 | 1.657E−01 | 1656.68205 |
| 824 | 0.80788 | 1.672E−01 | 1671.71592 |
| 825 | 0.80887 | 1.687E−01 | 1686.88689 |
| 826 | 0.80985 | 1.702E−01 | 1702.19625 |
| 827 | 0.81084 | 1.718E−01 | 1717.64528 |
| 828 | 0.81182 | 1.733E−01 | 1733.23529 |
| 829 | 0.81281 | 1.749E−01 | 1748.96761 |
| 830 | 0.81379 | 1.765E−01 | 1764.84357 |
| 831 | 0.81478 | 1.781E−01 | 1780.86453 |
| 832 | 0.81576 | 1.797E−01 | 1797.03183 |
| 833 | 0.81675 | 1.813E−01 | 1813.34685 |
| 834 | 0.81773 | 1.830E−01 | 1829.81099 |
| 835 | 0.81872 | 1.846E−01 | 1846.42564 |
| 836 | 0.81970 | 1.863E−01 | 1863.19222 |
| 837 | 0.82069 | 1.880E−01 | 1880.11216 |
| 838 | 0.82167 | 1.897E−01 | 1897.18689 |
| 839 | 0.82266 | 1.914E−01 | 1914.41788 |
| 840 | 0.82365 | 1.932E−01 | 1931.80660 |
| 841 | 0.82463 | 1.949E−01 | 1949.35454 |
| 842 | 0.82562 | 1.967E−01 | 1967.06319 |
| 843 | 0.82660 | 1.985E−01 | 1984.93407 |
| 844 | 0.82759 | 2.003E−01 | 2002.96871 |
| 845 | 0.82857 | 2.021E−01 | 2021.16866 |
| 846 | 0.82956 | 2.040E−01 | 2039.53547 |
| 847 | 0.83054 | 2.058E−01 | 2058.07072 |
| 848 | 0.83153 | 2.077E−01 | 2076.77601 |
| 849 | 0.83251 | 2.096E−01 | 2095.65294 |
| 850 | 0.83350 | 2.115E−01 | 2114.70314 |
| 851 | 0.83448 | 2.134E−01 | 2133.92824 |
| 852 | 0.83547 | 2.153E−01 | 2153.32990 |
| 853 | 0.83645 | 2.173E−01 | 2172.90979 |
| 854 | 0.83744 | 2.193E−01 | 2192.66960 |
| 855 | 0.83842 | 2.213E−01 | 2212.61104 |
| 856 | 0.83941 | 2.233E−01 | 2232.73582 |
| 857 | 0.84039 | 2.253E−01 | 2253.04569 |
| 858 | 0.84138 | 2.274E−01 | 2273.54240 |
| 859 | 0.84236 | 2.294E−01 | 2294.22773 |
| 860 | 0.84335 | 2.315E−01 | 2315.10346 |
| 861 | 0.84433 | 2.336E−01 | 2336.17142 |
| 862 | 0.84532 | 2.357E−01 | 2357.43342 |
| 863 | 0.84631 | 2.379E−01 | 2378.89131 |
| 864 | 0.84729 | 2.401E−01 | 2400.54696 |
| 865 | 0.84828 | 2.422E−01 | 2422.40224 |
| 866 | 0.84926 | 2.444E−01 | 2444.45906 |
| 867 | 0.85025 | 2.467E−01 | 2466.71934 |
| 868 | 0.85123 | 2.489E−01 | 2489.18502 |
| 869 | 0.85222 | 2.512E−01 | 2511.85806 |
| 870 | 0.85320 | 2.535E−01 | 2534.74043 |
| 871 | 0.85419 | 2.558E−01 | 2557.83414 |
| 872 | 0.85517 | 2.581E−01 | 2581.14120 |
| 873 | 0.85616 | 2.605E−01 | 2604.66365 |
| 874 | 0.85714 | 2.628E−01 | 2628.40356 |
| 875 | 0.85813 | 2.652E−01 | 2652.36299 |
| 876 | 0.85911 | 2.677E−01 | 2676.54405 |
| 877 | 0.86010 | 2.701E−01 | 2700.94886 |
| 878 | 0.86108 | 2.726E−01 | 2725.57957 |
| 879 | 0.86207 | 2.750E−01 | 2750.43834 |
| 880 | 0.86305 | 2.776E−01 | 2775.52735 |
| 881 | 0.86404 | 2.801E−01 | 2800.84881 |
| 882 | 0.86502 | 2.826E−01 | 2826.40496 |
| 883 | 0.86601 | 2.852E−01 | 2852.19805 |
| 884 | 0.86700 | 2.878E−01 | 2878.23034 |
| 885 | 0.86798 | 2.905E−01 | 2904.50415 |
| 886 | 0.86897 | 2.931E−01 | 2931.02179 |
| 887 | 0.86995 | 2.958E−01 | 2957.78560 |
| 888 | 0.87094 | 2.985E−01 | 2984.79796 |
| 889 | 0.87192 | 3.012E−01 | 3012.06126 |
| 890 | 0.87291 | 3.040E−01 | 3039.57792 |
| 891 | 0.87389 | 3.067E−01 | 3067.35037 |
| 892 | 0.87488 | 3.095E−01 | 3095.38108 |
| 893 | 0.87586 | 3.124E−01 | 3123.67255 |
| 894 | 0.87685 | 3.152E−01 | 3152.22729 |
| 895 | 0.87783 | 3.181E−01 | 3181.04784 |
| 896 | 0.87882 | 3.210E−01 | 3210.13677 |
| 897 | 0.87980 | 3.239E−01 | 3239.49668 |
| 898 | 0.88079 | 3.269E−01 | 3269.13018 |
| 899 | 0.88177 | 3.299E−01 | 3299.03992 |
| 900 | 0.88276 | 3.329E−01 | 3329.22857 |
| 901 | 0.88374 | 3.360E−01 | 3359.69884 |
| 902 | 0.88473 | 3.390E−01 | 3390.45346 |
| 903 | 0.88571 | 3.421E−01 | 3421.49517 |
| 904 | 0.88670 | 3.453E−01 | 3452.82676 |
| 905 | 0.88768 | 3.484E−01 | 3484.45106 |
| 906 | 0.88867 | 3.516E−01 | 3516.37089 |
| 907 | 0.88966 | 3.549E−01 | 3548.58913 |
| 908 | 0.89064 | 3.581E−01 | 3581.10868 |
| 909 | 0.89163 | 3.614E−01 | 3613.93247 |
| 910 | 0.89261 | 3.647E−01 | 3647.06346 |
| 911 | 0.89360 | 3.681E−01 | 3680.50463 |
| 912 | 0.89458 | 3.714E−01 | 3714.25901 |
| 913 | 0.89557 | 3.748E−01 | 3748.32965 |
| 914 | 0.89655 | 3.783E−01 | 3782.71964 |
| 915 | 0.89754 | 3.817E−01 | 3817.43208 |
| 916 | 0.89852 | 3.852E−01 | 3852.47012 |
| 917 | 0.89951 | 3.888E−01 | 3887.83695 |
| 918 | 0.90049 | 3.924E−01 | 3923.53576 |
| 919 | 0.90148 | 3.960E−01 | 3959.56982 |
| 920 | 0.90246 | 3.996E−01 | 3995.94239 |
| 921 | 0.90345 | 4.033E−01 | 4032.65679 |
| 922 | 0.90443 | 4.070E−01 | 4069.71636 |
| 923 | 0.90542 | 4.107E−01 | 4107.12448 |
| 924 | 0.90640 | 4.145E−01 | 4144.88457 |
| 925 | 0.90739 | 4.183E−01 | 4183.00009 |
| 926 | 0.90837 | 4.221E−01 | 4221.47450 |

TABLE 4-continued

Exemplary Table of Values for 10 bits

| D | V | Y | L (cd/m²) |
|---|---|---|---|
| 927 | 0.90936 | 4.260E−01 | 4260.31135 |
| 928 | 0.91034 | 4.300E−01 | 4299.51418 |
| 929 | 0.91133 | 4.339E−01 | 4339.08659 |
| 930 | 0.91232 | 4.379E−01 | 4379.03221 |
| 931 | 0.91330 | 4.419E−01 | 4419.35473 |
| 932 | 0.91429 | 4.460E−01 | 4460.05783 |
| 933 | 0.91527 | 4.501E−01 | 4501.14528 |
| 934 | 0.91626 | 4.543E−01 | 4542.62085 |
| 935 | 0.91724 | 4.584E−01 | 4584.48837 |
| 936 | 0.91823 | 4.627E−01 | 4626.75172 |
| 937 | 0.91921 | 4.669E−01 | 4669.41478 |
| 938 | 0.92020 | 4.712E−01 | 4712.48152 |
| 939 | 0.92118 | 4.756E−01 | 4755.95591 |
| 940 | 0.92217 | 4.800E−01 | 4799.84198 |
| 941 | 0.92315 | 4.844E−01 | 4844.14381 |
| 942 | 0.92414 | 4.889E−01 | 4888.86551 |
| 943 | 0.92512 | 4.934E−01 | 4934.01124 |
| 944 | 0.92611 | 4.980E−01 | 4979.58519 |
| 945 | 0.92709 | 5.026E−01 | 5025.59161 |
| 946 | 0.92808 | 5.072E−01 | 5072.03478 |
| 947 | 0.92906 | 5.119E−01 | 5118.91905 |
| 948 | 0.93005 | 5.166E−01 | 5166.24879 |
| 949 | 0.93103 | 5.214E−01 | 5214.02842 |
| 950 | 0.93202 | 5.262E−01 | 5262.26241 |
| 951 | 0.93300 | 5.311E−01 | 5310.95529 |
| 952 | 0.93399 | 5.360E−01 | 5360.11161 |
| 953 | 0.93498 | 5.410E−01 | 5409.73600 |
| 954 | 0.93596 | 5.460E−01 | 5459.83311 |
| 955 | 0.93695 | 5.510E−01 | 5510.40765 |
| 956 | 0.93793 | 5.561E−01 | 5561.46439 |
| 957 | 0.93892 | 5.613E−01 | 5613.00814 |
| 958 | 0.93990 | 5.665E−01 | 5665.04375 |
| 959 | 0.94089 | 5.718E−01 | 5717.57614 |
| 960 | 0.94187 | 5.771E−01 | 5770.61028 |
| 961 | 0.94286 | 5.824E−01 | 5824.15118 |
| 962 | 0.94384 | 5.878E−01 | 5878.20392 |
| 963 | 0.94483 | 5.933E−01 | 5932.77361 |
| 964 | 0.94581 | 5.988E−01 | 5987.86545 |
| 965 | 0.94680 | 6.043E−01 | 6043.48465 |
| 966 | 0.94778 | 6.100E−01 | 6099.63651 |
| 967 | 0.94877 | 6.156E−01 | 6156.32637 |
| 968 | 0.94975 | 6.214E−01 | 6213.55964 |
| 969 | 0.95074 | 6.271E−01 | 6271.34178 |
| 970 | 0.95172 | 6.330E−01 | 6329.67830 |
| 971 | 0.95271 | 6.389E−01 | 6388.57478 |
| 972 | 0.95369 | 6.448E−01 | 6448.03685 |
| 973 | 0.95468 | 6.508E−01 | 6508.07022 |
| 974 | 0.95567 | 6.569E−01 | 6568.68063 |
| 975 | 0.95665 | 6.630E−01 | 6629.87391 |
| 976 | 0.95764 | 6.692E−01 | 6691.65593 |
| 977 | 0.95862 | 6.754E−01 | 6754.03264 |
| 978 | 0.95961 | 6.817E−01 | 6817.01005 |
| 979 | 0.96059 | 6.881E−01 | 6880.59422 |
| 980 | 0.96158 | 6.945E−01 | 6944.79129 |
| 981 | 0.96256 | 7.010E−01 | 7009.60746 |
| 982 | 0.96355 | 7.075E−01 | 7075.04901 |
| 983 | 0.96453 | 7.141E−01 | 7141.12226 |
| 984 | 0.96552 | 7.208E−01 | 7207.83362 |
| 985 | 0.96650 | 7.275E−01 | 7275.18956 |
| 986 | 0.96749 | 7.343E−01 | 7343.19663 |
| 987 | 0.96847 | 7.412E−01 | 7411.86143 |
| 988 | 0.96946 | 7.481E−01 | 7481.19065 |
| 989 | 0.97044 | 7.551E−01 | 7551.19105 |
| 990 | 0.97143 | 7.622E−01 | 7621.86945 |
| 991 | 0.97241 | 7.693E−01 | 7693.23276 |
| 992 | 0.97340 | 7.765E−01 | 7765.28795 |
| 993 | 0.97438 | 7.838E−01 | 7838.04207 |
| 994 | 0.97537 | 7.912E−01 | 7911.50226 |
| 995 | 0.97635 | 7.986E−01 | 7985.67571 |
| 996 | 0.97734 | 8.061E−01 | 8060.56972 |
| 997 | 0.97833 | 8.136E−01 | 8136.19165 |
| 998 | 0.97931 | 8.213E−01 | 8212.54893 |
| 999 | 0.98030 | 8.290E−01 | 8289.64909 |
| 1000 | 0.98128 | 8.367E−01 | 8367.49974 |
| 1001 | 0.98227 | 8.446E−01 | 8446.10856 |
| 1002 | 0.98325 | 8.525E−01 | 8525.48333 |
| 1003 | 0.98424 | 8.606E−01 | 8605.63189 |
| 1004 | 0.98522 | 8.687E−01 | 8686.56220 |
| 1005 | 0.98621 | 8.768E−01 | 8768.28228 |
| 1006 | 0.98719 | 8.851E−01 | 8850.80025 |
| 1007 | 0.98818 | 8.934E−01 | 8934.12431 |
| 1008 | 0.98916 | 9.018E−01 | 9018.26275 |
| 1009 | 0.99015 | 9.103E−01 | 9103.22396 |
| 1010 | 0.99113 | 9.189E−01 | 9189.01642 |
| 1011 | 0.99212 | 9.276E−01 | 9275.64869 |
| 1012 | 0.99310 | 9.363E−01 | 9363.12944 |
| 1013 | 0.99409 | 9.451E−01 | 9451.46742 |
| 1014 | 0.99507 | 9.541E−01 | 9540.67150 |
| 1015 | 0.99606 | 9.631E−01 | 9630.75061 |
| 1016 | 0.99704 | 9.722E−01 | 9721.71382 |
| 1017 | 0.99803 | 9.814E−01 | 9813.57027 |
| 1018 | 0.99901 | 9.906E−01 | 9906.32922 |
| 1019 | 1.00000 | 1.000E+00 | 10000.00000 |
| 1020 | | Reserved | |
| 1021 | | Reserved | |
| 1022 | | Reserved | |
| 1023 | | Reserved | |

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

It is claimed:

1. An apparatus processing a bitstream stored on a non-transitory storage media, the bitstream comprising an image and metadata, wherein:
the metadata includes a first luminance value;
the image is encoded with digital code values D that represent a normalized luminance Y based at least in part on a functional model of $$Y = \left( \frac{\max\left[ (V^{1/m} - c_1), 0 \right]}{c_2 - c_3 V^{1/m}} \right)^{1/n};$$

parameters n, m, $c_1$, $c_2$, and $c_3$ are predetermined values; and
normalized value V of the digital code values D is 0≤V≤1, wherein digital code values D range from 0 to 1023.

2. The apparatus of claim 1, wherein:

$$n = \frac{2610}{4096} \times \frac{1}{4} \approx 0.1593017578125;$$

$$m = \frac{2523}{4096} \times 128 \approx 78.84375;$$

$$c_1 = c_3 - c_2 + 1 = \frac{3424}{4096} \approx 0.8359375;$$

-continued $$c_2 = \frac{2413}{4096} \times 32 \simeq 18.8515625; \text{ and}$$

$$c_3 = \frac{2392}{4096} \times 32 \simeq 18.6875.$$

\* \* \* \* \*